(12) United States Patent
Kurita

(10) Patent No.: US 8,428,059 B2
(45) Date of Patent: Apr. 23, 2013

(54) NETWORK APPARATUS, EDGE ROUTER, AND PACKET COMMUNICATION SYSTEM

(75) Inventor: Toshihiko Kurita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 139 days.

(21) Appl. No.: 13/026,888

(22) Filed: Feb. 14, 2011

(65) Prior Publication Data

US 2011/0222534 A1    Sep. 15, 2011

(30) Foreign Application Priority Data

Mar. 9, 2010 (JP) ................................ 2010-051870

(51) Int. Cl.
*H04L 12/28* (2006.01)

(52) U.S. Cl.
USPC ........... 370/389; 370/386; 370/388; 370/401; 370/412; 370/419

(58) Field of Classification Search ................. 370/356, 370/372, 442, 466, 412–413, 419, 428–429, 370/458, 467, 478
See application file for complete search history.

(56) References Cited

U.S. PATENT DOCUMENTS

| | | | |
|---|---|---|---|
| 6,920,147 B2 * | 7/2005 | Wallner et al. | 370/416 |
| 2003/0189925 A1 * | 10/2003 | Wellbaum et al. | 370/372 |
| 2008/0267204 A1 * | 10/2008 | Hall et al. | 370/412 |
| 2009/0022173 A1 * | 1/2009 | Horn et al. | 370/460 |
| 2012/0002677 A1 * | 1/2012 | Hataida et al. | 370/412 |

FOREIGN PATENT DOCUMENTS

| | | |
|---|---|---|
| JP | 8-265284 A | 10/1996 |
| JP | 2003-244220 A | 8/2003 |
| JP | 2003-258855 A | 9/2003 |
| JP | 2006-086884 A | 3/2006 |

OTHER PUBLICATIONS

Baliga, J. et al., "Photonic Switching and the Energy Bottleneck", Proc. IEEE Photonics in Switching, Aug. 2007, pp. 125-126.

* cited by examiner

*Primary Examiner* — Andrew Chriss
*Assistant Examiner* — Mohamed Kamara
(74) *Attorney, Agent, or Firm* — Fujitsu Patent Center

(57) ABSTRACT

A network apparatus includes: a slot table storing a record including an identifier of a time slot which is assigned to packet transmission from a specific transmission source to a specific transmission destination, and identifiers of an input interface and output interface which are used for the packet transmission; and a unit, upon receiving a first control packet which includes an identifier of the specific time slot and represents a start of the specific time slot, to identify the input interface and output interface corresponding to the specific time slot from the slot table, and to send packets from the identified input interface to the identified output interface during a period until receiving a second control packet which includes the identifier of the specific time slot and represents an end of the specific time slot.

9 Claims, 57 Drawing Sheets

| Dst | Mask | GW | IF | DESTINATION EDGE ROUTER |
|---|---|---|---|---|
| 192.168.1.10 | 255.255.255.0 | 192.168.1.10 | eth0 | c |
| default | 0.0.0.0 | 192.168.1.255 | eth0 | d |
| ... | ... | ... | ... | ... |

| QUEUE ID | DESTINATION EDGE ROUTER |
|---|---|
| A | c |
| B | d |
| ... | ... |

FIG.12

| IF | SLOT ID | QUEUE ID | RESERVATION FLAG | RELEASE FLAG |
|---|---|---|---|---|
| eth0 | #1 | A | 1 | 0 |
| eth0 | #2 | B | 0 | 0 |
| eth0 | ... | ... | ... | ... |

FIG.13

| IN | | OUT (IF) |
|---|---|---|
| IF | SLOT ID | |
| eth0 | #1 | eth1 |
| eth1 | #2 | eth0 |

FIG.14

| S-ER \ D-ER | a | b | c | d |
|---|---|---|---|---|
| a | — | K1 | K2 | K3 |
| b | K1 | — | K4 | K5 |
| c | K2 | K4 | — | K6 |
| d | K3 | K5 | K6 | — |

FIG.15

| ROUTE ID | L1 | L2 | L3 | L4 | L5 |
|---|---|---|---|---|---|
| K1 | 1 | | 1 | 1 | |
| K2 | 1 | 1 | | | |
| ... | | | | | |
| K6 | | | | 1 | 1 |

FIG.16

| S-ER \ D-ER | a | b | c | d |
|---|---|---|---|---|
| a | – | | O | |
| b | | – | | O |
| c | O | | – | |
| d | | O | | – |

SLOT #1, SLOT #2, SLOT #n

FIG.17

| SLOT ID | L1 | L2 | L3 | L4 | L5 |
|---|---|---|---|---|---|
| #1 | 1 | 1 | | 1 | 1 |
| #2 | | | | | |
| ... | | | | | |
| #n | | | | | |

FIG.18

| LINK SPEED | PROPAGATION DELAY | INTRA-NODE DELAY | INTER-NODE DISTANCE | DELAY DEVIATION | NW UTILIZATION RATIO | SLOT TIME | TRANSMISSION TIME |
|---|---|---|---|---|---|---|---|
| 1Gbps | 10 μs/Km | 10 μs | 100Km | 10% | 80% | 5600 μs (ABOUT 180 SLOTS/s) | 4400 μs |
| 100Mbps | 10 μs/Km | 10 μs | 100Km | 10% | 80% | 5600 μs (ABOUT 180 SLOTS/s) | 4400 μs |
| 1Gbps | 10 μs/Km | 10 μs | 10Km | 10% | 80% | 605 μs (ABOUT 1700 SLOTS/s) | 464 μs |

FIG.25

| IF | SLOT ID | QUEUE ID |
|---|---|---|
| eth0 | #1 | A |
| eth0 | #2 | B |
| eth0 | ... | ... |

| ROUTE ID / ROUTE ID | K1 | K2 | ... | K6 |
|---|---|---|---|---|
| K1 | -- | | | × |
| K2 | × | -- | | |
| ... | | | | |
| K6 | | × | | -- |

(1Gbps → 10Gbps DIRECTION)

| SLOT ID (1Gbps LINK) | From | To |
|---|---|---|
| any (ARBITRARY) | IF_a (in) | IF_c (A) |
| | IF_b (in) | IF_c (B) |

FIG.57A (10Gbps → 1Gbps DIRECTION)

| SLOT ID (1Gbps LINK) | From | To |
|---|---|---|
| any (ARBITRARY) | IF_c (C) | IF_a (out) |
| | IF_c (D) | IF_b (out) |

FIG.57B (1Gbps → 10Gbps DIRECTION)

- SWITCHING OF COUPLING BETWEEN POINTS A AND B AND bank

| SLOT ID (1Gbps LINK) | From | To |
|---|---|---|
| any (n) | A | bank-$o_n$ (a) |
|  | B | bank-$o_n$ (a) |

- SWITCHING OF COUPLING BETWEEN OUTPUT POINT AND bank

| SLOT ID (10Gbps LINK) | From | To |
|---|---|---|
| #1 | bank-$o_{n-1}$ (a) | IF_c (out) |
| #2 | bank-$o_{n-1}$ (b) | IF_c (out) |

FIG.58A (10Gbps → 1Gbps DIRECTION)

- SWITCHING OF COUPLING BETWEEN C AND D POINTS AND bank

| SLOT ID (1Gbps LINK) | From | To |
|---|---|---|
| any (n) | bank-$i_{n-1}$ (a) | C |
|  | bank-$i_{n-1}$ (b) | D |

- SWITCHING OF COUPLING BETWEEN INPUT POINT AND bank

| SLOT ID (10Gbps LINK) | From | To |
|---|---|---|
| #1 | IF_c (in) | bank-$i_n$ (a) |
| #2 | IF_c (in) | bank-$i_n$ (b) |

FIG.58B

| SLOT ID (1Gbps) | L1 | L2 |
|---|---|---|
| #1 | 1 | |
| #2 | 1 | |
| ... | ... | ... |
| #5 | 1 | |

FIG.64A

| SLOT ID (10Gbps) | L3 | L4 | L5 |
|---|---|---|---|
| #1 | 1 | | 1 |
| #2 | | | |
| ... | | | |
| #10 | | | |

FIG.64B

| SLOT ID (1Gbps) | bank #1, #2 | | bank #3, #4 | |
|---|---|---|---|---|
| | BUFFER a | BUFFER b | BUFFER a | BUFFER b |
| #1 | 1 | | 1 | |
| #2 | 1 | | 1 | |
| ... | ... | ... | ... | ... |
| #5 | 1 | | 1 | |

FIG.65

| INFO.-ELEMENT NAME | NO. OF Octets | INFO. CONTENTS |
|---|---|---|
| HOUR | 4 | "HOUR" AT TRANSMISSION OF INFO. |
| MINUTE | 4 | "MINUTE" AT TRANSMISSION OF INFO. |
| SECOND | 4 | "SECOND" AT TRANSMISSION OF INFO. |

| INFO.-ELEMENT NAME | NO. OF Octets | INFO. CONTENTS | |
|---|---|---|---|
| IF NAME | 4 | INTERFACE NAME | REPEAT X TIMES (X IS NO. OF INTERFACES) |
| NO. OF FRAMES | 4 | NO. OF FRAMES PER SECOND | |
| NO. OF SLOTS | 4 | NO. OF SLOTS IN ONE FRAME | |

NETWORK APPARATUS, EDGE ROUTER, AND PACKET COMMUNICATION SYSTEM

CROSS-REFERENCE TO RELATED APPLICATIONS

This application is based upon and claims the benefit of priority of the prior Japanese Patent Application No. 2010-051870, filed on Mar. 9, 2010, the entire contents of which are incorporated herein by reference.

FIELD

This technique relates to a communication control technique, and more particularly to a technique for saving power consumed by a network apparatus.

BACKGROUND

Recently, the volume of traffic flowing through an information communication network has considerably increased, and the power consumed by the entire network has also increased together. In particular, the power consumption of a router has increased significantly. Incidentally, a packet buffering and a routing table retrieval processing in the router occupy 30% or more of the entire power consumption.

Then, hitherto, Time Division Multiplexing (TDM), Multi-Protocol Label Switching (MPLS) and the like are known as techniques for improving the utilization efficiency of a network. In TDM, for example, data can be multiplexed on the time base and data traffic can be transferred in a bufferless manner. As for the traffic control to determine routes, however, each router executes a buffering and a routing. Accordingly, the power saving in the entire router is not so expected. In addition, because a packet is transferred in MPLS by using a label defined between routers, a load of the routing can be reduced. However, a packet collision cannot be avoided and the buffering is carried out. For that reason, the power saving in the router is not so expected as well.

As described above, in the conventional arts, network apparatuses such as the router carry out the buffering and routing, and it is impossible to significantly reduce the power consumption of the network apparatuses.

SUMMARY

According to an aspect of this technique, a network apparatus for relaying packets includes: (A) a first port unit to be coupled to a first link that is used in time division of a first kind of time slots; (B) a second port unit to be coupled to a second link that is used in time division of a second kind of time slots, wherein each of the second kind of time slots is shorter than each of the first kind of time slots; (C) at least two output banks that are storage areas to temporarily store the packets flowing from the first link to the second link; (D) a switch coupling between the first port unit and the second port unit; and (E) a controller to control the switch. Then, (e-1) upon detecting that switching to a first transmission time slot among the first kind of time slots was carried out, the controller couples the first port unit through the switch to a first output bank of the output banks and couples another output bank to the second port unit or the second link to cause the first output bank to temporarily store packets from the first link, (e-2) upon detecting that switching from the first transmission time slot to a next time slot of the first kind of time slots, the controller couples the first output bank to the second port unit or the second link and couples the first port unit through the switch to the another output bank, and (e-3) upon detecting that switching to a second transmission time slot among the second kind of packets was carried out, the controller causes to transmit the packets stored in an output bank coupled to the second port unit or the second link to the second link.

According to another aspect of this technique, a packet communication system includes: (A) a first communication apparatus to be coupled to a first link that is used in time division of a first kind of time slots; (B) a second communication apparatus to be coupled to a second link that is used in time division of a second kind of time slots, wherein each of the second kind of time slots is shorter than each of the first kind of time slots; and (C) a network apparatus relaying packets communicated between the first and second communication apparatuses. In addition, the network apparatus for relaying packets includes: (C-1) a first port unit to be coupled to the first link; a second port unit to be coupled to the second link; at least two output banks that are storage areas to temporarily store the packets flowing from the first link to the second link; (C-2) a switch coupling between the first port unit and the second port unit; and (C-3) a controller to control the switch. Then, upon detecting that switching to a first transmission time slot among the first kind of time slots was carried out, the controller couples the first port unit through the switch to a first output bank of the output banks and couples another output bank to the second port unit or the second link to cause the first output bank to temporarily store packets from the first link, and upon detecting that switching from the first transmission time slot to a next time slot of the first kind of time slots, the controller couples the first output bank to the second port unit or the second link and couples the first port unit through the switch to the another output bank, and upon detecting that switching to a second transmission time slot among the second kind of packets was carried out, the controller causes to transmit the packets stored in the output bank coupled to the second port unit or the second link to the second link.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 12 illustrates an example of a path management table;

FIG. 13 illustrates an example of a slot reservation table;

FIG. 14 illustrates an example of a slot table;

FIG. 15 illustrates an example of a route ID table;

FIG. 16 illustrates an example of a route and link management table;

FIG. 17 illustrates an example of a slot assignment table;

FIG. 18 illustrates an example of a link utilization status table;

FIG. 25 illustrates examples of calculation of a slot time;

FIGS. 57A and 57B are diagrams illustrating table examples of SW control tables;

FIGS. 58A and 58B are diagrams illustrating table examples of bank control tables;

FIGS. 64A and 64B are diagrams illustrating table examples of link utilization status tables in the fourth embodiment;

FIG. 65 is a diagram illustrating a table example of a bank utilization status table;

DESCRIPTION OF EMBODIMENTS

Figure 1:
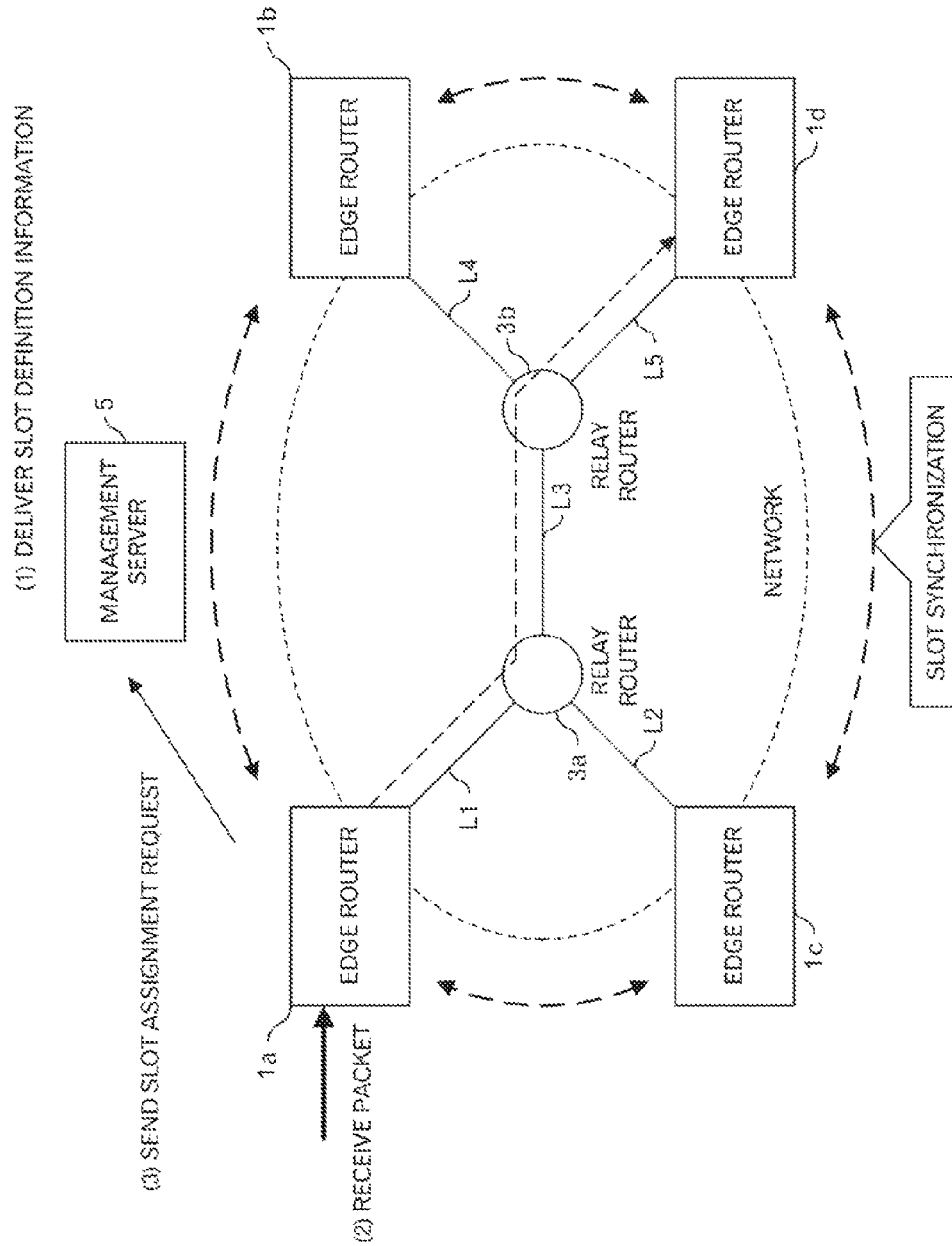
FIG. 1 illustrates an outline of a packet communication system.

First, an outline of a packet communication system according to an embodiment of the present technique will be described below with reference to FIGS. 1 to 7. As illustrated in FIG. 1, the packet communication system according to this embodiment of the present technique includes, for example, edge routers 1 (e.g. 1a to 1d in FIG. 1), relay routers 3 (e.g. 3a and 3b in FIG. 1), and a management server 5. Incidentally, each of the edge routers 1 is coupled to an external network (not depicted). In addition, in FIG. 1, the relay router 3a is coupled to the edge router 1a via a link L1, to the edge router 1c via a link L2, and to the relay router 3b via a link L3, respectively. Furthermore, the relay router 3b is coupled to the edge router 1b via a link L4 and to the edge router 1d via a link L5. Incidentally, four edge routers 1 and two relay routers 3 are illustrated in FIG. 1, however, the number of edge routers 1 and the number of relay routers 3 are not limited to the illustrated ones.

Figure 2:
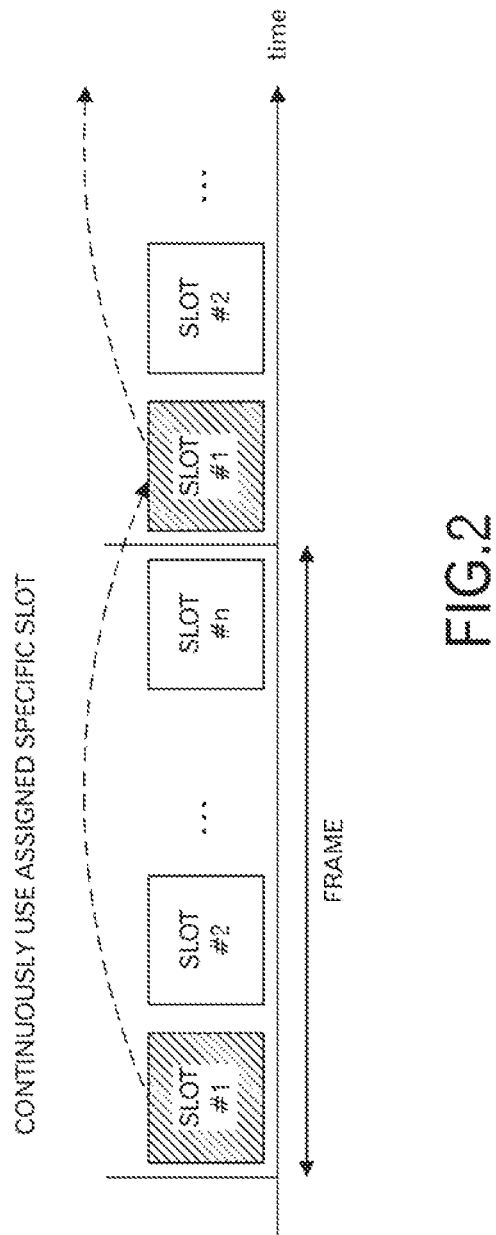
FIG. 2 illustrates frames and time slots.
Figure 3:
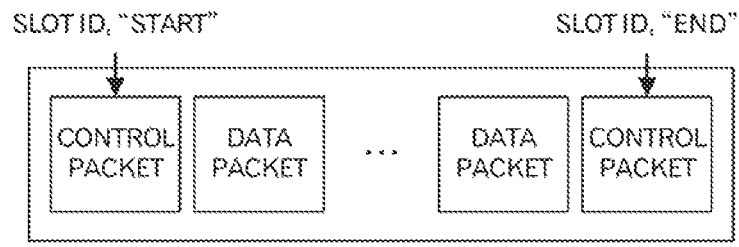
FIG. 3 illustrates a control packet.

The operating principle of the packet communication system will be explained using FIGS. 2 to 4. As illustrated in FIG. 2, for example, one frame includes n time slots (i.e., a slot #1, a slot #2, . . . , and a slot #n). Incidentally, the term "time slot" may be simply called a "slot", hereinafter. For example, the slot #1 is assigned to a certain packet communication such that this packet communication is carried out using the slot #1 in each frame. In this case, other packet communications are not carried out using the slot #1. Hence, no packet collision occurs with the other packets. Furthermore, a control packet as illustrated in FIG. 3 is transferred to notify the relay router 3 of the respective timings of the start and end of the slot #1. The communication route of the packet communication carried out using the slot #1 is held fixed. Therefore, data packets are continuously transferred to an output interface corresponding to the applicable communication route and no routing is carried out for each data packet. Thus, in this packet communication system, a time slot causing no packet collision with other packets is assigned to a packet communication to carry out the corresponding packet communication using the assigned time slot.

Figure 4:
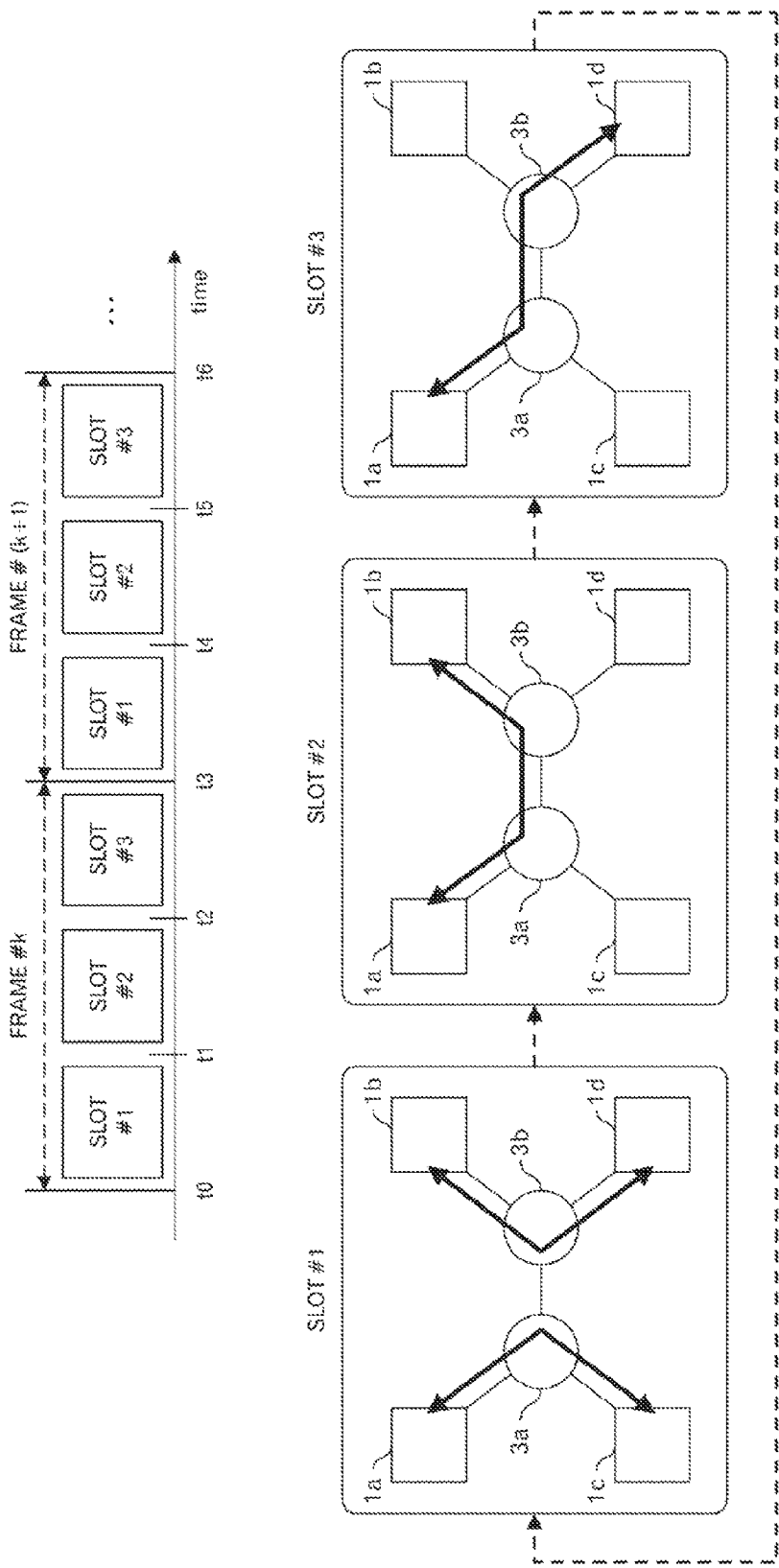
FIG. 4 illustrates the operating principle of the packet communication system.

FIG. 4 illustrates an example in which the number of time slots included in one frame is 3. In FIG. 4, the slot #1 (t0 to t1, t3 to t4, and the like on the time base of FIG. 4) is used to carry out the packet communication between the edge router 1a and the edge router 1c and the packet communication between the edge router 1b and the edge router 1d. In addition, the slot #2 (t1 to t2, t4 to t5, and the like on the time base of FIG. 4) is used to carry out the packet communication between the edge router 1a and the edge router 1b. Furthermore, the slot #3 (t2 to t3, t5 to t6 and the like on the time base of FIG. 4) is used to carry out a packet communication between the edge router 1a and the edge router 1d. Incidentally, in the example of FIG. 4, it is assumed that, in case where other packet communications (e.g., the packet communication between the edge router 1c and the edge router 1d) are not carried out, and when other packet communications are carried out, four or more slots are predefined in advance.

Next, an outline of a processing executed by the packet communication system illustrated in FIG. 1 will be explained below. After being booted up, the management server 5 first delivers slot definition information to each edge router 1 (FIG. 1: step (1)). Incidentally, the slot definition information includes the number of time slots included in one frame, a transmission time described later and the like. Furthermore, the management server 5 periodically delivers time synchronization information to each edge router 1. Incidentally, each edge router 1 synchronizes with the time slots in accordance with the slot definition information and the time synchronization information.

Then, for example, the edge router 1a receives a packet from the external network (step (2)) and stores the received packet in a queue. It is here assumed that the edge router 1a receives a packet which is to be transmitted out to the external network through the edge router 1d. The edge router 1a then determines whether or not the time slot for transmitting this packet is already assigned. When the time slot has not been yet assigned, the edge router 1a transmits a slot assignment request to the management server 5 (step (3)). Incidentally, the slot assignment request includes an identifier of the transmission source edge router and an identifier of the destination edge router.

Figure 5:
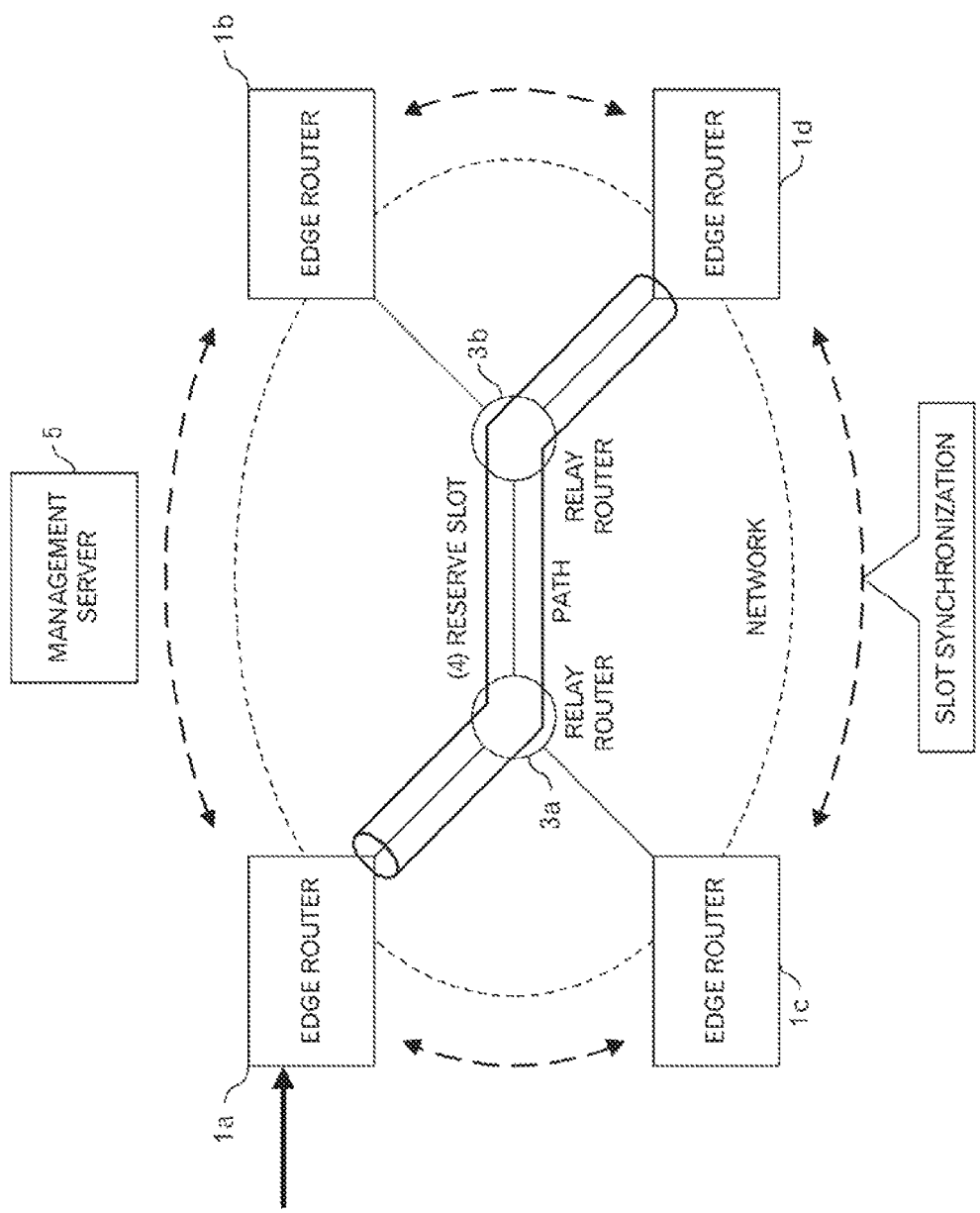
FIG. 5 illustrates an outline of the packet communication system.

Shifting to explanation of FIG. 5, in response to the slot assignment request, the management server 5 assigns a time slot that never causes any packet collisions. It is here assumed that a slot #i is assigned. Then, the edge router 1a, the relay router 3a, the relay router 3b, and the edge router 1d carry out a processing to reserve the slot #i (FIG. 5: step (4)). Incidentally, the time slot assignment processing and the time slot reservation processing will be described in detail later.

Figure 6:
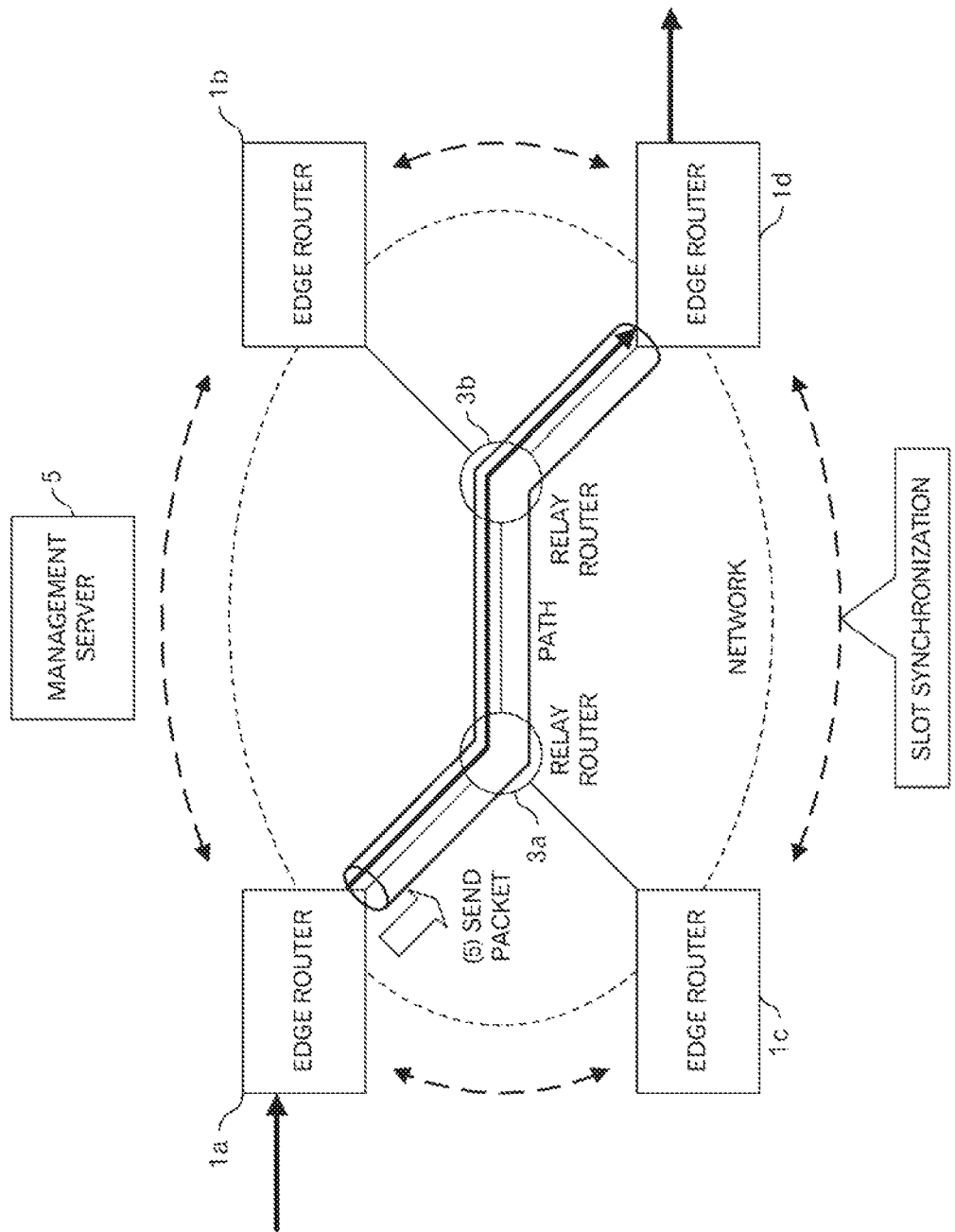
FIG. 6 illustrates an outline of the packet communication system.

Shifting to explanation of FIG. 6, upon detecting the switching to the slot #i, the edge router 1a transmits a control packet including an identifier (ID) of the time slot and the control type "start". After transmitting the control packet, the edge router 1a reads out the packet (also called the "data packet" hereinafter) from the queue and transmits the packet (step (5)). In addition, the edge router 1a transmits, as a final packet in the relevant time slot, a control packet including the ID of the time slot and the control type "end".

Then, the edge router 1d receives the control packets and the data packet from the edge router 1a via the relay router 3a and the relay router 3b, and transmits the received data packets to the external network that is the transmission destination.

Then, the edge router 1a repeats the aforementioned step (5) in the slot #i in each of the subsequent frames.

Figure 7:
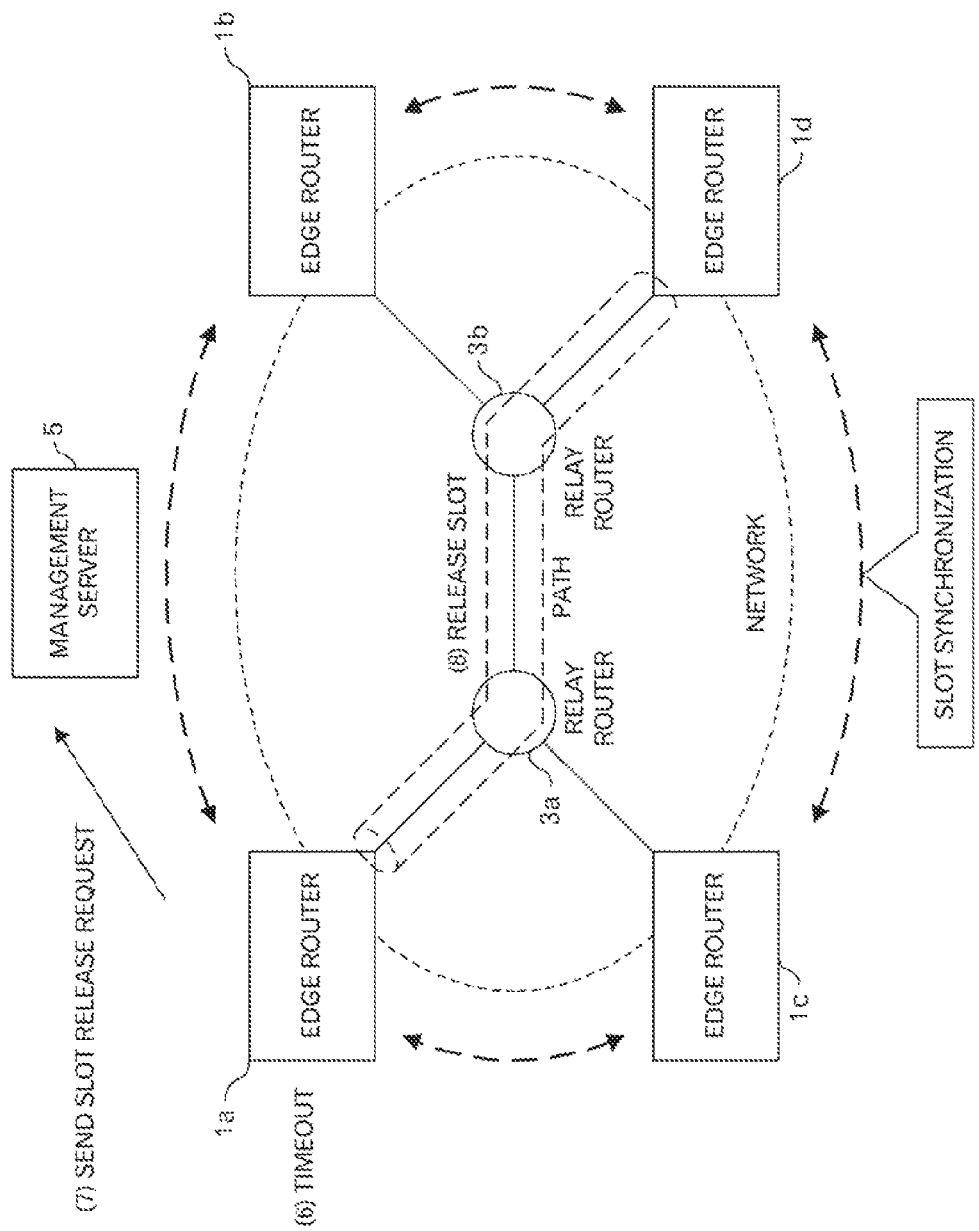
FIG. 7 illustrates an outline of the packet communication system.

Shifting to explanation of FIG. 7, after storing a packet into the queue, for example, the edge router 1a starts a timer. When the edge router 1a receives a next packet by the time a predetermined period of time elapsed, the edge router 1a restarts the timer. In other words, when the next packet is not received by the time the predetermined period of time elapsed, the edge router 1a detects a timeout of the timer (FIG. 7: step (6)). Then, the edge router 1a transmits a slot release request to the management server 5 (step (7)). Incidentally, the slot release request includes the identifier of the transmission source edge router and the identifier of the destination edge router.

Then, in response to the slot release request, the management server 5 specifies the time slot which is to be released. It is here assumed that a slot #j is identified as a time slot to be released. Then, the management server 5, the edge router 1a, the relay router 3a, the relay router 3b, and the edge router 1d carry out a processing to release the slot #j (step (8)). The processing for releasing the time slot will be described in detail later.

[First Embodiment]

A first embodiment of the present technique will be explained below with reference to FIGS. 8 to 35. A packet communication system according to the first embodiment includes, as illustrated in FIG. 1, the edge routers 1, the relay routers 3, and the management server 5. Incidentally, following matters are assumed in the first embodiment. Namely, the transmission speeds in all of the links L1 to L5 are the same. Moreover, it is assumed that the delivery delay between the edge routers 1 is several hundreds of ms level even if it is large. Furthermore, it is assumed that the management server 5 can grasp the network configuration using protocols such as Simple Network Management Protocol (SNMP) or the like.

Figure 8:
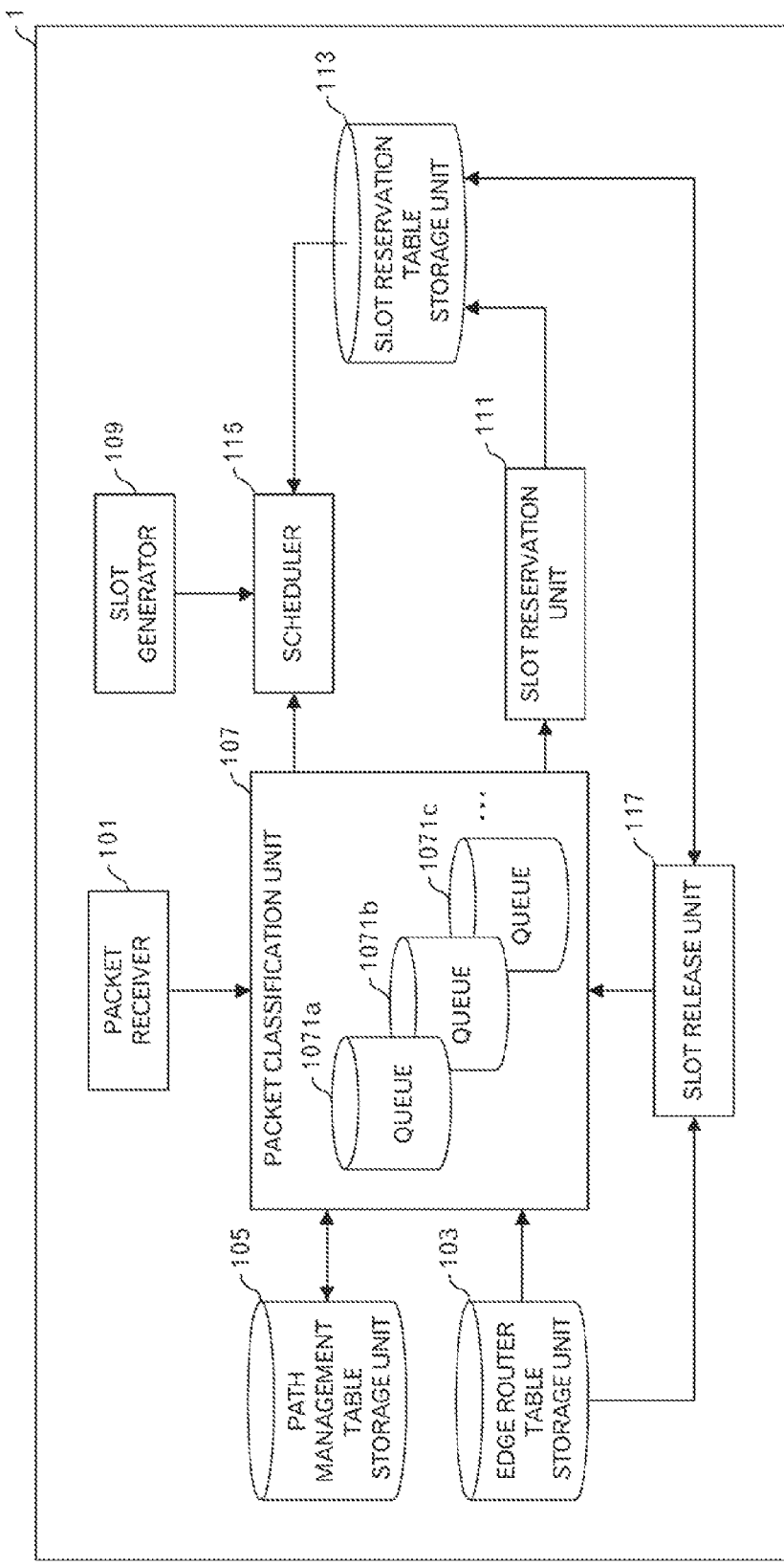
FIG. 8 is a block diagram of an edge router in a first embodiment.

FIG. 8 is a functional block diagram of the edge router 1 in the first embodiment. The edge router 1 in the first embodiment includes a packet receiver 101; edge router table storage unit 103; path management table storage unit 105; packet classification unit 107; slot generator 109; slot reservation unit 111; slot reservation table storage unit 113; scheduler 115, and a slot release unit 117. Incidentally, the edge router table storage unit 103 stores an edge router table described later. The path management table storage unit 105 stores a path management table described later. The slot reservation table storage unit 113 stores a slot reservation table described later.

The packet receiver 101 receives a packet from the external network, and outputs the received packet to the packet classification unit 107. The packet classification unit 107 generates or deletes a queue 1071 (e.g. 1071a, 1071b, 1071c and the like in FIG. 8) corresponding to a destination edge router, if required. In addition, based on data stored in the edge router table storage unit 103 and the path management table storage unit 105, the packet classification unit 107 stores the packet, which was received by the packet receiver 101, into one of the queues 1071, and notifies the slot reservation unit 111 of the necessity of the time slot assignment, when the assignment of the time slot is required. The slot generator 109 receives, from the management server 5, the slot definition information including the number of slots contained in one frame, the slot time, and the transmission time, and then outputs the received slot definition information to the scheduler 115. The slot reservation unit 111 transmits the slot assignment request to the management server 5 in response to an instruction from the packet classification unit 107. And, when the assignment of the time slot is received from the management server 5, the slot reservation unit 111 registers the time slot into the slot reservation table which is stored in the slot reservation table storage unit 113. Based on the slot definition information received by the slot generator 109, time synchronization information received from the management server 5, and the slot reservation table stored in the slot reservation table storage unit 113, the scheduler 115 carries out, for example, a processing to readout the data packet to be sent out in the time slot at the current time from the queue 1071 in the packet classification unit 107, and then to transmit the read data packet. The slot release unit 117 carries out a processing to release the time slot based on the data stored in the edge router table storage unit 103 and slot reservation table storage unit 113. Furthermore, the slot release unit 117 outputs, to the packet classification unit 107, an instruction to cause to delete the queue 1071 that corresponds to the released time slot.

Figure 9:
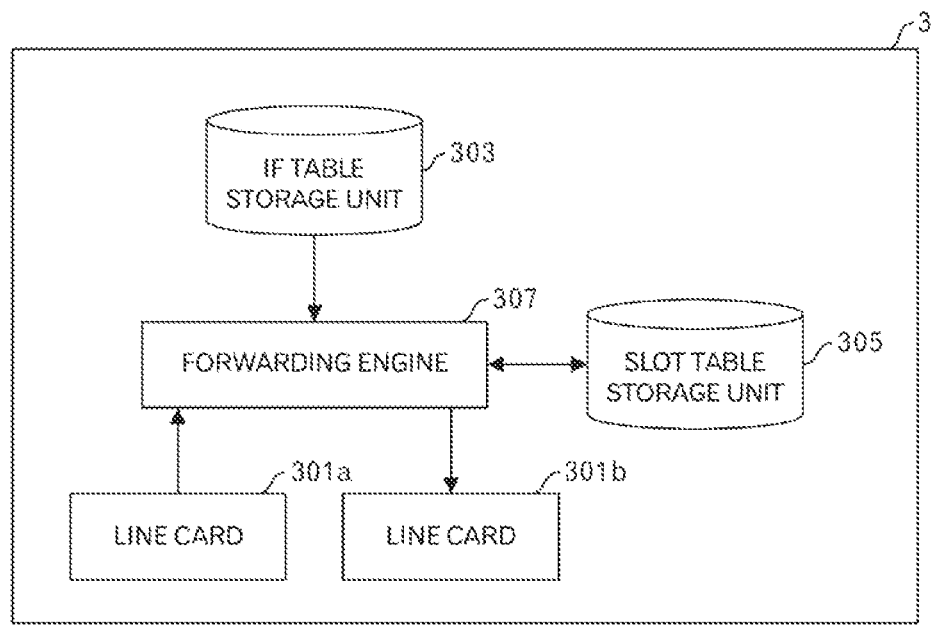
FIG. 9 is a block diagram of a relay router in the first embodiment.

FIG. 9 is a functional block diagram of the relay router 3 in the first embodiment. The relay router 3 in the first embodiment includes plural line cards 301 (e.g. 301a and 301b in FIG. 9); interface (IF) table storage unit 303; slot table storage unit 305; and forwarding engine 307. Incidentally, the IF table storage unit 303 stores an IF table including information of the adjacent edge router(s) 1 or the other relay router(s) 3, and information of IFs coupled to this network apparatus. The slot table storage unit 305 stores a slot table described later.

The line card 301 is coupled to the edge router 1 adjacent via the transmission path, or to the other relay router 3. The forwarding engine 307 registers a new record into the slot table storage unit 305 by using communication path information provided from the edge router 1 and the data stored in the IF table storage unit 303, and/or transfers the packet based on the slot table stored in the slot table storage unit 305.

Figures 10, 11:
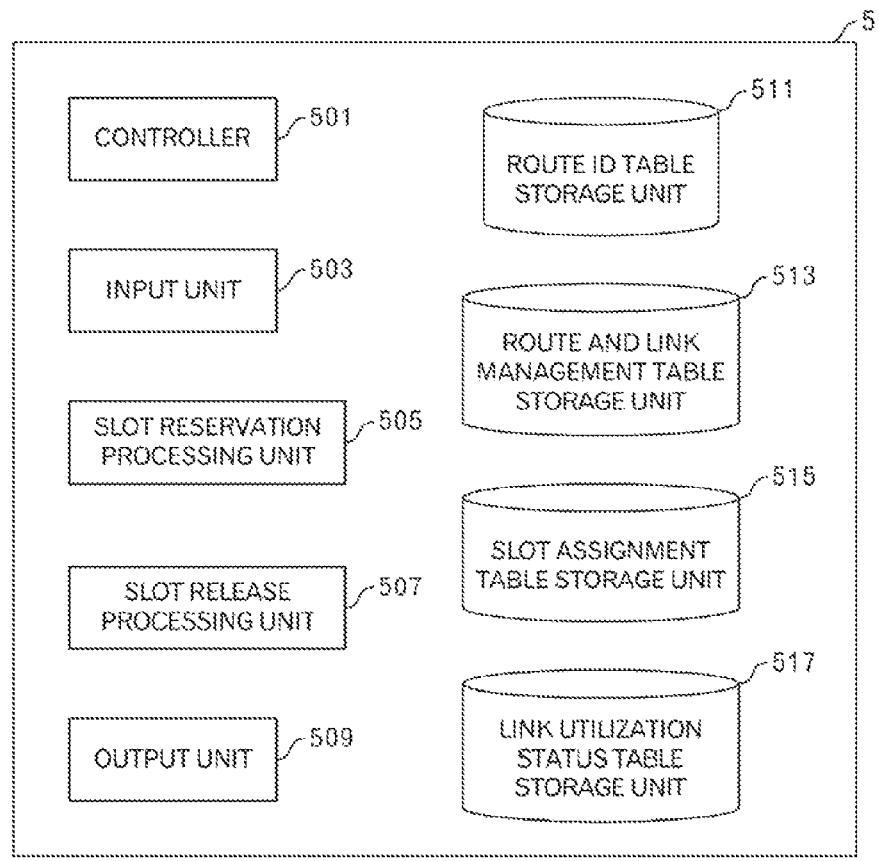
FIG. 10 is a block diagram of a management server in the first embodiment.
FIG. 11 illustrates an example of an edge router table.

FIG. 10 is a functional block diagram of the management server 5 in the first embodiment. The management server 5 in the first embodiment includes a controller 501; input unit 503; slot reservation processing unit 505; slot release processing unit 507; output unit 509; route ID table storage unit 511; route and link management table storage unit 513; slot assignment table storage unit 515; and link utilization status table storage unit 517. Incidentally, the route ID table storage unit 511 stores a route ID table described later. The route and link management table storage unit 513 stores a route and link management table described later. The slot assignment table storage unit 515 stores a slot assignment table described later. The link utilization status table storage unit 517 stores a link utilization status table described later.

After the management server 5 is booted up, the controller 501 calculates a guard time (described later), a transmission time and a slot time, and then transmits them to the edge router 1. The input unit 503 receives the slot assignment request and the slot release request from the edge router 1, and then outputs those requests to the slot reservation processing unit 505 or the slot release processing unit 507, respectively. The slot reservation processing unit 505 carries out a slot reservation processing (described later) based on data contained in the slot assignment request which was received by the input unit 503. The slot release processing unit 507 carries out a slot release processing (described later) based on data contained in the slot release request which was received by the input unit 503. The output unit 509 outputs a result of the slot reservation processing executed by the slot reservation processing unit 505 and a result of the slot release processing executed by the slot release processing unit 507.

FIG. 11 illustrates an example of the edge router table stored in the edge router table storage unit 103. In the example of FIG. 11, the edge router table includes a column of destination address (Dst), column of net mask (Mask), column of default gateway (GW), column of output interface (IF) and column of destination edge router. Incidentally, the destination address, the net mask, the default gateway, and the output interface are the same as those data stored in the already known routing table. In addition, an identifier of the edge router (called the destination edge router) among the edge routers, which outputs, to the external network, the packet transmitted in accordance with the setting of the relevant record, is set in advance in the column of the destination edge router.

FIG. 12 illustrates an example of the path management table stored in the path management table storage unit 105. In the example of FIG. 12, the path management table includes a column of queue ID and column of the destination edge router. Incidentally, the path management table is used to identify the queue 1071 corresponding to the destination edge router.

FIG. 13 illustrates an example of the slot reservation table stored in the slot reservation table storage unit 113. In the example of FIG. 13, the slot reservation table includes a column of output interface (IF), column of slot ID, column of queue ID, column of reservation flag ("0" represents not yet reserved, and "1" represents already reserved) and column of release flag ("0" represents not to be released, and "1" represents to be released). In the column of the output interface (IF), an identifier of the output interface is set which is used in the packet communication carried out in the time slot relating to the relevant record. In the column of the queue ID, an ID of the queue 1071 is set which stores the packet to be transmitted in the time slot relating to the relevant record. Details of the reservation flag and release flag will be described later.

FIG. 14 illustrates an example of the slot table stored in the slot table storage unit 305. In the example of FIG. 14, the slot table includes a column of the input (IN) and column of the output interface (OUT (IF)). The column of the input is divided into a column of the input interface (IF) and column of the slot ID. An identifier of the input interface and an identifier of the output interface, which are used in the packet communication carried out in the time slot relating to the relevant record, are set respectively in the column of the input interface and the column of the output interface.

FIG. 15 illustrates an example of the route ID table stored in the route ID table storage unit 511. In the example of FIG. 15, each column of the route ID table is provided for each identifier of the destination edge router (D-ER), and each line of the route ID table is provided for each identifier of the transmission source edge router (S-ER). In addition, the route ID table stores, for each combination of the transmission source edge router and the destination edge router, a route ID corresponding to the combination.

FIG. 16 illustrates an example of the route and link management table stored in the route and link management table storage unit 513. In the example of FIG. 16, the route and link management table includes a column of the route ID and columns of link IDs (e.g. a column of L1, column of L2, column of L3, column of L4, and column of L5 in FIG. 16). In the route and link management table, "1" is set for the link that is used in the route relating to the relevant record. The table of FIG. 16 depicts, for example, that L1, L3 and L4 are used as a route having the route ID "K1".

FIG. 17 illustrates an example of the slot assignment table stored in the slot assignment table storage unit 515. In the example of FIG. 17, each column of the slot assignment table is provided for each identifier of the destination edge router (D-ER), and each line of the slot assignment table is provided for each identifier of the transmission source edge router (S-ER). Furthermore, in the example of FIG. 17, the slot assignment table is held for each slot ID (e.g. for each of the slot #1, the slot #2, the slot #3 and the like). Incidentally, a circle mark in the slot assignment table represents that the time slot is assigned to the relevant combination of the transmission source edge router and destination edge router.

FIG. 18 illustrates an example of the link utilization status table stored in the link utilization status table storage unit 517. In the example of FIG. 18, the link utilization status table includes a column of the slot ID and column of the link IDs (e.g. a column of L1, a column of L2, a column of L3, a column of L4, and a column of L5 in FIG. 18). In the link utilization status table, "1" is set for the link that is being used in the time slot relating to the relevant record. The table of FIG. 18 represents, for example, that L1, L2, L4 and L5 are being used in the slot #1.

Figure 19:
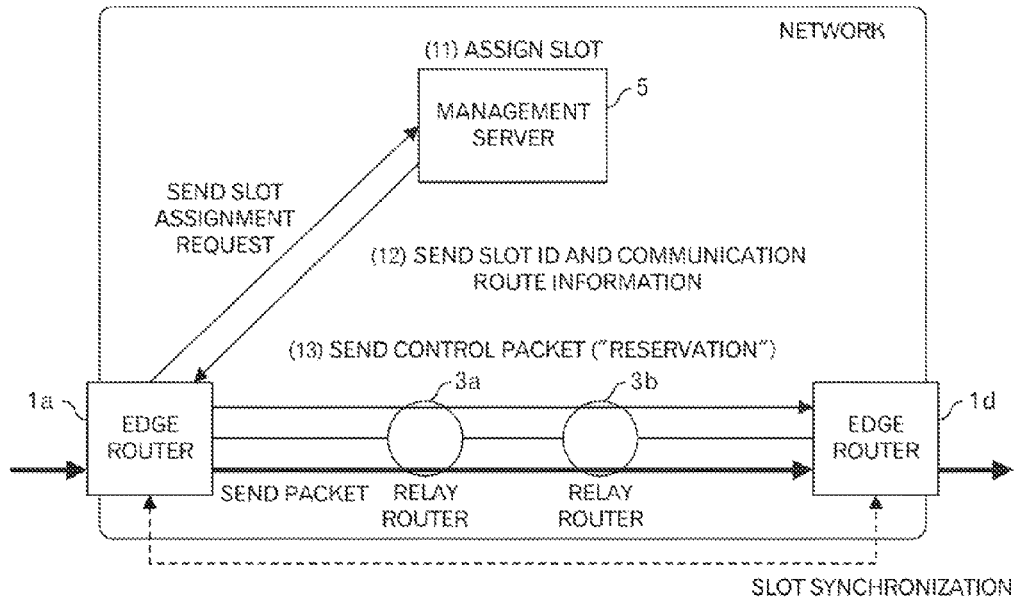
FIG. 19 is a diagram illustrating a flowchart of a processing executed in the entire system when a time slot is reserved in the first embodiment.

Prior to explanation of the respective specific processing flows in the edge router 1, the relay router 3, and the management server 5 in the first embodiment, a processing flow executed by the entire packet communication system when the time slot is reserved and released, will be explained using FIGS. 19 to 22. FIG. 19 illustrates a processing executed in the entire packet communication system when the time slot is reserved. In other words, FIG. 19 illustrates details of the processing illustrated in FIG. 5.

In FIG. 19, upon receiving the slot assignment request from the edge router 1a, the management server 5 assigns a time slot that will not cause any packet collisions, and then updates the slot assignment table and the link utilization status table (FIG. 19: step (11)). Then, the management server 5 transmits an ID of the assigned time slot and communication route information to the edge router 1a (step (12)). Incidentally, the communication route information includes respective IP addresses of the relay routers 3 through which the packet passes until the packet reaches the destination edge router.

Upon receiving the time slot ID and the communication route information from the management server 5, the edge router 1a then generates a new record based on the received data and adds the generated record to the slot reservation table. After that, upon detecting the switching to the assigned time slot, the edge router 1a transmits a control packet, which includes the time slot ID, control type "reservation" and communication route information, in the assigned time slot to the edge router 1d (step (13)). Incidentally, the transmitted control packet reaches the edge router 1d through the relay router 3a and relay router 3b. At that time, each of the relay router 3a and relay router 3b generates a new record based on the data included in the control packet and adds the generated record to the slot table.

After that, when detecting the switching to this time slot, the edge router 1a transmits a control packet including the time slot ID and control type "start", data packet(s) read out from the queue 1071, and a control packet including the time slot ID and control type "end".

Figure 20:
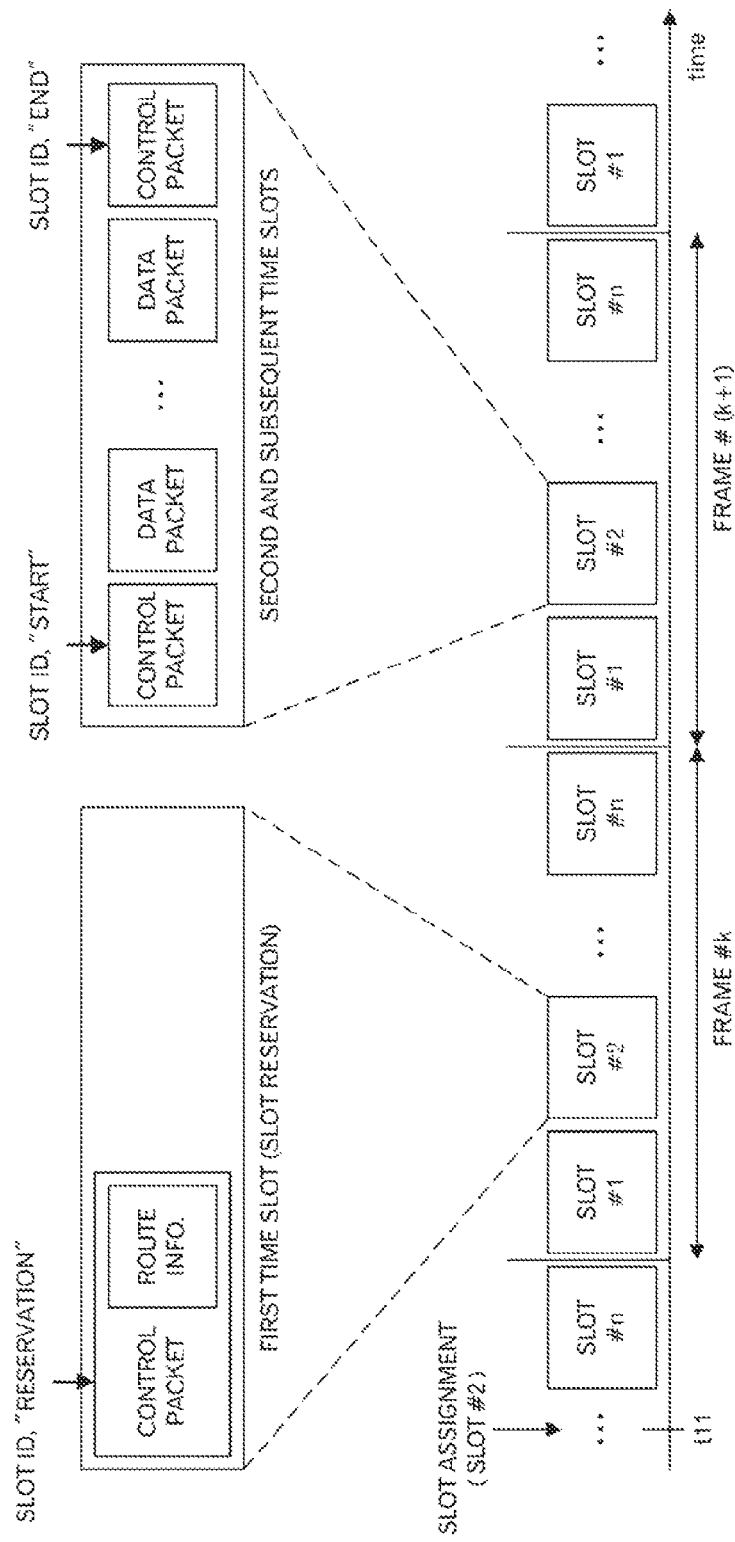
FIG. 20 illustrates packets sent out in time slots.

FIG. 20 illustrates a case where, for example, the slot #2 is assigned. In the example of FIG. 20, the time slot is assigned at a time t11, and the time slot (slot #2) within a frame #k becomes a first time slot after the assignment. Thus, only a control packet (control type: reservation) is transmitted in the time slot (slot #2) within the frame #k. Then, in the time slots (slots #2) within frames subsequent to the frame # (k+1), a control packet (control type: start), one or more data packets and a control packet (control type: end) are transmitted.

Figure 21:
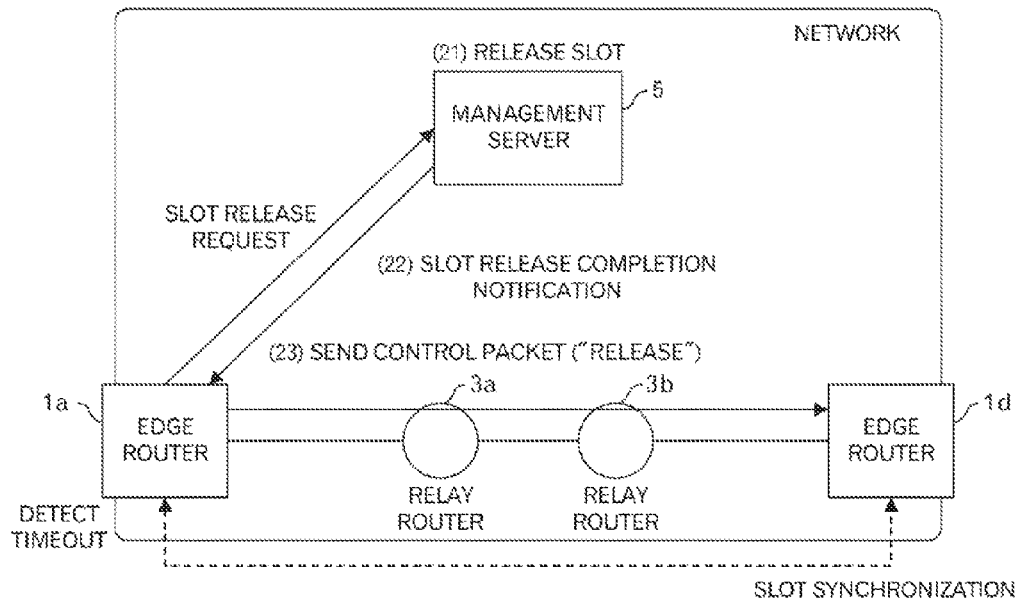
FIG. 21 is a diagram illustrating a flowchart of a processing executed in the entire system when a time slot is released in the first embodiment.

FIG. 21 illustrates a processing flow in the entire packet communication system when the time slot is released. In other words, FIG. 21 illustrates details of the processing illustrated in FIG. 7. Upon detecting a timeout of the timer, the edge router 1a, for example, transmits the slot release request to the management server 5. Upon receiving the slot release request from the edge router 1a, the management server 5 then releases the time slot relating to the slot release request and updates the slot assignment table and the link utilization status table (FIG. 21: step (21)). Then, the management server 5 transmits a slot release completion notification including the ID of the released time slot to the edge router 1a (step (22)).

Then, after the edge router 1a detects the switching to the released time slot after receiving the slot release completion notification from the management server 5, the edge router 1a transmits a control packet, which includes the time slot ID and the control type "release", in the released time slot to the edge router 1d (step (23)). Incidentally, this control packet reaches the edge router 1d through the relay router 3a and the relay router 3b. At this time, each of the relay router 3a and the relay router 3b deletes the record relating to the time slot ID included in this control packet, from the slot table. In addition, the edge router 1a also deletes the record relating to the relevant time slot ID from the slot reservation table.

Figure 22:
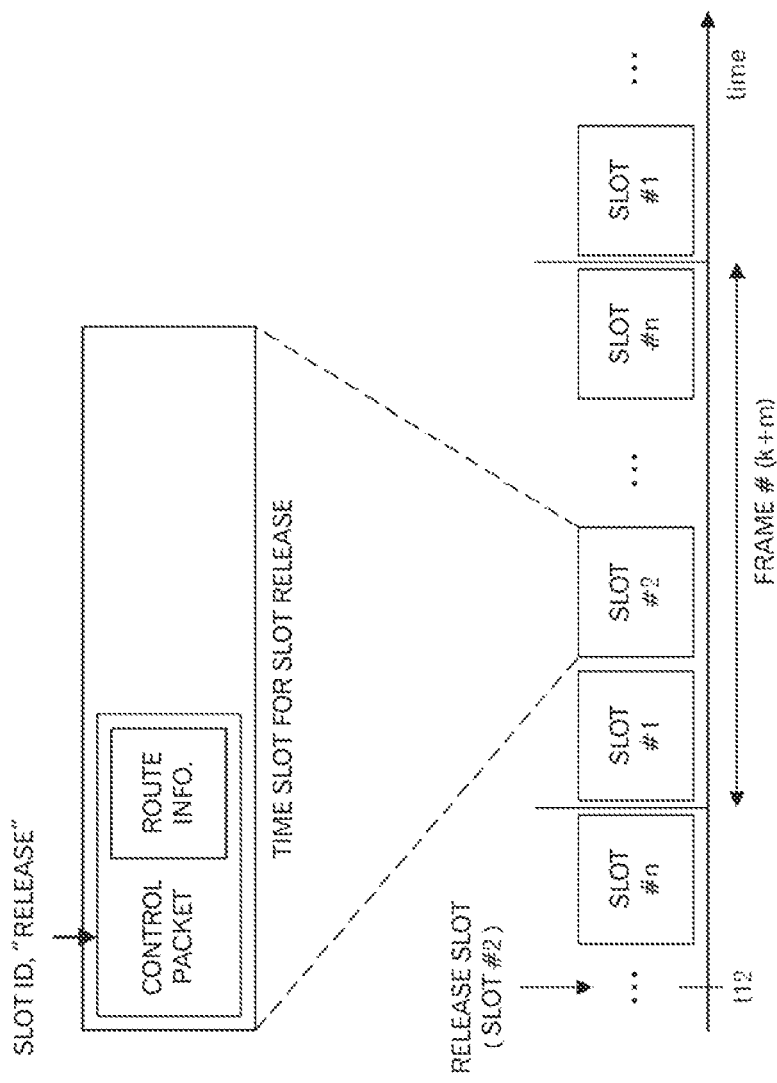
FIG. 22 illustrates a packet sent out in the time slot.

FIG. 22 illustrates a case where, for example, the slot #2 is released. In the example of FIG. 22, because the slot release completion notification is received at a time t12, the time slot (slot #2) within a frame #(k+m) becomes a first time slot after the release. Therefore, a control packet (control type: release) is transmitted in the time slot (slot #2) within the frame #(k+m).

According to the first embodiment, as described above, the time slot is reserved or released by the transmission source edge router transmitting the control packet, which includes the control type "reservation" or "release", to the destination edge router.

Next, specific processing flows for each of the edge router 1, relay router 3 and management server 5 will be described with reference to FIGS. 23 to 35. For the sake of convenience in explanation, a processing flow for the management server 5 is first described.

Figure 23:
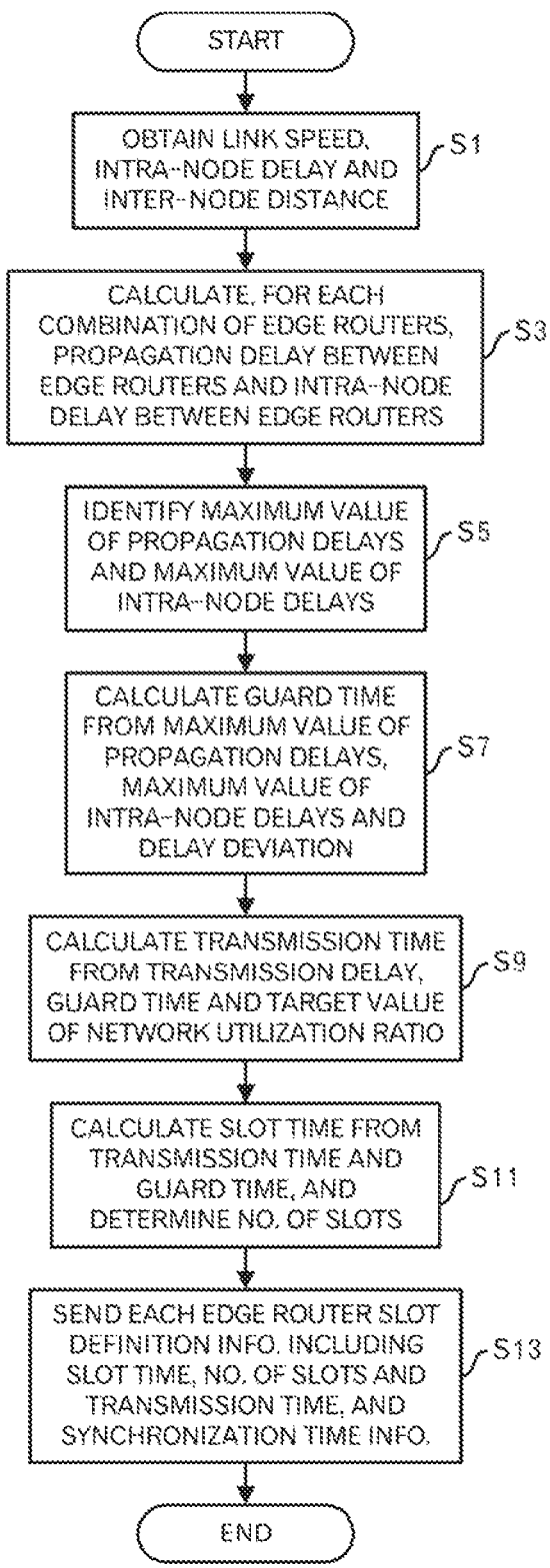
FIG. 23 is a diagram illustrating a flowchart of a processing executed when the management server is booted up.
Figure 24:
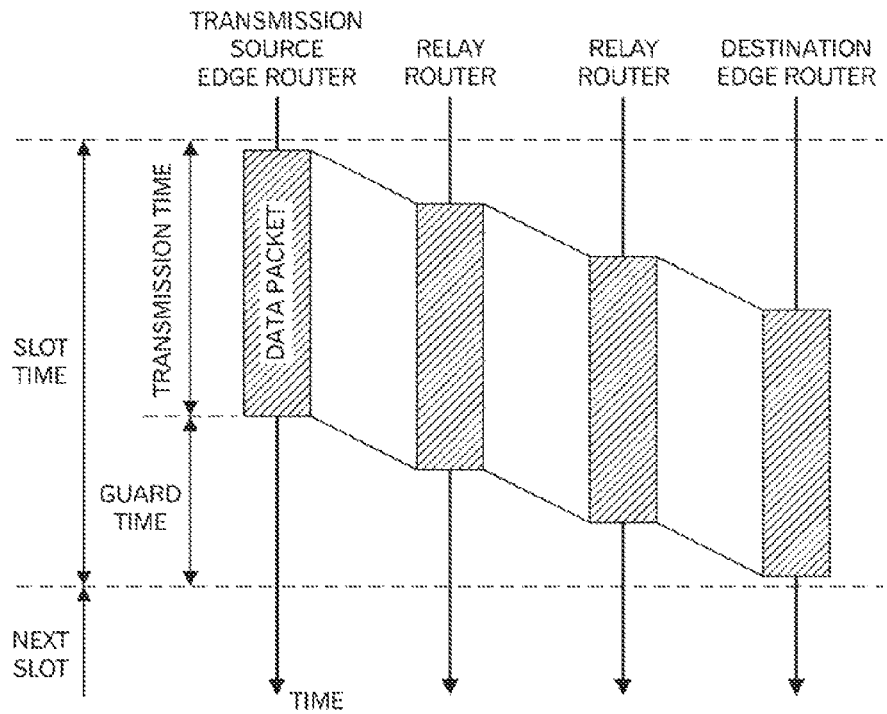
FIG. 24 illustrates a guard time.

FIG. 23 illustrates the processing flow when the management server 5 is booted up. After the management server 5 is booted up, the controller 501 issues an SNMP command, for example, and collects information regarding the network configuration. Then, the controller 501 obtains the link speed, intra-node delay and the inter-node distances, which are set in advance (FIG. 23: step S1). By using the link speed, intra-node delay and inter-node distances, the controller 501 then calculates a propagation delay between the edge routers and intra-node delay between the edge routers for each combination of the edge routers, and then stores the calculated results in a storage device (step S3). After that, the controller 501 identifies the maximum value of the propagation delay between the edge routers and maximum value of the intra-node delay between the edge routers (step S5). Then, the controller 501 calculates a deviation (e.g., 10%) of those delays, calculates a guard time from the maximum value of the propagation delays between the edge routers, maximum value of the intra-node delays between the edge routers and the delay deviation, and stores the calculated values into a storage device (step S7). The guard time is explained with reference to FIG. 24. As illustrated in FIG. 24, the packet transmitted from the transmission source edge router reaches the destination edge router with a delay from the transmitted time because of a physical delay (such as a propagation delay). In this embodiment, therefore, the guard time is set within a slot time to ensure that the packet reaches the destination edge router within the slot time. Incidentally, the guard time can be calculated, for example, based on the following formula:

> Guard time=the maximum value of the propagation delays between the edge routers+the maximum value of the intra-node delays between the edge routers+delay deviation Then, the controller 501 calculates a transmission time by using the calculated guard time, preset network (NW) utilization rate (target value) and transmission delay (step S9). It is here assumed that the network utilization rate is defined by the following formula (1). In other words, the transmission time can be calculated by substituting the calculated guard time, preset network utilization rate (target value) and transmission delay for the formula (1). Incidentally, although the slot time is given by (the transmission time+the guard time) as illustrated in FIG. 24, it is required to prolong the transmission time and to transmit plural packets together in order to improve the network utilization rate.

> Network utilization rate=the transmission delay/(the transmission time+guard time)    (1)

Then, the controller 501 calculates a slot time from the transmission time calculated at the step S9 and guard time calculated at the step S7 to determine the number of slots (step S11). Incidentally, the slot time is calculated by adding the transmission time and guard time. FIG. 25 illustrates calculation examples of the slot time.

Then, the controller 501 transmits slot definition information including the slot time, the number of slots, and transmission time, and time synchronization information to each of the edge routers 1 (step S13). The processing then ends.

By carrying out the aforementioned processing, the data necessary for the synchronization of the time slot is delivered to each edge router 1.

Figure 26:
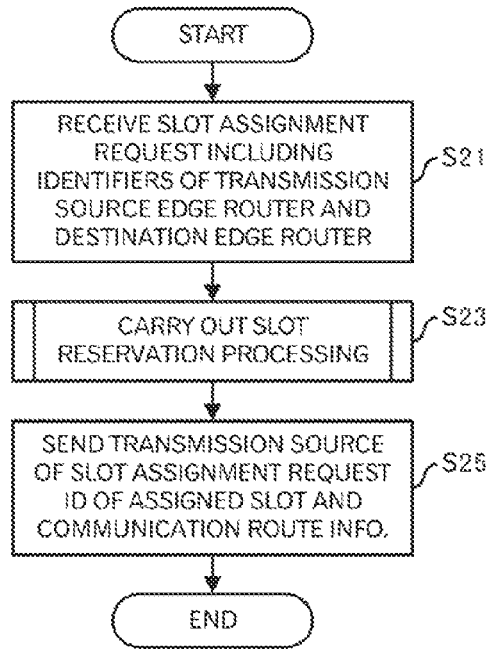
FIG. 26 is a diagram illustrating a flowchart of a processing executed in the management server when a time slot is reserved.

Next, a processing flow for the management server 5 when the time slot is reserved will be explained with reference to FIGS. 26 and 27. Incidentally, the management server 5 carries out the processing as depicted in FIG. 26 every time when the management server 5 receives the slot assignment request from the edge router 1. First, the input unit 503 receives the slot assignment request including the identifiers of the transmission source edge router and destination edge router from the edge router 1 and temporarily stores the slot assignment request into a storage device (FIG. 26: step S21). Then, the input unit 503 notifies the slot reservation processing unit 505 of the fact that the slot assignment request has been received.

Then, when receiving the notification from the input unit 503, the slot reservation processing unit 505 carries out a slot reservation processing by using the route ID table, route and link management table, slot assignment table and the link utilization status table (step S23). The slot reservation processing is explained using FIG. 27.

Figure 27:
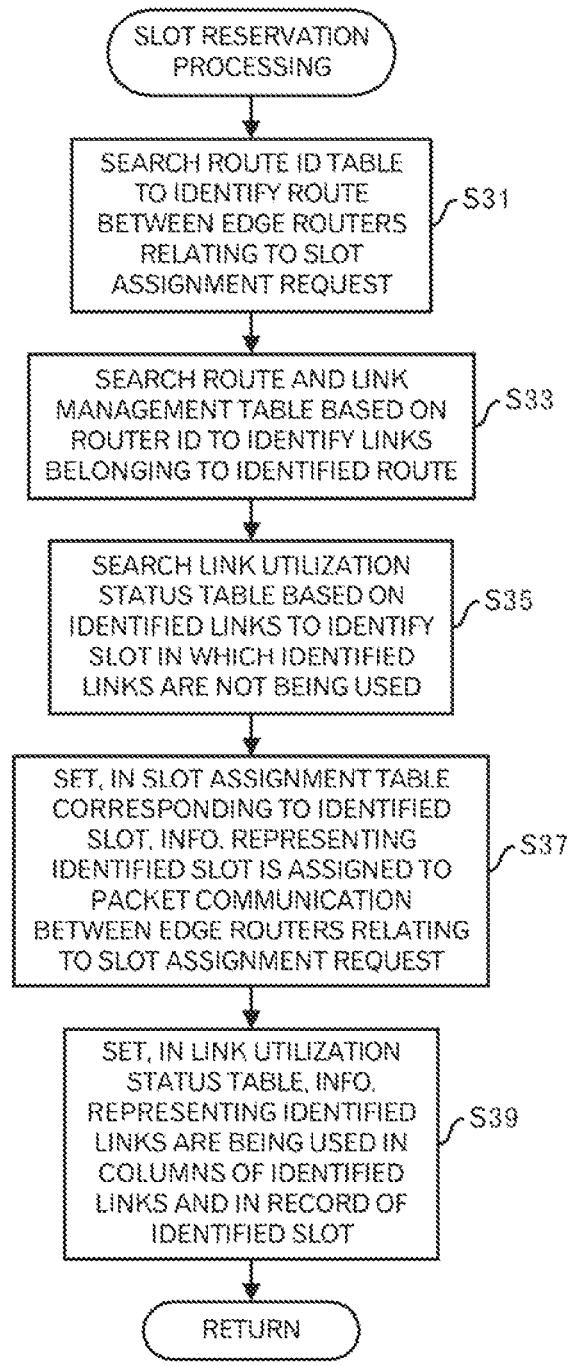
FIG. 27 is a diagram illustrating a flowchart of a slot reservation processing.

First, the slot reservation processing unit 505 searches the route ID table based on the identifiers of the transmission source edge router and destination edge router, which are included in the slot assignment request stored in the storage device, to identify the route between the edge routers relating to the slot assignment request (FIG. 27: step S31). Then, the slot reservation processing unit 505 searches the route and link management table based on the ID of the identified route to identify links which belong to the identified route (step S33).

Then, the slot reservation processing unit 505 searches the link utilization status table based on the ID(s) of the identified link(s) to identify a slot that the identified links are not used (step S35). Incidentally, when plural links are identified at the step S33, the slot reservation processing unit 505 identifies a slot in which the plural links are not used entirely. After that, the slot reservation processing unit 505 sets, in the slot assignment table corresponding to the identified slot, information (i.e., the circle mark in FIG. 17) representing that the identified slot has been assigned to the packet communication between the edge routers relating to the slot assignment request (step S37). Moreover, the slot reservation processing unit 505 sets, in link utilization status table, information (e.g. "1" in FIG. 18) representing that the relevant links are being used, in the columns of the identified links and in the record of the identified slot (step S39). Thereafter, the slot reservation processing ends, and the processing returns to the calling source processing (i.e. FIG. 26).

Returning to the explanation of FIG. 26, after carrying out the slot reservation processing, the slot reservation processing unit 505 notifies the output unit 509 of the ID of the assigned slot and communication route information. Upon receiving the notification from the slot reservation processing unit 505, the output unit 509 then transmits the ID of the assigned slot and communication route information to the transmission source of the slot assignment request (step S25). The processing of FIG. 26 then ends.

By carrying out the aforementioned processing, the management server 5 assigns the time slot that the links belonging to the communication route are not used entirely. Therefore, when the packet communication is carried out in the assigned time slot, a packet collision with any other packets does not occur.

Figure 28:
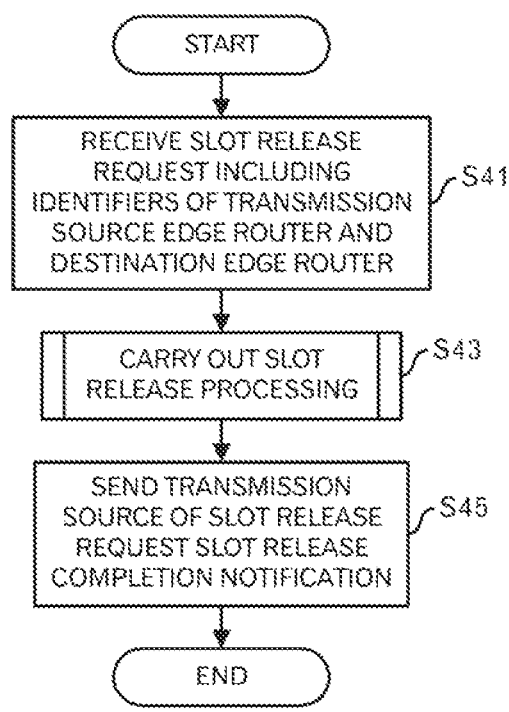
FIG. 28 is a diagram illustrating a flowchart of a processing executed in the management server when a time slot is released.

Next, a processing flow for the management server 5 when the time slot is released will be described using FIGS. 28 and 29. Incidentally, the management server 5 carries out a processing as depicted in FIG. 28 every time when the management server 5 receives the slot release request from the edge router 1. First, the input unit 503 receives the slot release request including the identifiers of the transmission source edge router and destination edge router from the edge router 1 and temporarily stores the slot release request into the storage device (FIG. 28: step S41). Then, the input unit 503 notifies the slot release processing unit 507 of the fact that the slot release request has been received.

Upon receiving the notification from the input unit 503, the slot release processing unit 507 then carries out a slot release processing by using the route ID table, route and link management table, slot assignment table and link utilization status table (step S43). The slot release processing is explained with reference to FIG. 29.

Figure 29:
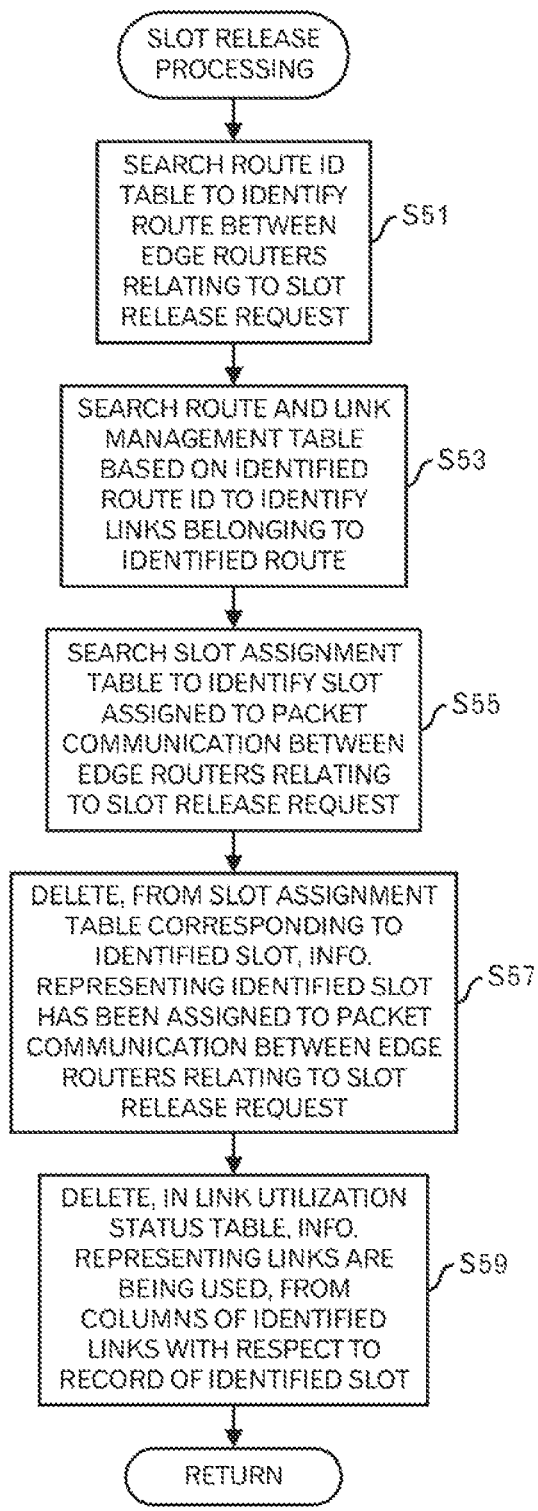
FIG. 29 is a diagram illustrating a flowchart of a slot release processing.

First, the slot release processing unit 507 searches the route ID table based on the identifiers of the transmission source edge router and destination edge router, which are included in the slot release request stored in the storage device, to identify the route between the edge routers relating to the slot release request (FIG. 29: step S51). Then, the slot release processing unit 507 searches the route and link management table based on the ID of the identified route to identify a link or links which belong to the identified route (step S53).

Then, the slot release processing unit 507 searches the slot assignment table based on the identifiers of the transmission source edge router and destination edge router, which are included in the slot release request stored in the storage device, to identify the slot that is assigned to the packet communication between the edge routers relating to the slot release request (step S55). After that, the slot release processing unit 507 deletes, from the slot assignment table corresponding to the identified slot, the information (e.g. the circle mark in FIG. 17) representing that the identified slot has been assigned to the packet communication between the edge routers relating to the slot release request (step S57). In addition, the slot release processing unit 507 deletes, in the link utilization status table, the information (e.g. "1" in FIG. 18) representing that the identified links are being used, in the columns of the identified links and in the record of the identified slot (step S59). Thereafter, the slot release processing ends and the processing returns to the calling-source processing (FIG. 28).

Returning to the explanation of FIG. 28, after carrying out the slot release processing, the slot release processing unit 507 notifies the output unit 509 of the ID of the released slot. Upon receiving the notification from the slot release processing unit 507, the output unit 509 then transmits a slot release completion notification including the ID of the released slot to the transmission source of the slot release request (step S45). The processing of FIG. 28 then ends.

By carrying out the aforementioned processing, the slot assignment table and link utilization status table are appropriately updated in response to the release of the time slot. Therefore, the relevant time slot can be assigned to another packet communication.

Figure 30:
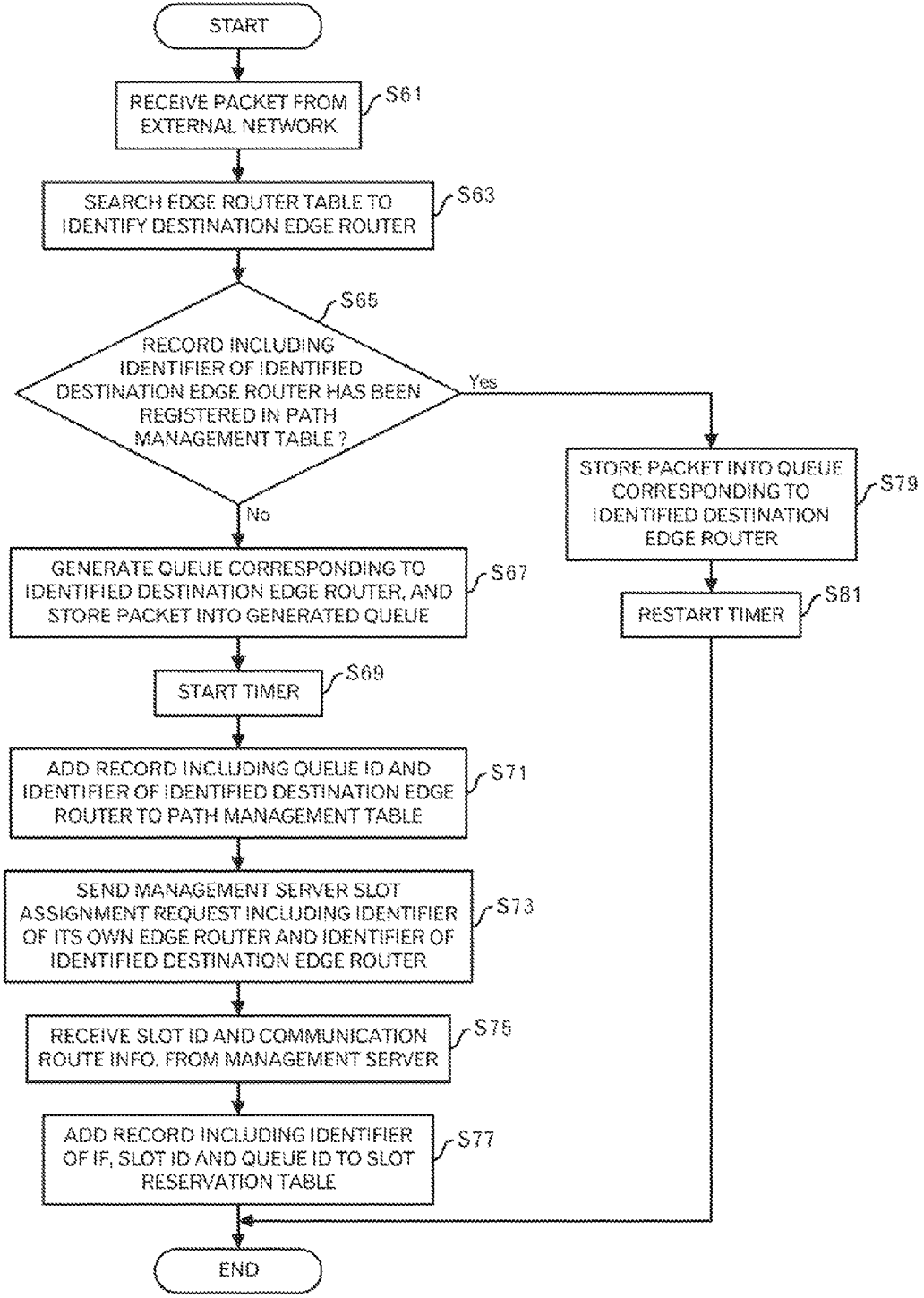
FIG. 30 is a diagram illustrating a flowchart of a processing executed in the edge router when a time slot is assigned.

Next, a processing flow for the edge router 1 will be explained using FIGS. 30 to 33. FIG. 30 illustrates a processing flow when a time slot is newly assigned. First, the packet receiver 101 receives a packet from the external network (FIG. 30: step S61) and outputs the received packet to the packet classification unit 107. When receiving the packet from the packet receiver 101, the packet classification unit 107 searches the edge router table based on the address of the transmission destination relating to the received packet to identify the identifier of the destination edge router (step S63).

Then, the packet classification unit 107 determines whether or not a record including the identifier of the identified destination edge router has been registered in the path management table (step S65). When it is determined that the record including the identifier of the identified destination edge router has not been registered in the path management table (step S65: No route), the packet classification unit 107 generates a queue 1071 corresponding to the identified destination edge router and stores the packet into the generated queue 1071 (step S67). Then, the packet classification unit 107 activates a timer corresponding to the generated queue 1071 (step S69). After that, the packet classification unit 107 generates a record including the queue ID and identifier of the identified destination edge router, and adds the generated record to the path management table (step S71). Then, the packet classification unit 107 determines that assignment of a time slot is required, and notifies the slot reservation unit 111 of the determination result.

Upon receiving the notification from the packet classification unit 107, the slot reservation unit 111 then transmits a slot assignment request including the identifier of its own edge router and identifier of the identified destination edge router to the management server 5 (step S73).

Thereafter, the slot reservation unit 111 receives, as a response to the slot assignment request, the slot ID and communication route information from the management server 5, and temporarily stores them into a storage device (step S75). Then, the slot reservation unit 111 identifies an interface from the edge router table in accordance with the communication route information, and identifies a queue ID from the path management table. After that, the slot reservation unit 111 generates a record including the identifier of the interface, slot ID and the queue ID, and adds the generated record to the slot reservation table (step S77). The processing then ends.

On the other hand, when it is determined at the step S65 that the record including the identifier of the identified destination edge router is registered in the path management table (step S65: Yes route), the packet classification unit 107 stores the packet into the queue 1071 corresponding to the identified destination edge router (step S79). Then, the packet classification unit 107 restarts a timer corresponding to the relevant queue 1071 (step S81).

By carrying out the aforementioned processing, the edge router can transmit the slot assignment request to the management server 5, as required, and can receive the assignment of the time slot.

Figure 31:
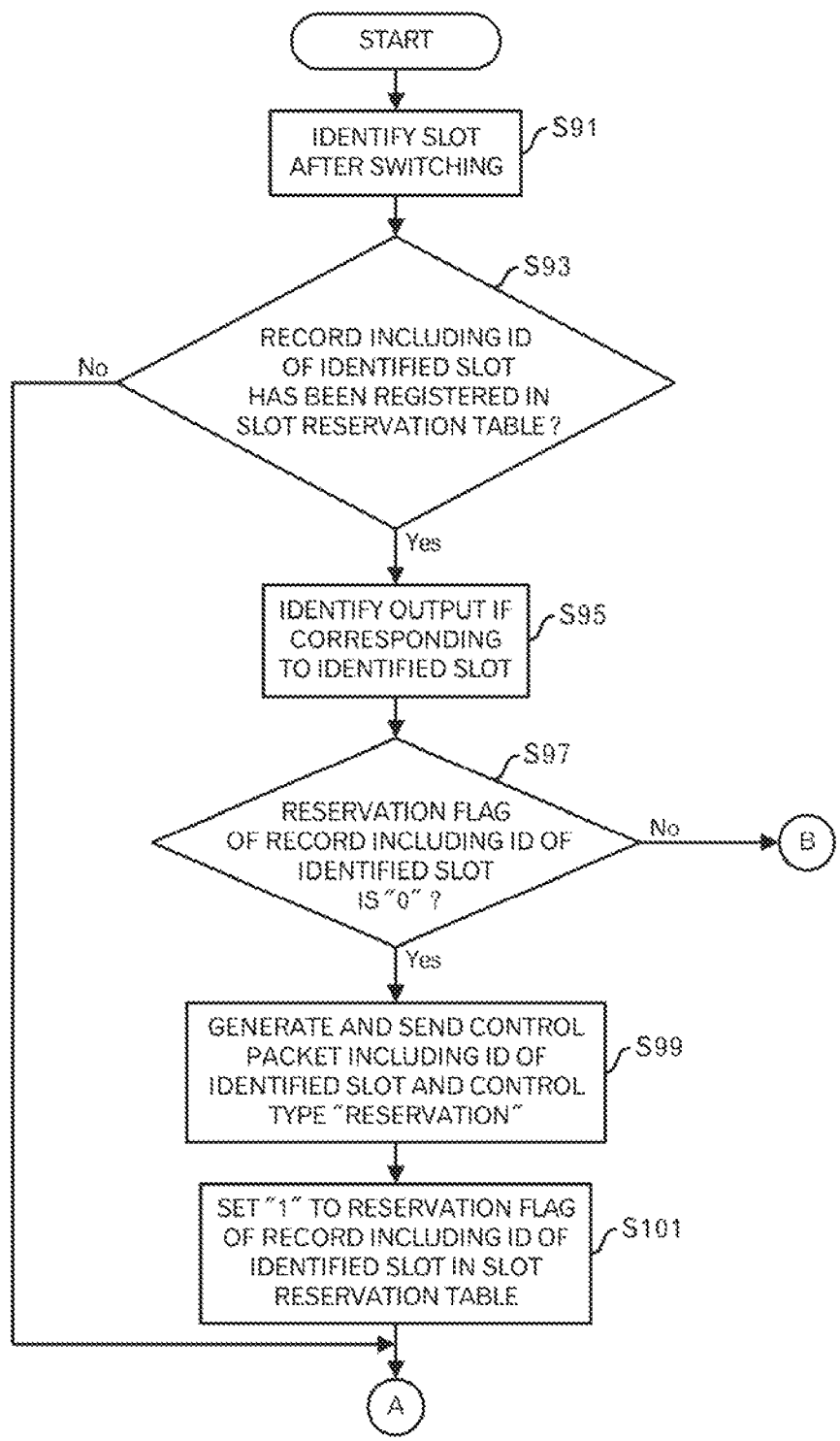
FIG. 31 is a diagram illustrating a flowchart (first part) of a processing executed in the edge router when the time slot is switched over in the first embodiment.
Figure 32:
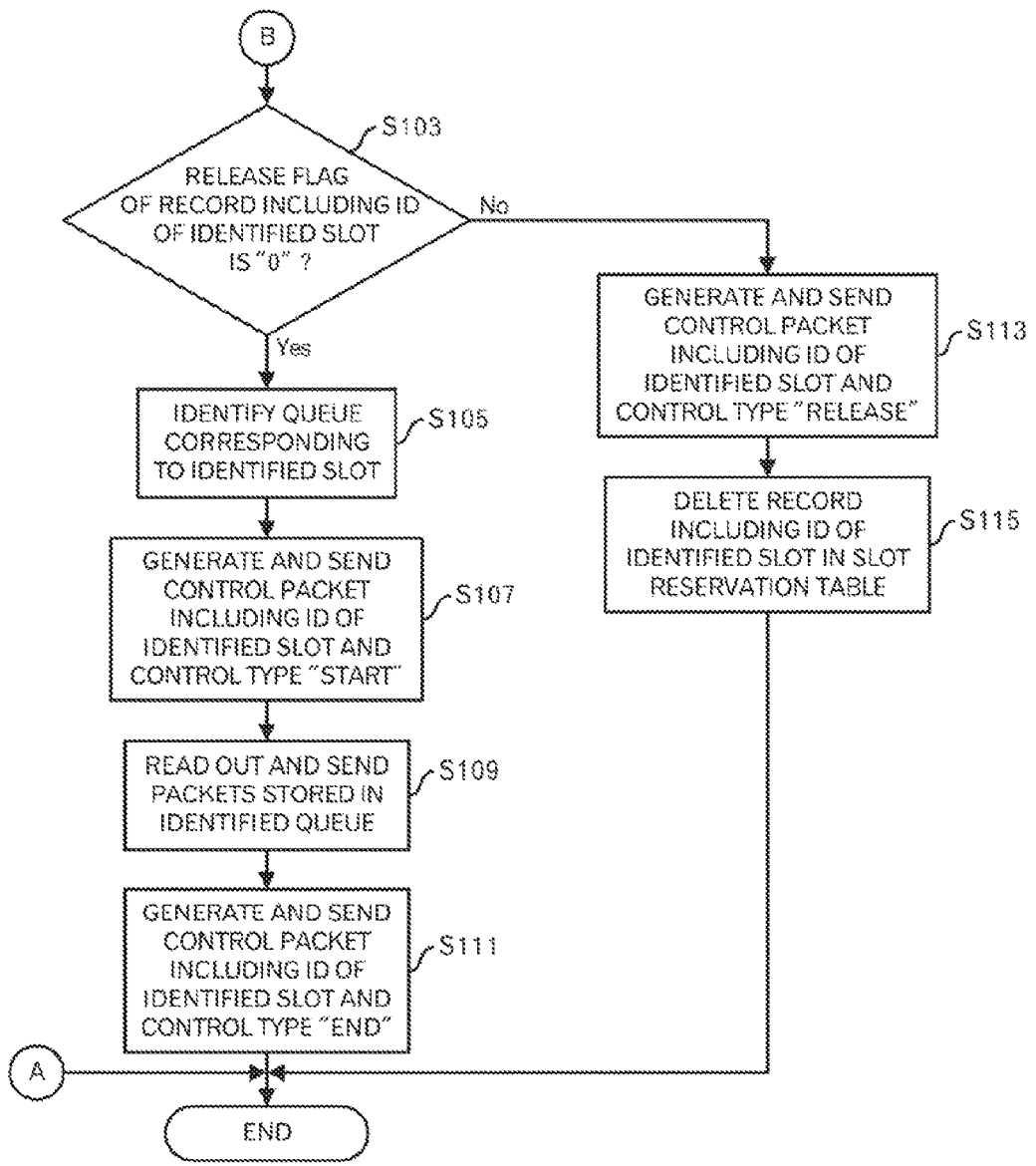
FIG. 32 is a diagram illustrating a flowchart (second part) of the processing executed in the edge router when the time slot is switched over in the first embodiment.

Next, a processing flow for the edge router 1 when the time slot is switched will be explained using FIGS. 31 and 32. Incidentally, the edge router 1 carries out a processing as depicted in FIGS. 31 and 32 every time when the time slot is switched over. For example, the scheduler 115 detects switching of the time slot based on the time synchronization information in a sequential stream of the time slots identified by the slot definition information. Incidentally, by switching, in each edge router 1, the time slot according to the time synchronization information, the time slot can be established.

Then, when the switching of the time slot is detected, the scheduler 115 identified a slot after the switching (FIG. 31: step S91).

Then, the scheduler 115 determines whether or not a record including the ID of the identified slot has been registered in the slot reservation table (step S93). When it is determined that the record including the ID of the identified slot has not been registered in the slot reservation table (step S93: No route), the processing of FIG. 31 ends through a terminal A.

On the other hand, when it is determined that the record including the ID of the identified slot has been registered in the slot reservation table (step S93: Yes route), the scheduler 115 identifies an output interface corresponding to the identified slot from the slot reservation table (step S95).

Then, the scheduler 115 determines whether or not a reservation flag for the record including the ID of the identified slot is "0" (which means that the identified slot is not reserved) in the slot reservation table (step S97). When it is determined that the reservation flag for the record including the ID of the identified slot is "1" (which means that the identified slot is reserved) in the slot reservation table (step S97: No route), the processing shifts to a processing of a processing of step S103 (FIG. 32) through a terminal B.

On the other hand, when it is determined that the reservation flag for the record including the ID of the identified slot is "0" (i.e., the absence of reservation) in the slot reservation table (step S97: Yes route), the scheduler 115 generates a control packet including the ID of the identified slot, control type "reservation" and communication route information, and transmits the generated control packet to the destination edge router through the identified output interface (step S99). Then, the scheduler 115 sets "1" to the reservation flag for the record including the ID of the identified (i.e., the presence of reservation) in the slot reservation table (step S101). After that, the processing of FIG. 31 ends through the terminal A. Incidentally, the processing of the steps S99 and S101 represent a processing relating to the first time slot after the slot assignment.

Shifting to explanation of FIG. 32, after the terminal B, the scheduler 115 judges whether or not a release flag for the record including the ID of the identified slot is "0" (which means that the identified slot is not released) in the slot reservation table (FIG. 32: step S103). When it is determined that the release flag for the record including the ID of the identified slot is "0" (i.e., not released) in the slot reservation table (step S103: Yes route), the scheduler 115 identifies the queue 1071 corresponding to the identified slot (step S105). Then, the scheduler 115 generates a control packet including the ID of the identified slot and control type "start" and transmits the generated control packet to the destination edge router through the identified output interface (step S107). After that, the scheduler 115 reads, from the identified queue 1071, data packets to be transmitted to the destination edge router through the identified output interface, and transmits the data packets to the destination edge router through the identified output interface (step S109). Incidentally, an upper limit of the number of packets that can be transmitted in the time slot is determined depending on the transmission time. Then, the scheduler 115 generates a control packet including the ID of the identified slot and control type "end", and transmits the generated control packet to the destination edge router through the identified output interface (step S111). Thereafter, the processing of FIG. 32 ends. Incidentally, the processing of the steps S105 and S111 represent a processing relating to the second and subsequent time slots after the slot assignment.

On the other hand, when it is determined that the release flag for the record including the ID of the identified slot is "1" (i.e., release) in the slot reservation table (step S103: No route), the scheduler 115 generates a control packet including the ID of the identified slot and control type "release", and transmits the generated control packet to the destination edge router through the identified output interface (step S113). Then, the scheduler 115 deletes the record including the ID of the identified slot from the slot reservation table (step S115). Thereafter, the processing of FIG. 32 ends.

By carrying out the aforementioned processing, because the packet is sent in accordance with the assignment by the management server 5, the communication between the edge routers can be carries out without any packet collisions.

Next, a processing flow for the edge router 1 when a timeout of the timer is detected will be described using FIG. 33. As described above, the packet classification unit 107 starts or restarts the timer when the packet is stored into the queue 1071. Therefore, a timeout occurs unless a new packet is stored within a predetermined period of time. The following explanation will be made while assuming that the timeout of the timer corresponding to any one of the queues 1071 has occurred.

Figure 33:
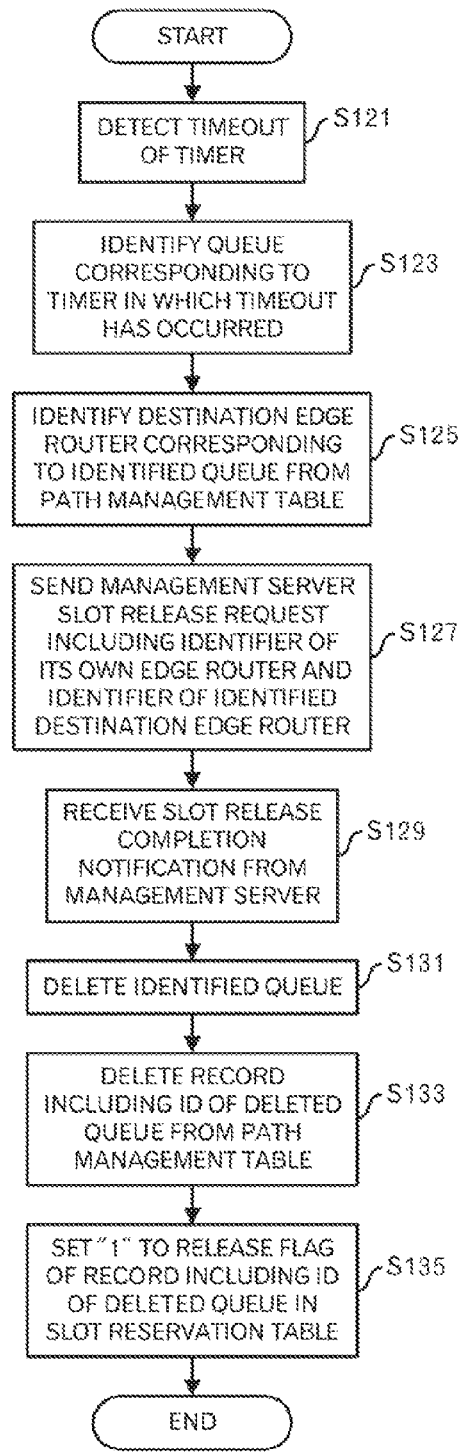
FIG. 33 is a diagram illustrating a flowchart of the processing executed in the edge router upon time-out of a timer.

First, the slot release unit 117 detects a timeout of the timer corresponding to any one of the queues 1071 (FIG. 33: step S121). Then, the slot release unit 117 identifies the queue 1071 corresponding to the timer in which the timeout has occurred (step S123). Then, the slot release unit 117 identifies a destination edge router corresponding to the identified queue 1071 from the path management table (step S125). After that, the slot release unit 117 transmits a slot release request including the identifier of its own edge router and identifier of the identified destination edge router to the management server 5 (step S127).

Thereafter, the slot release unit 117 receives a slot release completion notification including the ID of the released slot from the management server 5 and temporarily stores the received slot release completion notification into the storage device (step S129). Then, the slot release unit 117 outputs, to the packet classification unit 107, an instruction for deleting the identified queue 1071. In response to the instruction from the slot release unit 117, the packet classification unit 107 deletes the identified queue 1071 (step S131).

Then, the slot release unit 117 deletes the record including the ID of the deleted queue 1071 from the path management table (step S133). Moreover, the slot release unit 117 sets "1" (i.e., release) to the release flag for the record, which includes the ID of the deleted queue 1071 in the slot reservation table (step S135). The processing of FIG. 33 then ends.

By carrying out the aforementioned processing, when a packet is not received for a predetermined time or longer, the assigned time slot is released such that the relevant time slot can be reassigned to another packet communication.

Figure 34:
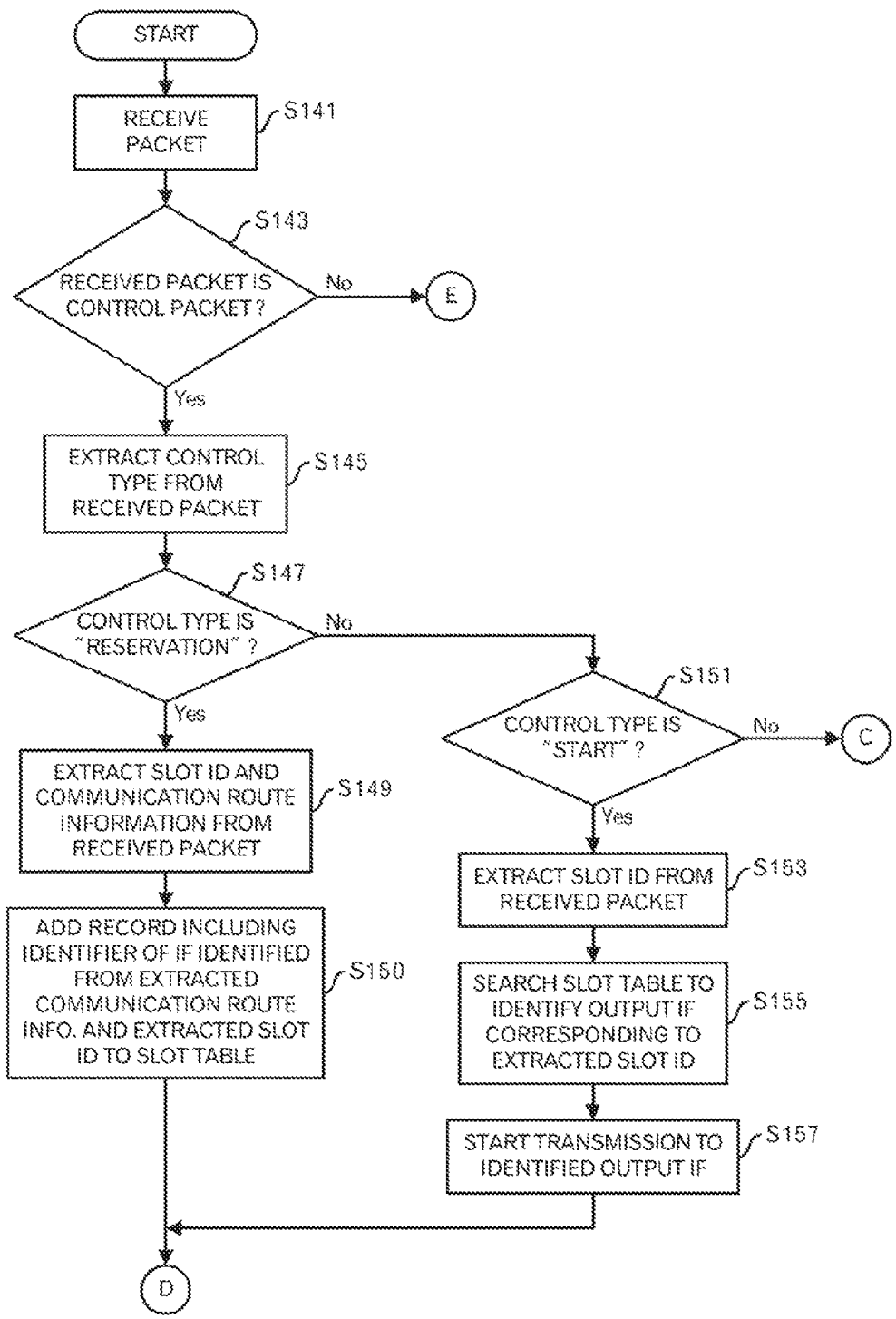
FIG. 34 is a diagram illustrating a flowchart (first part) of a processing executed in the relay router.

Next, a processing flow for the relay router 3 will be explained using FIGS. 34 and 35. First, the forwarding engine 307 receives a packet from the adjacent edge router 1 or the other relay router 3 through the line card 301 (FIG. 34: step S141). Then, the forwarding engine 307 determines whether or not the received packet is the control packet (step S143). When it is determined that the received packet is not the control packet (step S143: No route), the processing shifts to a processing of step S171 (FIG. 35) through a terminal E.

On the other hand, when it is determined that the received packet is the control packet (step S143: Yes route), the forwarding engine 307 extracts the control type from the received packet (step S145). Then, the forwarding engine 307 judges whether or not the extracted control type is "reservation" (step S147). When it is determined that the extracted control type is "reservation" (step S147: Yes route), the forwarding engine 307 extracts the slot ID and communication route information from the received packet (step S149). Incidentally, as illustrated in FIG. 20, for example, the communication route information is included in the control packet having the control type "reservation".

Then, the forwarding engine 307 generates a record including the identifier of an interface, which is identified from the extracted communication route information, and extracted slot ID, and adds the generated record to the slot table (step S150). For example, the forwarding engine 307 identifies, from the communication route information, the relay router 3 through which the packet is going to pass next, and further identifies, from the IF table, the interface coupled to the identified relay router 3. Thereafter, the processing shifts to a processing of step S169 (FIG. 35) through a terminal D.

On the other hand, when it is determined that the extracted control type is not "reservation" (step S147: No route), the forwarding engine 307 determines whether or not the extracted control type is "start" (step S151). When it is determined that the extracted control type is "start" (step S151: Yes route), the forwarding engine 307 extracts the slot ID from the received packet (step S153). Then, the forwarding engine 307 searches the slot table to identify an output interface corresponding to the extracted slot ID (step S155), and starts transmission of packets to the identified output interface (step S157). Namely, the forwarding engine 307 sends out the packets from the input interface to the identified output interface until the control packet (control type: "end") is received, without searching the routing table. The processing shifts to a processing of step S169 (FIG. 35) through the terminal D.

On the other hand, when it is determined that the extracted control type is not "start" (step S151: No route), the processing shifts to a processing of step S159 (FIG. 35) through a terminal C.

Figure 35:
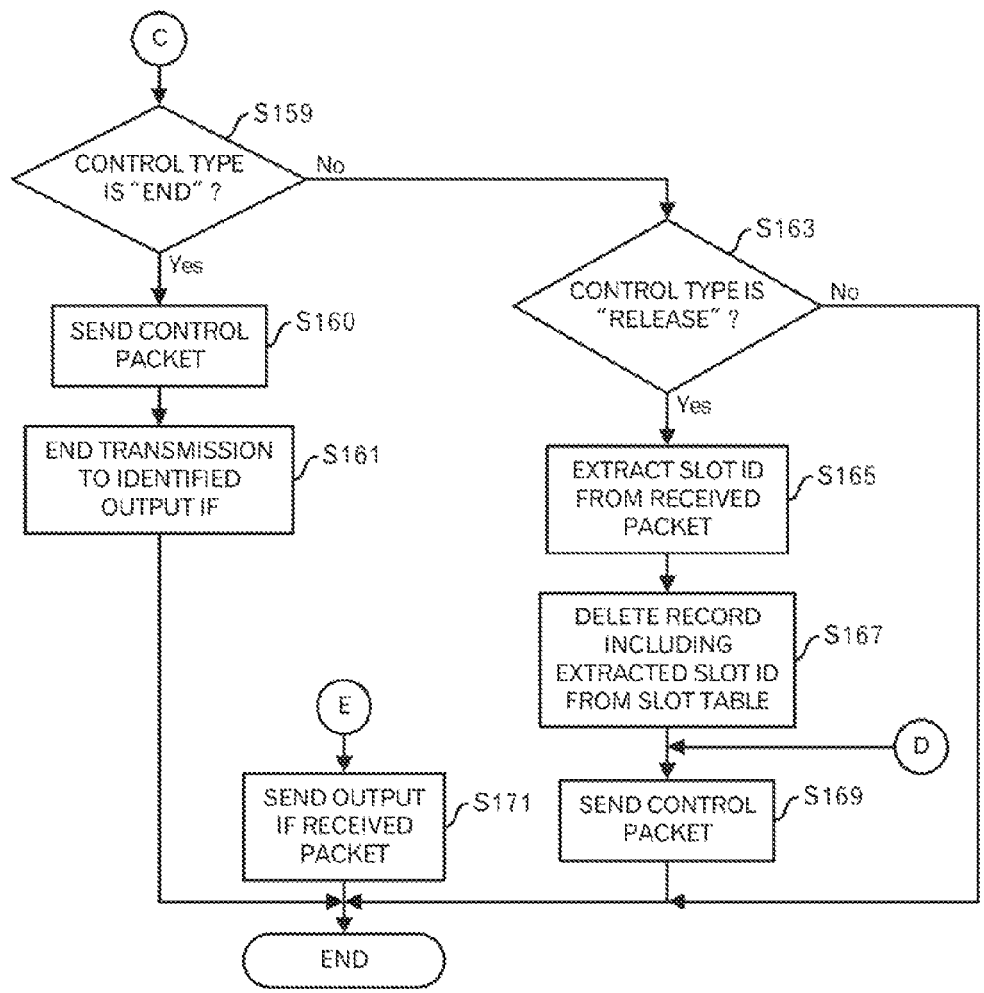
FIG. 35 is a diagram illustrating a flowchart (second part) of the processing executed in the relay router.

Moving to explanation of FIG. 35, after the terminal C, the forwarding engine 307 determines whether or not the extracted control type is "end" (FIG. 35; step S159). When it is determined that the extracted control type is "end" (step S159: Yes route), the forwarding engine 307 sends out the received packet (i.e. control packet) to the adjacent edge router 1 or the other relay router 3 through the identified output interface (step S160). Then, the forwarding engine 307 finishes the transmission of the packets to the identified output interface (step S161). The processing of FIG. 35 then ends.

On the other hand, when it is determined that the extracted control type is not "end" (step S159: No route), the forwarding engine 307 determines whether or not the extracted control type is "release" (step S163). When it is determined that the extracted control type is "release" (step S163: Yes route), the forwarding engine 307 extracts the slot ID from the received packet (step S165). Then, the forwarding engine 307 deletes the record including the extracted slot ID from the slot table (step S167). The processing then shifts to the processing of the step S169.

On the other hand, when it is determined that the extracted control type is not "release" (step S163: No route), the processing of FIG. 35 ends.

In addition, after the terminal D or after the processing of the step S167, the forwarding engine 307 transmits the received packet (i.e. control packet) to the adjacent edge router 1 or the other relay router 3 (step S169), and the processing of FIG. 35 ends.

In addition, after the terminal E, the forwarding engine 307 sends out the received packet (i.e. data packet) to the identified output interface (step S171) and the processing of FIG. 35 ends.

By carrying out the aforementioned processing, the relay router 3 can properly relay the data packet without executing the routing processing. Moreover, since, as described above, the time slot is assigned so as not to cause any packet collisions, the relay router 3 is not required to execute the packet buffering. In other words, the power consumed in the packet buffering and the routing processing can be reduced, and hence the power saving can be improved in the relay router 3.

Assuming the power consumption in the known entire network to be "1", for example, the power consumption in the packet communication system of this embodiment is estimated as follows: Incidentally, it is also assumed that a ratio of the number of edge routers 1 to the number of relay routers 3 is given by (the number of edge routers 1):(the number of relay routers 3)=1:2. Moreover, it is assumed that a percentage of the power consumption by the packet buffering and routing processing in the relay router 3 is 37% of the total power consumption in the relay router 3. Incidentally, such a value (37%) is based on a paper "J. Baliga, R. Ayre, K. Hinton and R. S. Tucker, "Photonic Switch and the Energy Bottleneck", Proc. IEEE Photonics in Switching, August 2007". The value (37%) is the sum of 33.5% for "Forwarding engine" and 3.5% for "Buffers". Furthermore, the power consumption in the edge router 1 is assumed to be the same as that in the conventional art. In addition, the power consumption of the management server 5 is so small as to be negligible in comparison with the total power consumption of a lot of edge routers 1 and relay routers 3.

The power consumption in the packet communication system of this embodiment is equal to $1*(1/3)+(1-0.37)*(2/3)$, which is nearly equal to 0.75

Thus, according to the packet communication system of this embodiment, a power saving of 25% can be realized in the entire network in comparison with the conventional art.

[Second Embodiment]

Next, a second embodiment of the present technique will be explained using FIGS. 36 to 47. In the aforementioned first embodiment, the time slot is reserved or released by the transmission source edge router transmitting the control packet (control type: "reservation" or "release"). In the second embodiment, however, the time slot is reserved or released by the management server 5 transmitting a control message to each of the edge routers 1 and the relay routers 3.

Figures 36, 37:
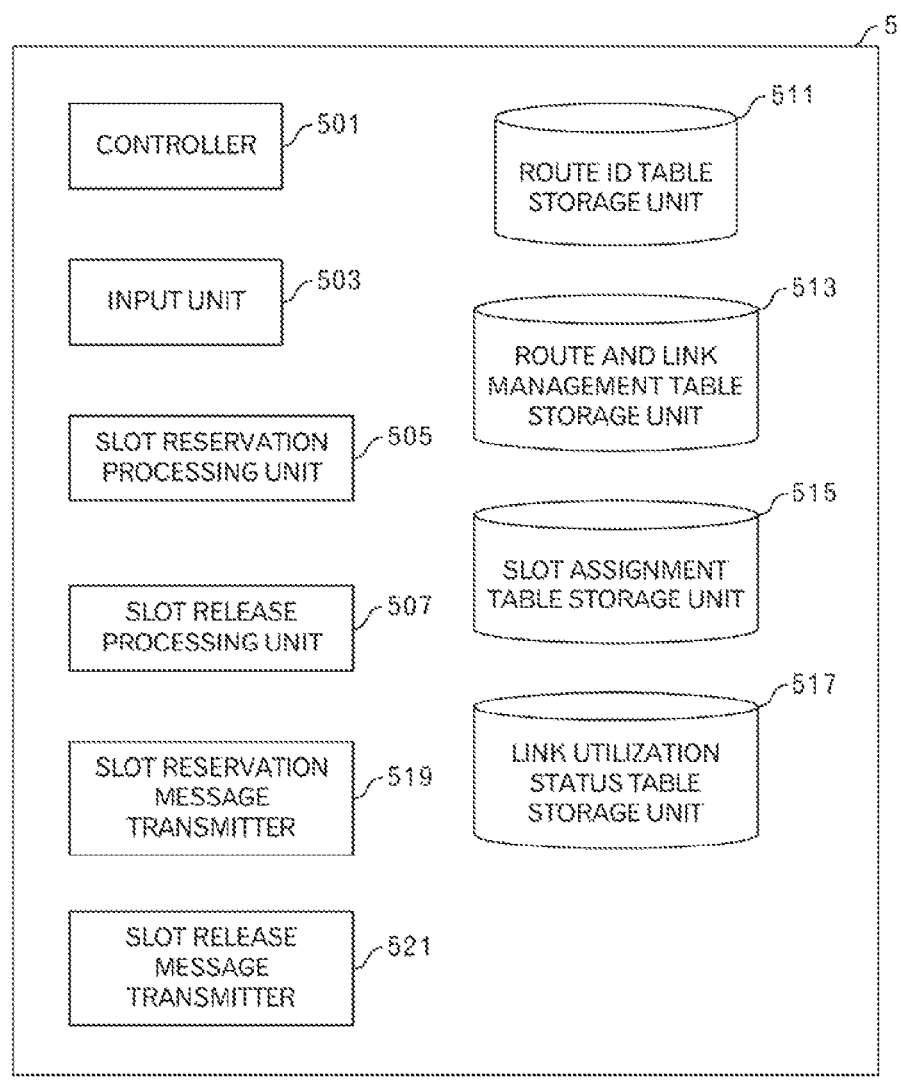
FIG. 36 is a block diagram of a management server in a second embodiment.
FIG. 37 illustrates an example of a slot reservation table.

FIG. 36 is a functional block diagram of the management server 5 in the second embodiment. The management server 5 in the second embodiment includes a controller 501, input unit 503, slot reservation processing unit 505, slot release processing unit 507, slot reservation message transmitter 519, a slot release message transmitter 521, route ID table storage unit 511, route and link management table storage unit 513, slot assignment table storage unit 515 and link utilization status table storage unit 517. Incidentally, the controller 501, input unit 503, slot reservation processing unit 505, slot release processing unit 507, route ID table storage unit 511, route and link management table storage unit 513, slot assignment table storage unit 515 and link utilization status table storage unit 517 are basically the same as those in the first embodiment.

Incidentally, the slot reservation message transmitter 519 carries out a processing for transmitting a slot reservation message, which will be described later. The slot release message transmitter 521 carries out a processing for transmitting a slot release message, which will be described later.

Moreover, the functional block diagrams of the edge router 1 and relay router 3 are basically the same as those illustrated in FIGS. 8 and 9 except for that, in the second embodiment, a slot reservation table illustrated in FIG. 37 is stored in the slot reservation table storage unit 113 of the edge router 1. In an example of FIG. 37, the slot reservation table includes a column of output interface (IF), column of slot ID and column of queue ID. Namely, the slot reservation table of FIG. 37 is provided by excluding the column of the reservation flag and column of the release flag from the slot reservation table (FIG. 13) in the first embodiment.

Next, a processing flow for the entire packet communication system when the time slot is reserved will be described using FIGS. 38 and 39. Incidentally, it is assumed in the second embodiment that, as illustrated in FIG. 38, a management network (NW) for control traffic is constructed between each of the edge routers 1 and relay routers 3 and the management server 5.

Figure 38:
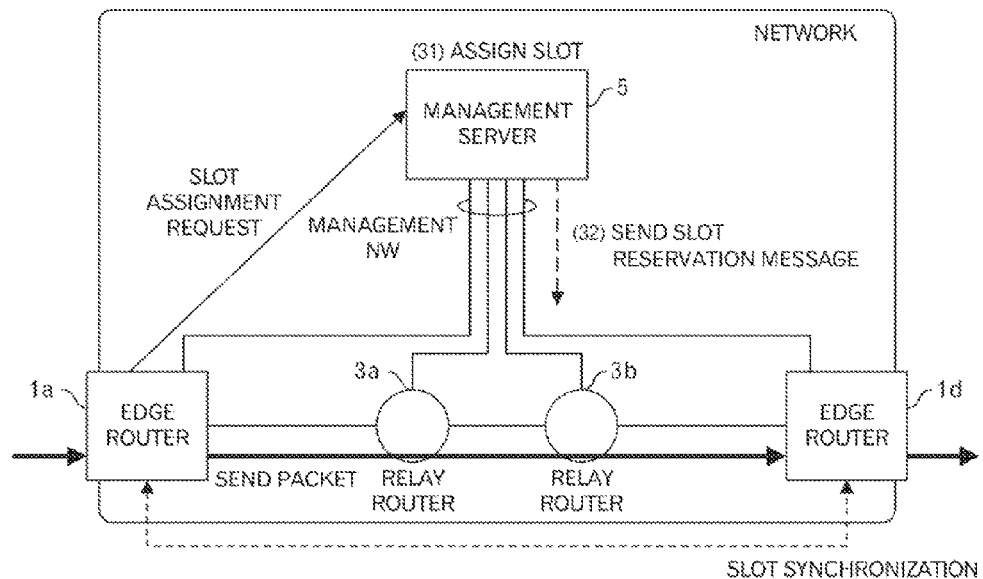
FIG. 38 is a diagram illustrating a flowchart of a processing executed in the entire system when a time slot is reserved in the second embodiment.

In FIG. 38, when receiving the slot assignment request from the edge router 1a, the management server 5 assigns a time slot in which no packet collision occurs, and updates the slot assignment table and link utilization status table (FIG. 38: step (31)). Then, the management server 5 transmits a slot reservation message including an ID of the assigned time slot and communication route information to each of the edge router 1a, the relay router 3a, the relay router 3b, and the edge router 1d (step (32)).

Then, when receiving the slot reservation message from the management server 5, each of the edge router 1a, relay router 3a, relay router 3b and edge router 1d generates a new record based on data included in the received slot reservation message, and further adds the generated record to the slot reservation table or the slot table.

After that, when detecting the switching to the assigned time slot, the edge router 1a transmits a control packet including the time slot ID and control type "start", data packet(s) read out from the queue 1071 and control packet including the time slot ID and control type "end".

Figure 39:
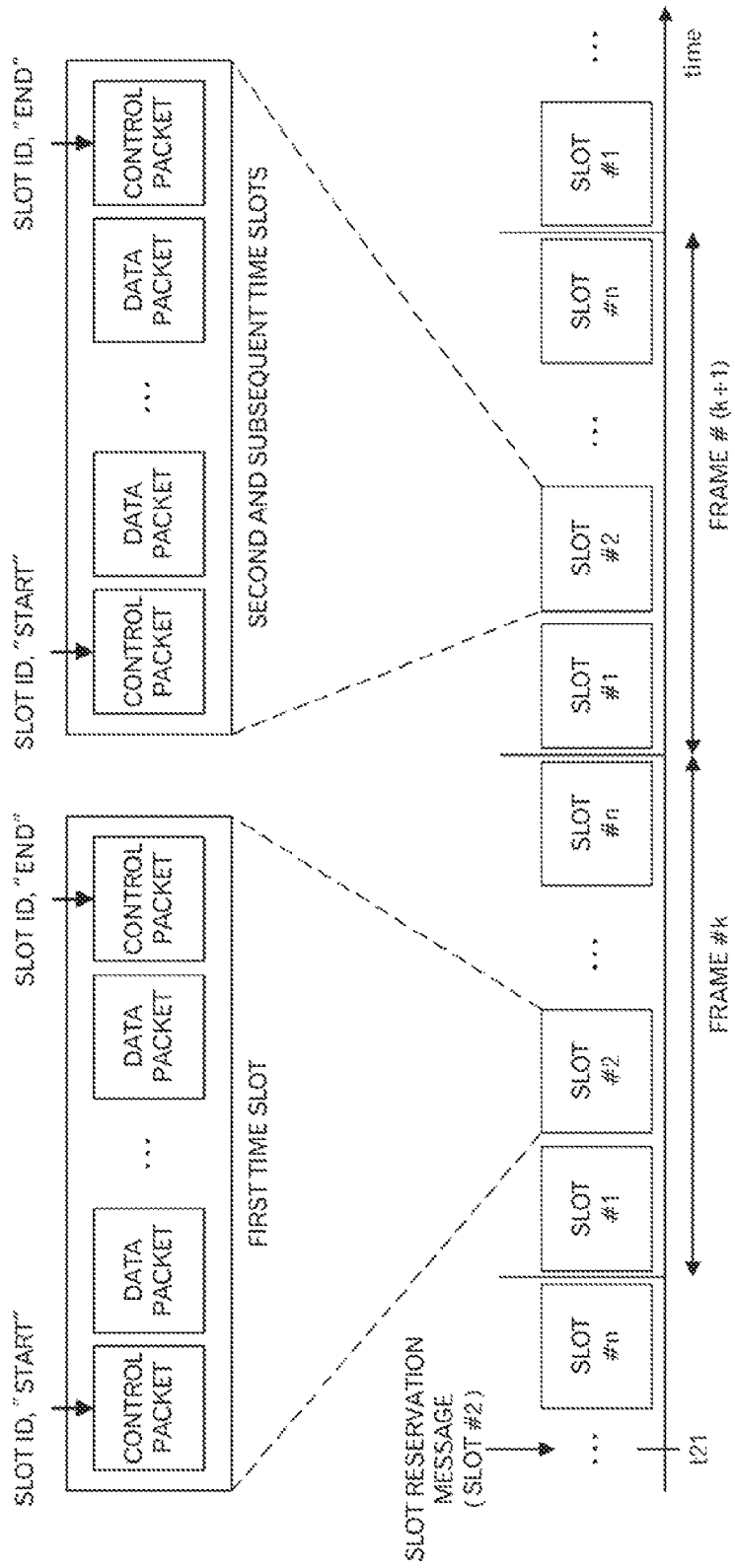
FIG. 39 illustrates a packet sent out in the time slot.

FIG. 39 illustrates a case where, for example, the slot #2 is assigned. In the example of FIG. 39, because the slot reservation message is received at a time t21, the time slot (slot #2) within a frame #k becomes a first time slot after the assignment. Incidentally, the control packet (control type: reservation) is not required to be transmitted in the second embodiment. Therefore, the control packet (control type: start), one or more data packets and control packet (control type: end) are transmitted in the first slot time.

Figure 40:
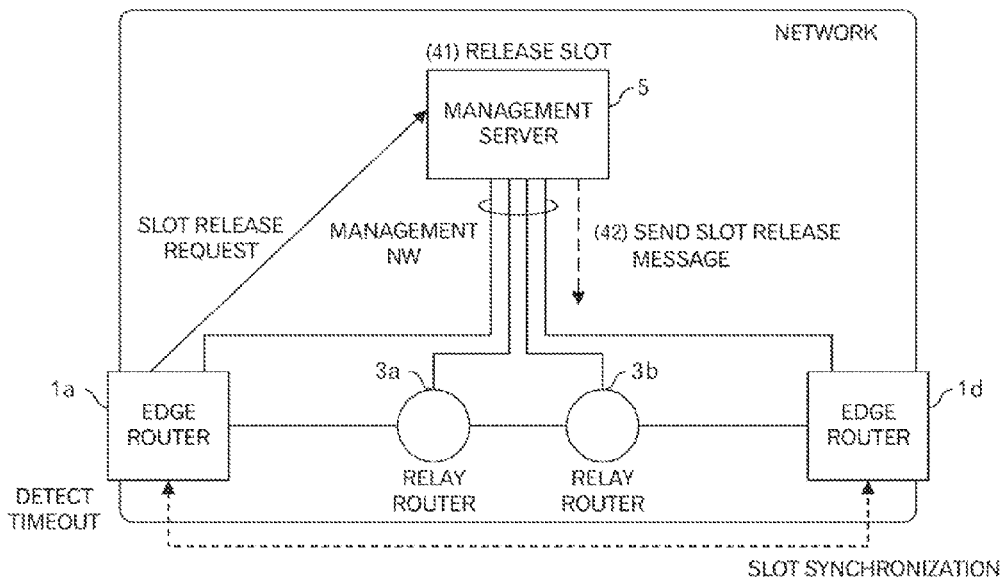
FIG. 40 is a diagram illustrating a flowchart of a processing executed in the entire system when a time slot is released in the second embodiment.

FIG. 40 illustrates a processing flow for the entire packet communication system when the time slot is released. When detecting a timeout of the timer, the edge router 1a, for example, transmits a slot release request to the management server 5. When receiving the slot release request from the edge router 1a, the management server 5 then releases the time slot relating to the slot release request and updates the slot assignment table and link utilization status table (FIG. 40: step (41)). Then, the management server 5 transmits a slot release message including the ID of the released time slot to each of the edge router 1a, relay router 3a, relay router 3b and edge router 1d (step (42)).

Then, when receiving the slot release message from the management server 5, each of the edge router 1a, relay router 3a, relay router 3b and edge router 1d deletes the record including the ID of the released time slot from the slot reservation table or the slot table.

Next, a processing flow for the management server 5 in the second embodiment will be explained below. Incidentally, the processing flow for the management server 5 is basically the same as that explained above in connection with the first embodiment. However, in the second embodiment, a processing illustrated in FIG. 41 (i.e., a slot reservation message transmission processing) is carried out instead of the processing of the step S25. Furthermore, a processing illustrated in FIG. 42 (i.e., a slot release message transmission processing) is carried out instead of the processing of the step S45. Incidentally, it is assumed in the second embodiment that, after the processing of the step S23, the slot reservation processing unit 505 notifies the slot reservation message transmitter 519 of the ID of the assigned slot and communication route information. It is also assumed that, after the processing of the step S43, the slot release processing unit 507 notifies the slot release message transmitter 521 of the ID of the released slot. The respective processing will be explained in the following.

Figure 41:
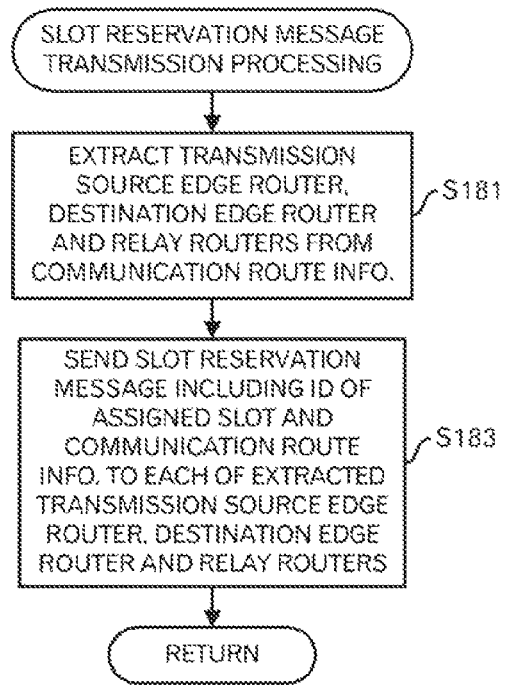
FIG. 41 is a diagram illustrating a flowchart of a slot reservation message transmission processing.

First, the slot reservation message transmission processing is explained using FIG. 41. Incidentally, the slot reservation message transmission processing is carried out by the slot reservation message transmitter 519. Upon receiving the ID of the assigned slot and communication route information from the slot reservation processing unit 505, the slot reservation message transmitter 519 extracts the transmission source edge router, destination edge router and relay router(s) 3 from the communication route information (FIG. 41: step S181). Here, one or more relay routers 3 through which the packet passes until reaching the destination edge router are extracted. Then, the slot reservation message transmitter 519 transmits the slot reservation message including the ID of the assigned slot and communication route information to each of the extracted transmission source edge router, destination edge router and relay routers 3 (step S183). Then, the slot reservation message transmission processing ends, and the processing returns to the calling source processing.

Figure 42:
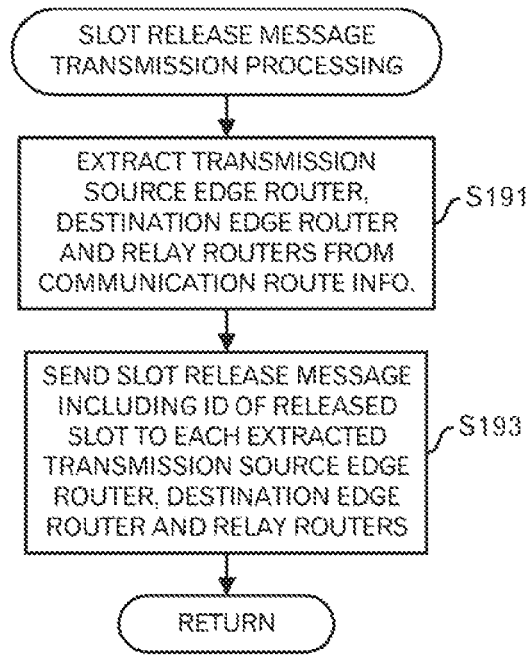
FIG. 42 is a diagram illustrating a flowchart of a slot release message transmission processing.

Next, the slot release message transmission processing will be explained using FIG. 42. Incidentally, the slot release message transmission processing is carried out by the slot release message transmitter 521. Upon receiving the ID of the released slot from the slot release processing unit 507, the slot release message transmitter 521 extracts the transmission source edge router, destination edge router and relay router(s) 3 from the communication route information (FIG. 42: step S191). Here, the relay router or relay routers 3 through which the packet passes until reaching the destination edge router are extracted. Then, the slot release message transmitter 521 transmits the slot release message including the ID of the released slot to each of the extracted transmission source edge router, destination edge router and relay routers 3 (step S193). Then, the slot release message transmission processing ends, and the processing returns to the calling source processing.

Figure 44:
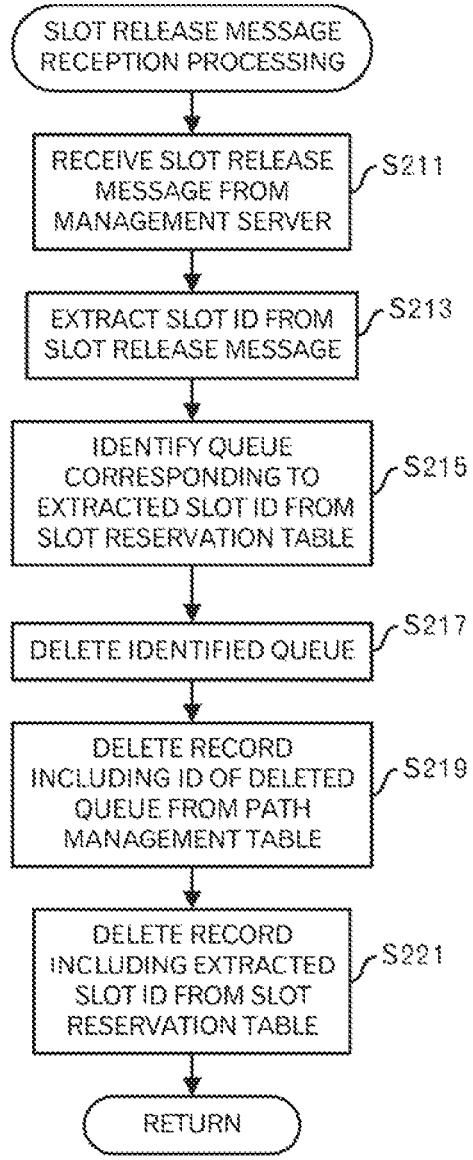
FIG. 44 is a diagram illustrating a flowchart of a slot release message reception processing.
Figure 45:
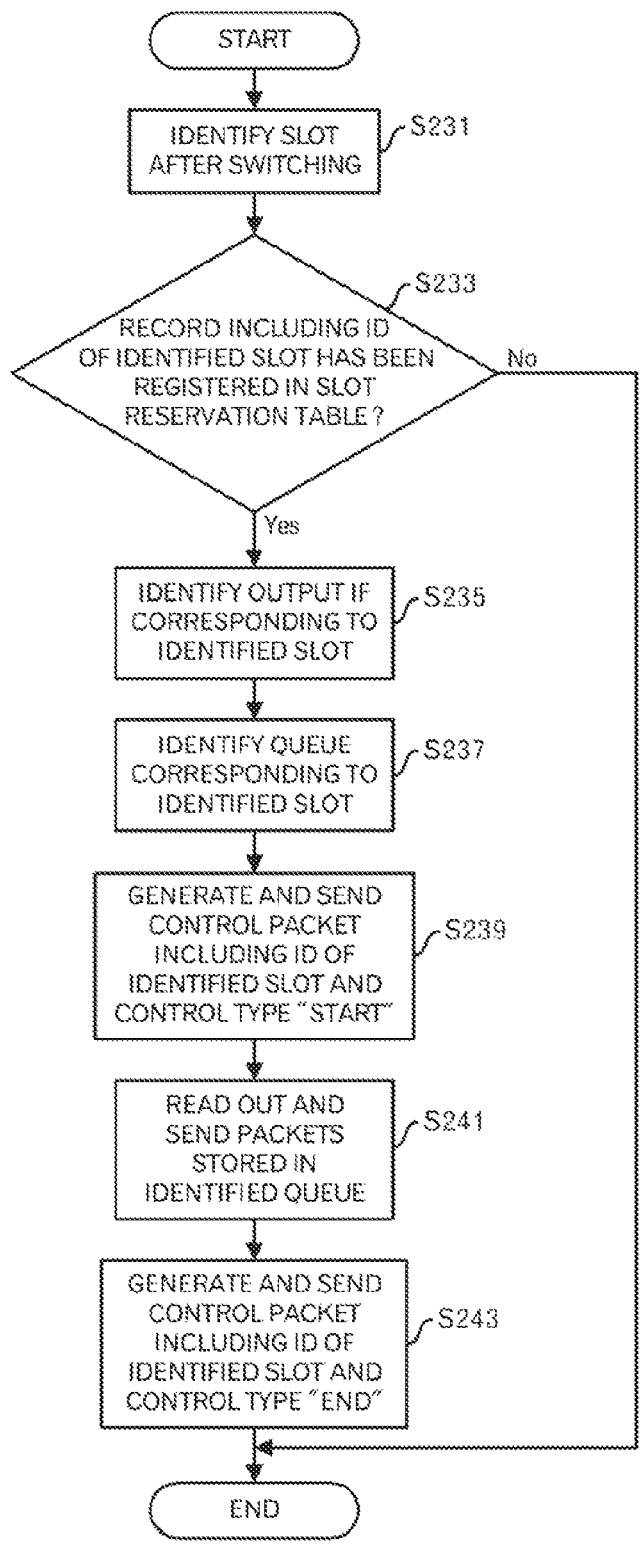
FIG. 45 is a diagram illustrating a flowchart of a processing executed in the edge router when the time slot is switched over in the second embodiment.

Next, a processing flow in the edge router 1 in the second embodiment will be explained below. Incidentally, the processing flow for the edge router 1 is basically the same as that explained above in connection with the first embodiment. However, in the second embodiment, a processing illustrated in FIG. 43 (i.e., a slot reservation message reception processing) is carried out instead of the processing of the steps S75 and S77. Furthermore, a processing illustrated in FIG. 44 (i.e., a slot release message reception processing) is carried out instead of the processing of the steps S129 to S135. In addition, a processing illustrated in FIG. 45 is carried out instead of the processing illustrated in FIG. 31. Each processing will be described in the following.

Figure 43:
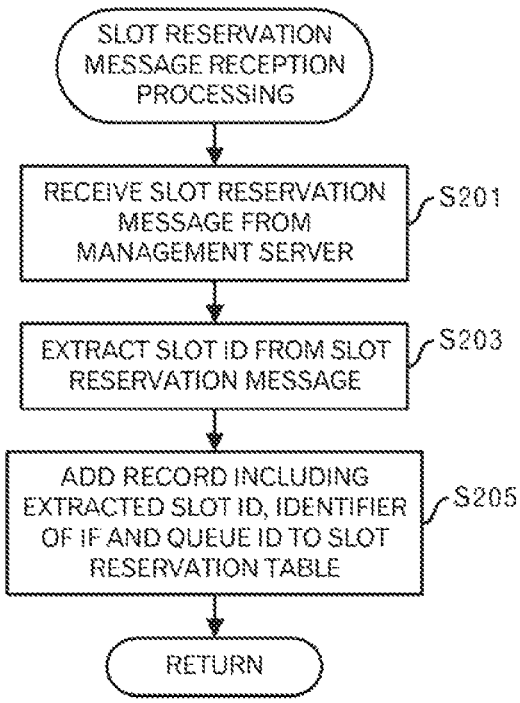
FIG. 43 is a diagram illustrating a flowchart of a slot reservation message reception processing.

First, the slot reservation message reception processing will be explained using FIG. 43. The slot reservation message reception processing is carried out by the slot reservation unit 111. The slot reservation unit 111 receives the slot reservation message from the management server 5 and stores the received slot reservation message into the storage device (FIG. 43: step S201). Then, the slot reservation unit 111 extracts the slot ID from the slot reservation message (step S203). Then, the slot reservation unit 111 identifies an interface from the edge router table in accordance with the communication route information, and identifies a queue ID from the path management table. After that, the slot reservation unit 111 generates a record including the extracted slot ID, identifier of the identified interface and identified queue ID, and adds the generated record to the slot reservation table (step S205). The slot reservation message reception processing then ends, and the processing returns to the calling-source processing.

Next, the slot release message reception processing will be described using FIG. 44. Incidentally, the slot release message reception processing is carried out by the slot release unit 117. The slot release unit 117 receives the slot release message from the management server 5 and stores the received slot release message into the storage device (FIG. 44: step S221). Then, the slot release unit 117 extracts the slot ID from the slot release message (step S213). Moreover, the slot release unit 117 identifies the queue 1071 corresponding to the extracted slot ID from the slot reservation table (step S215). Then, the slot release unit 117 outputs a command instructing deletion of the identified queue 1071 to the packet classification unit 107. After that, the packet classification unit 107 deletes the identified queue 1071 in response to the command from the slot release unit 117 (step S217).

Then, the slot release unit 117 deletes the record including the ID of the deleted queue from the path management table (step S219). Moreover, the slot release unit 117 deletes the record including the extracted slot ID from the slot reservation table (step S221). Then, the slot release message reception processing is ends, and the processing returns to the calling-source processing.

Next, a processing flow for the edge router 1 when the time slot is switched over will be explained using FIG. 45. When the switching of the time slot is detected, the scheduler 115 identifies a slot after the switching (FIG. 45: step S231).

Then, the scheduler 115 determines whether or not the record including the ID of the identified slot has been registered in the slot reservation table (step S233). When it is determined that the record including the ID of the identified slot has not been registered in the slot reservation table (step S233: No route), the processing of FIG. 45 ends.

On the other hand, when it is determined that the record including the ID of the identified slot has been registered in the slot reservation table (step S233: Yes route), the scheduler 115 identifies an output interface corresponding to the identified slot from the slot reservation table (step S235). Moreover, the scheduler 115 identifies a queue 1071 corresponding to the identified slot from the slot reservation table (step S237). The scheduler 115 then generates a control packet including the ID of the identified slot and control type "start", and transmits the generated control packet to the destination edge router through the identified output interface (step S239). Moreover, the scheduler 115 sequentially reads out data packets from the identified queue 107, and transmits those data packets to the destination edge router through the identified output interface (step S241). Then, the scheduler 115 generates a control packet including the ID of the identified slot and control type "end", and transmits the generated control packet to the destination edge router through the identified output interface (step S243). The processing of FIG. 45 then ends.

Next, a processing flow for the relay router 3 in the second embodiment will be explained in the following. The processing flow for the relay router 3 is basically the same as that described above in connection with the first embodiment. However, because the control packets (control type: "reservation" and "release") are not used in the second embodiment, the processing of the step S147 is skipped after the processing of the step S145, and the processing shifts to the step S151. In addition, when it is determined at the step S159 that the control type is not "end" (step S159: No route), the processing ends. Accordingly, in the second embodiment, it is not required to carry out the processing of the steps S149, S150, S165 and S167.

Figure 46:
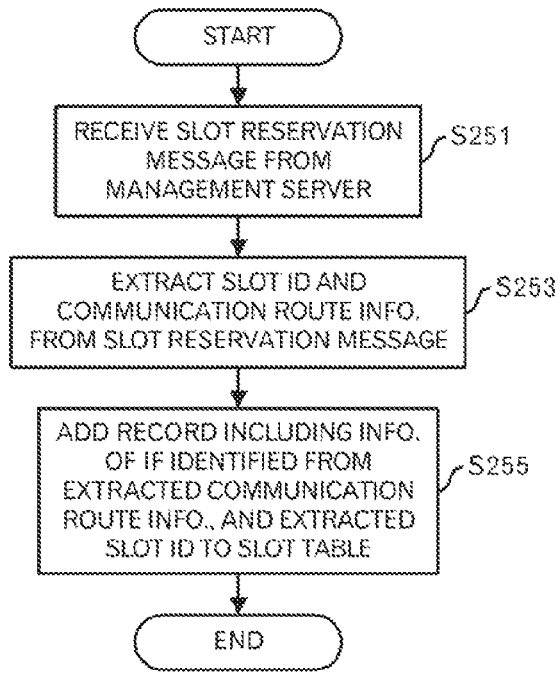
FIG. 46 is a diagram illustrating a flowchart of a processing executed in the relay router when a slot reservation message is received.
Figure 47:
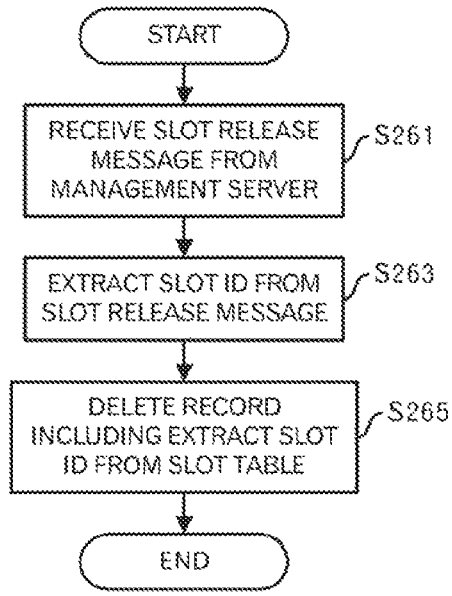
FIG. 47 is a diagram illustrating a flowchart of a processing executed in the relay router when a slot release message is received.

Furthermore, in the second embodiment, the relay router 3 carries out a processing as illustrated in FIG. 46 when receiving the slot reservation message, and the relay router 3 carries out a processing as illustrated in FIG. 47, when receiving the slot release message. Each processing will be described in the following.

First, a processing flow when the slot reservation message is received will be explained using FIG. 46. The forwarding engine 307 receives the slot reservation message from the management server 5, and stores the received slot reservation message into the storage device (FIG. 46: step S251). Then, the forwarding engine 307 extracts the slot ID and communication route information from the slot reservation message (step S253). Moreover, the forwarding engine 307 generates a record including information of an interface identified based on the extracted communication route information and the extracted slot ID, and adds the generated record to the slot table (step S255). The processing of FIG. 46 then ends.

Next, a processing flow when the slot release message is received will be explained using FIG. 47. The forwarding engine 307 receives the slot release message from the management server 5, and stores the received slot release message into the storage device (FIG. 47: step S261). Then, the forwarding engine 307 extracts the slot ID from the slot release message (step S263). Moreover, the forwarding engine 307 deletes the record including the extracted slot ID from the slot table (step S265). Then, the processing of FIG. 47 ends.

With the processing executed as described above, even when the time slot is reserved and released by using the slot reservation message and the slot release message, power saving in the relay router 3 can be achieved similarly to the first embodiment.

[Third Embodiment]

A third embodiment of the present technique will be explained using FIGS. 48 to 53. In the first and second embodiments described above, the time slot to be assigned is determined by the management server 5 based on the link utilization status table. In the third embodiment, however, the time slot to be assigned is determined based on a collision management table that stores collision relationships among the communication routes.

Figures 48, 49:
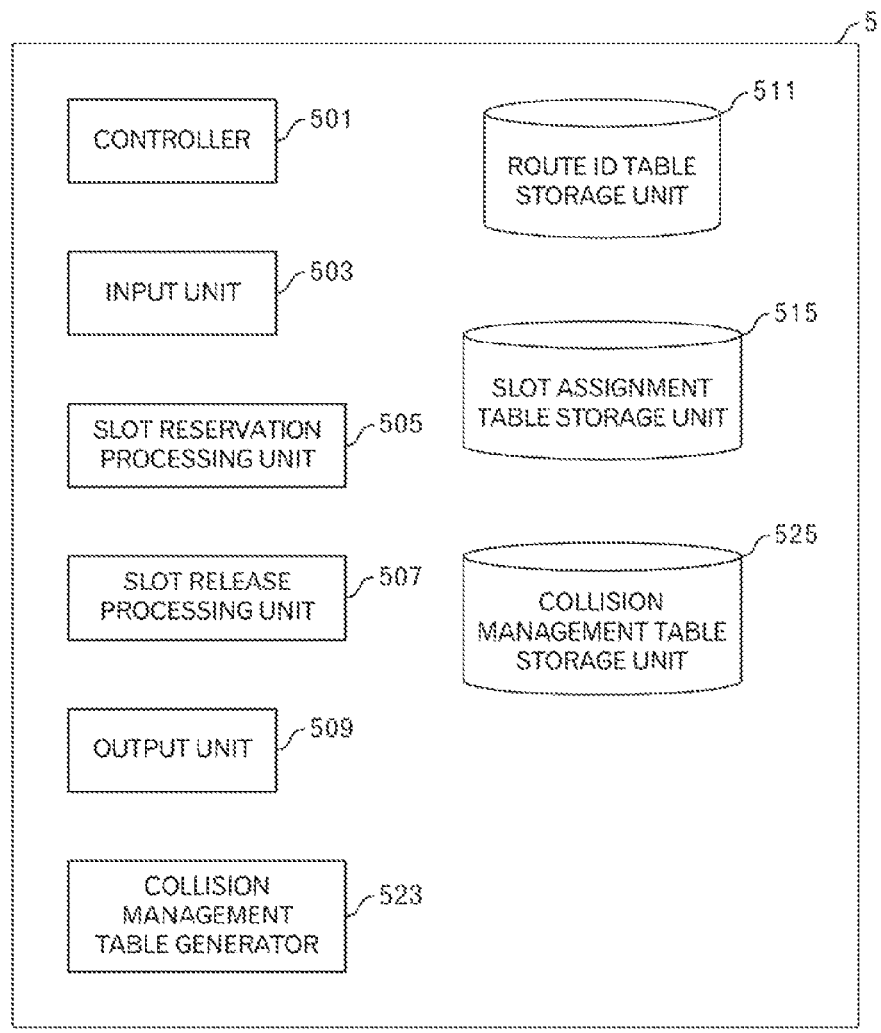
FIG. 48 is a block diagram of a management server in a third embodiment.
FIG. 49 illustrates an example of a collision management table.

FIG. 48 is a functional block diagram of the management server 5 in the third embodiment. The management server 5 in the third embodiment includes a controller 501, input unit 503, slot reservation processing unit 505, slot release processing unit 507, output unit 509, collision management table generator 523, route ID table storage unit 511, slot assignment table storage unit 515 and collision management table storage unit 525. Incidentally, the controller 501, input unit 503, slot reservation processing unit 505, slot release processing unit 507, output unit 509, route ID table storage unit 511 and slot assignment table storage unit 515 are basically the same as those in the first embodiment.

Incidentally, functional block diagrams of the edge router 1 and relay router 3 are basically the same as those illustrated in FIGS. 8 and 9.

Figure 51:
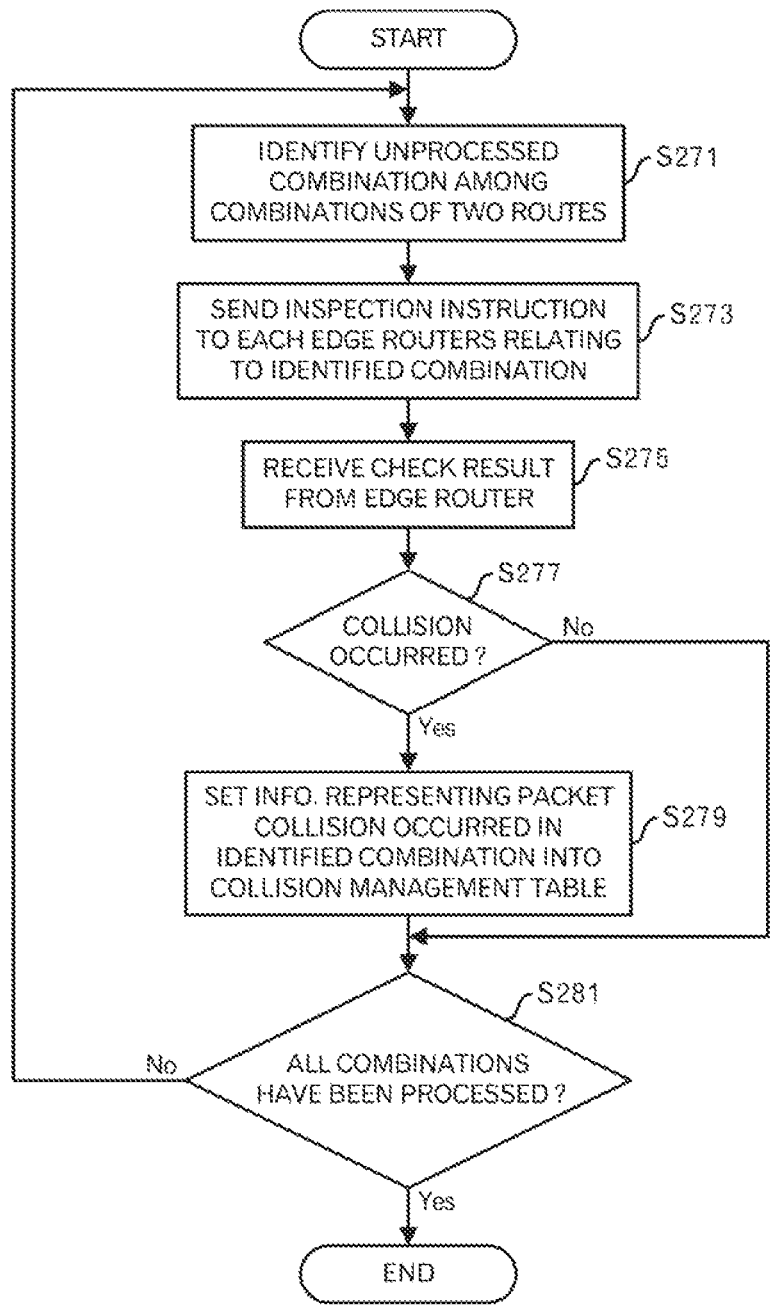
FIG. 51 is a diagram illustrating a flowchart of a processing executed when the collision management table is generated.

The collision management table storage unit 525 stores a collision management table described later. The collision management table generator 523 carries out a processing as illustrated in FIG. 51, and generates the collision management table. The processing of FIG. 51 will be described later.

Figure 50:
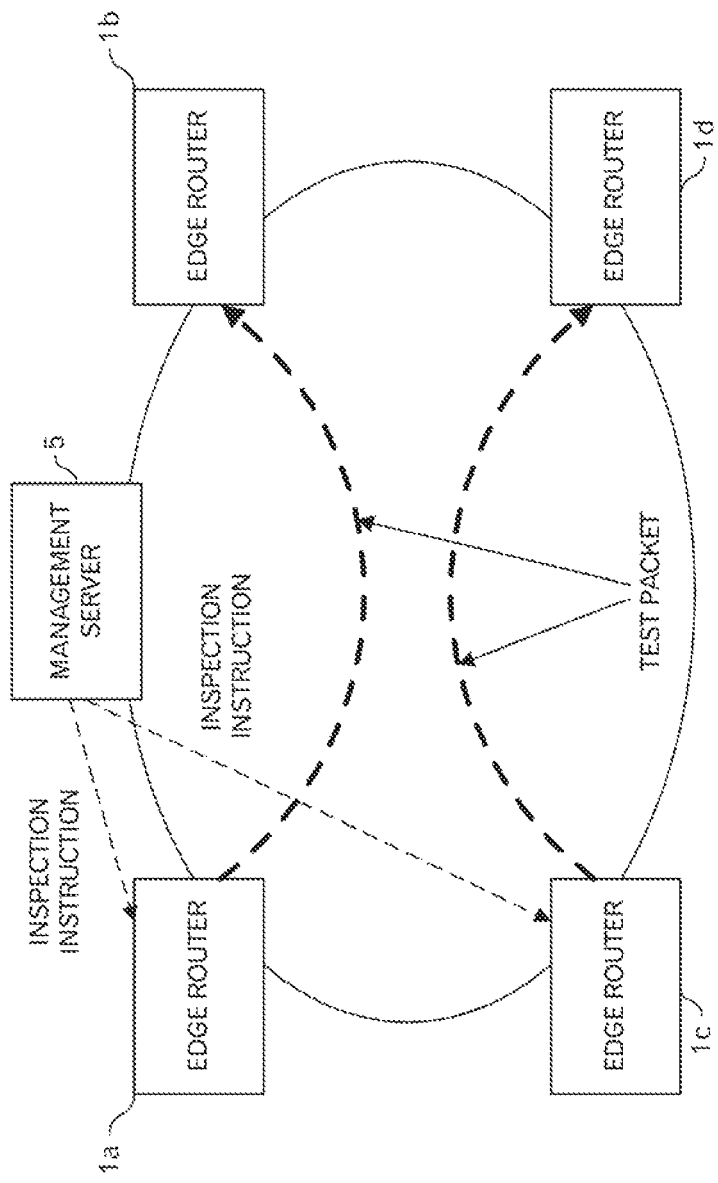
FIG. 50 illustrates checks necessary for generating the collision management table.

FIG. 49 depicts an example of the collision management table stored in the collision management table storage unit 525. In the example of FIG. 49, columns and rows of the collision management table are assigned to the respective route IDs, and in the collision management table, for each combination of the route IDs, it is set whether or not a packet collision for the combination occurs ("x": representing occurrence of a packet collision, and blank: representing no packet collision). Incidentally, the collision management table is set based on check results, for example, which are obtained by carrying out packet collision checks as illustrated in FIG. 50. Namely, it is checked whether or not test packets collide with each other, by simultaneously transmitting the test packets through two routes (e.g., the route between the edge routers 1a and 1b and the between the edge routers 1c and 1d in FIG. 50). More specifically, it is judged whether a packet collision has occurred, by a following determination method. For example, in case where the relay router 3 is held stand-by to start transmission in the event of a packet collision, no packet collision is determined when the test packet reaches the destination edge router in the same time slot as that used for the transmission. Also, in case where the relay router 3 discards the packet in the event of a packet collision, no packet collision is determined when the test packet reaches the destination edge route. Furthermore, in case where the relay router 3 outputs a collision signal to the destination edge router in the event of a packet collision, no packet collision is determined when the collision signal is not detected by the destination edge router. However, any of other suitable determination methods can also be used. Then, the collision management table can be generated by carrying out such a check for each combination of the routes.

Figure 53:
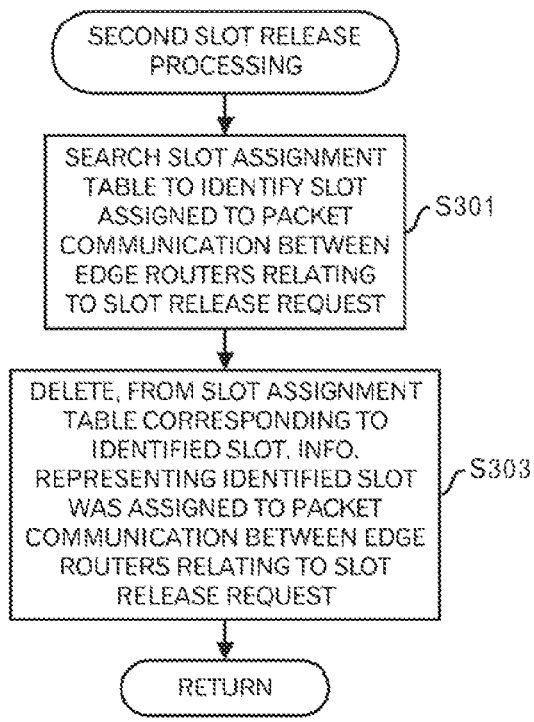
FIG. 53 is a diagram illustrating a flowchart of a second slot release processing.
Figure 52:
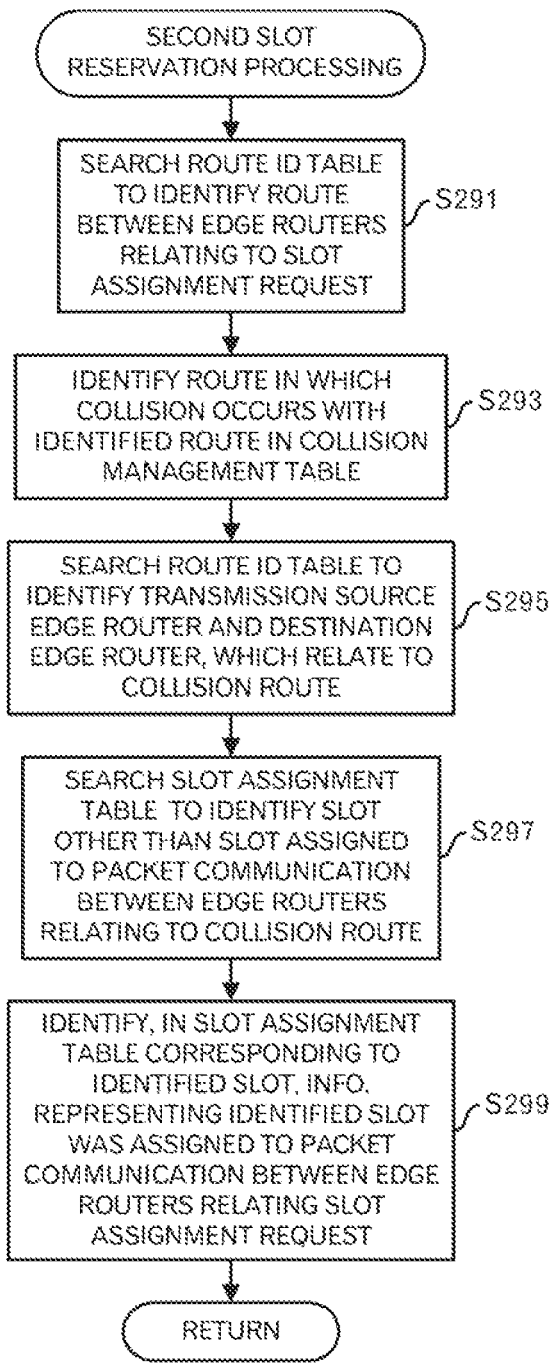
FIG. 52 is a diagram illustrating a flowchart of a second slot reservation processing.

Next, a processing flow for the management server 5 in the third embodiment will be described using FIGS. 51 to 53. Incidentally, the processing flow for the management server 5 is basically the same as that described above in connection with the first embodiment. However, in the third embodiment, a processing as illustrated in FIG. 51 is carried out to generate the collision management table. Furthermore, in the third embodiment, a processing as illustrated in FIG. 52 (i.e., a second slot reservation processing) is carried out instead of the processing of the step S23. Moreover, a processing as illustrated in FIG. 53 (i.e., a second slot release processing) is carried out instead of the processing of the step S43. Each processing will be described below.

First, a processing to generate the collision management table will be described using FIG. 51. Incidentally, the processing as illustrated in FIG. 51 is carried out by the collision management table generator 523 of the management server 5 at an arbitrary timing. First, the collision management table generator 523 identifies an unprocessed combination among the combinations of two routes in accordance with the information regarding the network configuration (FIG. 51: step S271). Then, the collision management table generator 523 transmits a check instruction to each of the edge routers relating to the identified combination (step S273). Incidentally, the check instruction contains information concerning the transmission timing of test packets, transmission source edge router, destination edge router and the like. Then, the edge router 1 that has received the check instruction carries out the check as illustrated in FIG. 50 in accordance with the check instruction.

Thereafter, the collision management table generator 523 receives the check result from the edge routers 1 (step S275), and determines whether or not a collision of the test packets has occurred (step S277). When it is determined that a collision of the test packets has occurred (step S277: Yes route), the collision management table generator 523 sets, in the collision management table, information ("x" in FIG. 49) representing that a packet collision occurs in the identified combination (step S279). Thereafter, the processing shifts to a processing of step S281.

On the other hand, when it is determined that a collision of the test packets has not occurred (step S277: No route), the processing skips the processing of the step S279 and shifts to the processing of the step S281.

Then, the collision management table generator 523 determines whether or not the processing has been completed for all the combinations (step S281). When it is determined that the processing has not yet completed for all the combinations (step S281: No route), the processing returns to the processing of the step S271 and the processing of the steps S271 to S281 is repeated. On the other hand, when it is determined that the processing has been completed for all the combinations (step S281: Yes route), the processing of FIG. 51 ends.

Next, the second slot reservation processing will be explained using FIG. 52. First, the slot reservation processing unit 505 searches the route ID table based on the identifiers of the transmission source edge router and destination edge router, which are included in the slot assignment request, to identify the route between the edge routers relating to the slot assignment request (FIG. 52: step S291).

Then, the slot reservation processing unit 505 identifies, in the collision management table, a route (hereinafter referred to as a "collision route") causing a collision with the identified route (step S293). Furthermore, the slot reservation processing unit 505 searches the route ID table to identify a transmission source edge router and destination edge router, which are related to the collision route (step S295).

Then, the slot reservation processing unit 505 searches the slot assignment table to identify a slot other than the slot assigned to the packet communication between the edge routers relating to the collision route (step S297). Furthermore, the slot reservation processing unit 505 sets, in the slot assignment table corresponding to the identified slot, information representing that the identified slot has been assigned to the packet communication between the edge routers relating to the slot assignment request (step S299). The second slot reservation processing then ends, and the processing returns to the calling source processing.

Next, the second slot release processing will be explained using FIG. 53. First, the slot release processing unit 507 searches the slot assignment table based on the identifiers of the transmission source edge router and destination edge router, which are included in the slot release request, to identify a slot assigned to the packet communication between the edge routers relating to the slot release request (FIG. 53: step S301). Then, the slot release processing unit 507 deletes, from the slot assignment table corresponding to the identified slot, information (a circle mark in FIG. 17) representing that the identified slot has been assigned to the packet communication between the edge routers relating to the slot release request (step S303). The second slot release processing then ends, and the processing returns to the calling source processing.

By carrying out the aforementioned processing, even when the collision management table is used, the power saving in the relay router 3 can be realized similarly to the first embodiment.

[Fourth Embodiment]

In the first to third embodiments, it is presumed that all of the link transmission speeds are equal. However, the link transmission speeds in a network are not always equal, and in some cases, a network is constructed using links having different transmission speeds. In such a case, because, at a node where links having different transmission speeds are coupled, packet buffering and routing processing are carried out, it is not possible to save the power at that node. Therefore, in a fourth embodiment, by providing a relay router 4 that will be explained below as a node where links having different transmission speeds are coupled, the saving of the power can be realized even at a node where links having different transmission speeds are coupled. In the following, the fourth embodiment will be explained using FIGS. 54 to 76.

Figure 54:
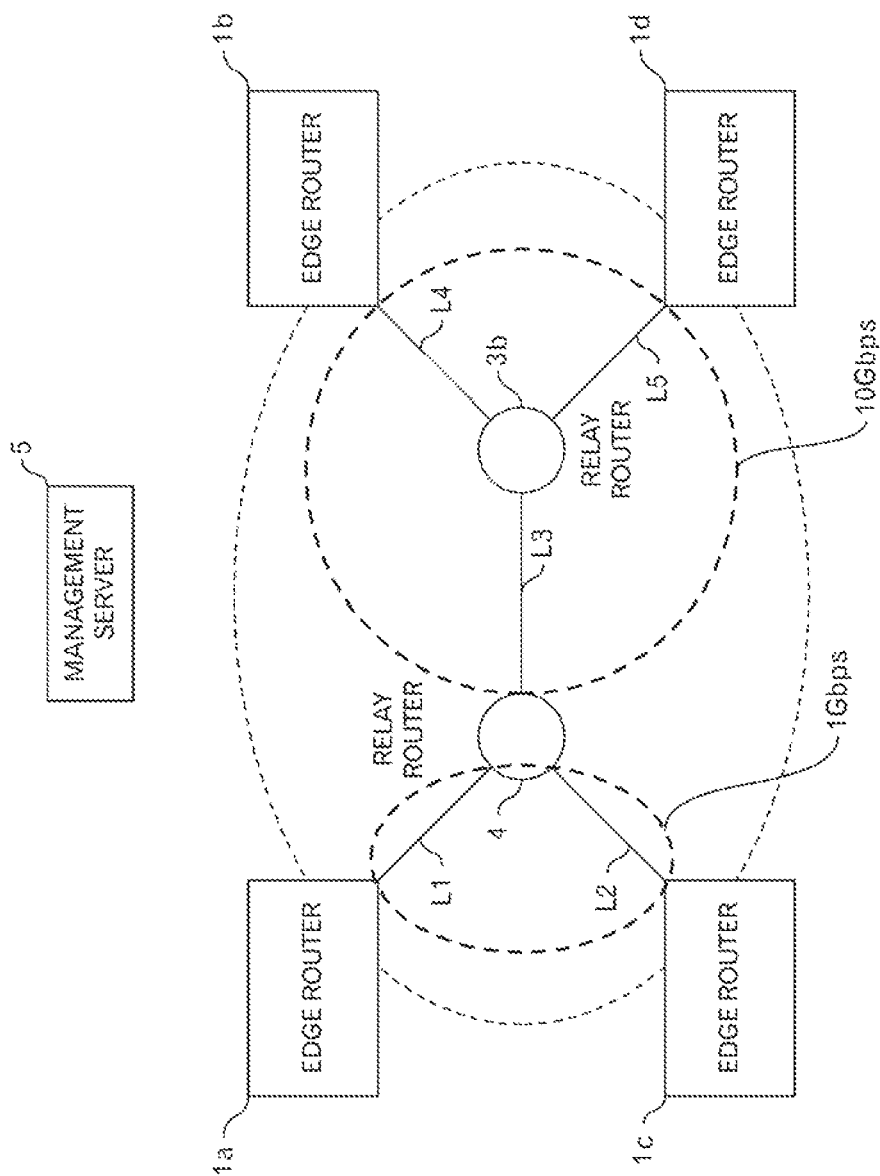
FIG. 54 is a diagram illustrating a network configuration presumed in a fourth embodiment.

In the fourth embodiment, the network configuration as illustrated in FIG. 54, for example, is presumed. In FIG. 54, a relay router 3b is coupled with a relay router 4 via a link L3, is coupled with an edge router 1b via a link L4, and is coupled with an edge router 1d via a link L5. Here, it is assumed that the transmission speed of link L3 to link L5 is 10 Gbps (Gigabit per second). In addition, in FIG. 54, the relay router 4 is coupled with an edge router 1a via a link L1, and is coupled with an edge router 1c via a link L2. Here, it is assumed that the transmission speed of link L1 and link L2 is 1 Gbps. In other words, in the network illustrated in FIG. 54, the relay router 4 is located at the boundary where the transmission speed changes.

Figure 55:
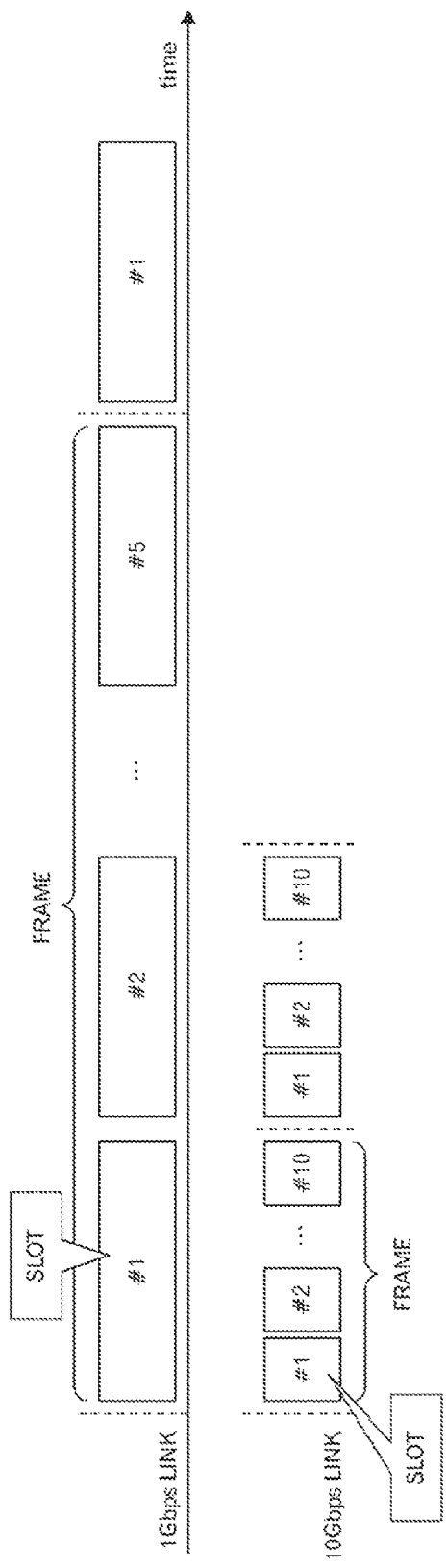
FIG. 55 is a diagram illustrating a relationship between time slots on a high-speed link and time slots on a low-speed link.

Moreover, as illustrated in FIG. 55, in the fourth embodiment, it is assumed one frame in the 1 Gbps link includes five time slots (slot #1 to slot #5, and slot time is 1 ms), and one frame in the 10 Gbps link includes ten time slots (slot #1 to slot #10, and slot time is 1 μs). Furthermore, it is assumed that the time during one time slot in the 1 Gbps link is equal to the time during one frame in the 10 Gbps link.

Figure 56:
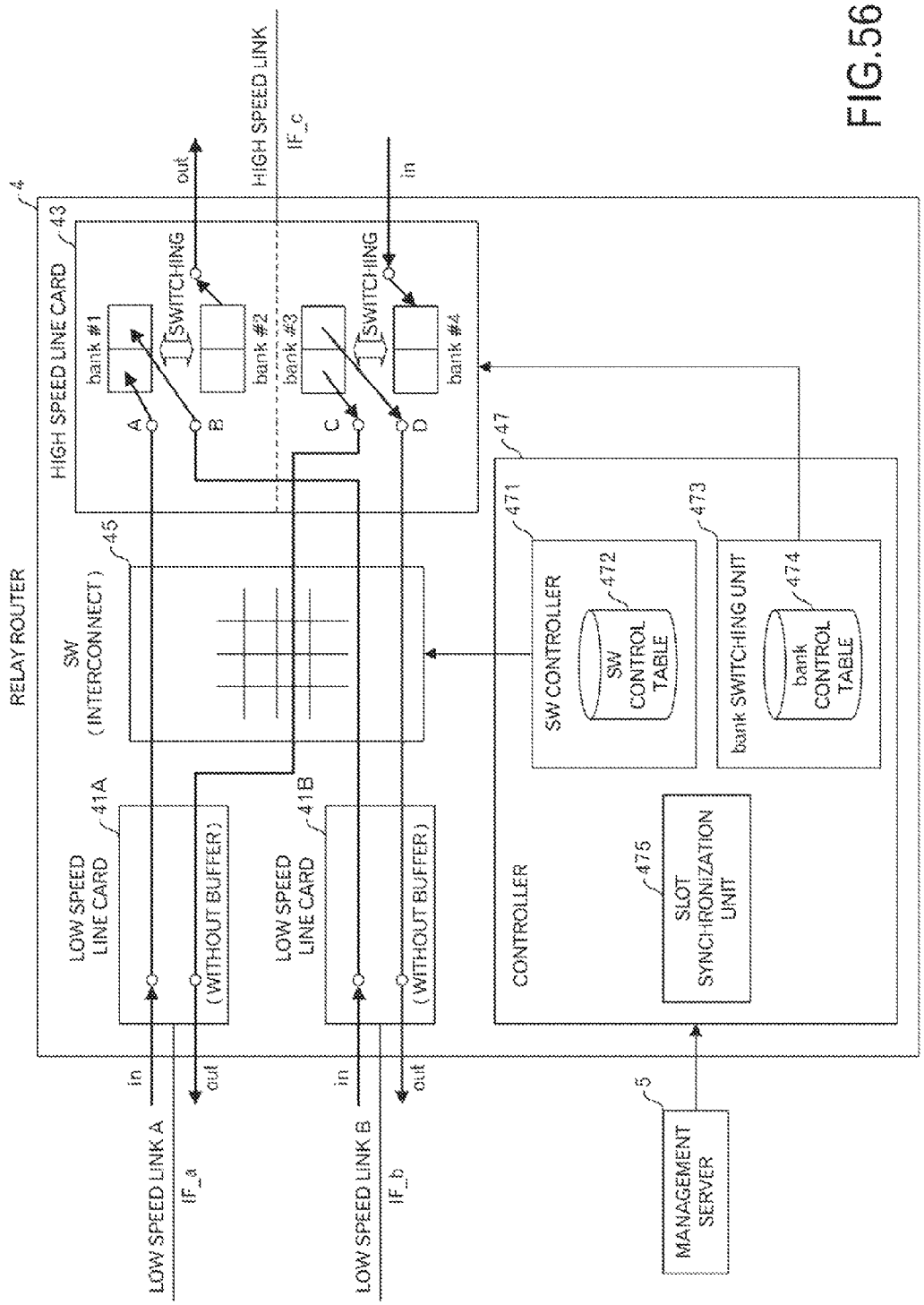
FIG. 56 is a functional block diagram of a relay router in the fourth embodiment.

FIG. 56 illustrates an example of a function block diagram for the relay router 4 illustrated in FIG. 54. Incidentally, the example in FIG. 56 is an example of a function block diagram of a relay router 4 that is coupled to two low-speed links (for example, 1 Gbps links) and one high-speed link (for example, 10 Gbps link). In the example in FIG. 56, the relay router 4 has a low-speed line card 41A that is coupled with the low-speed link A, low-speed line card 41B that is coupled with the low-speed link B, high-speed line card 43 that is coupled to the high-speed link, switch (SW) 45 that couples the line cards, and a controller 47. In the following explanation, the low-speed link A may also be called "IF_a", the low-speed link B may also be called "IF_b", and the high-speed link may also be called "IF_c".

In addition, the high-speed line card 43 also has banks as storage areas for temporarily storing packets. More specifically, there are four banks; two banks (bank #1 and bank #2 in FIG. 56) for temporarily storing packets that flow into a high-speed link from a low-speed link, and two banks (bank #3 and bank #4 in FIG. 56) for temporarily storing packets that flow into a low-speed link from a high-speed link. Furthermore, each bank is divided into storage areas (i.e. buffers) whose number is equal to the number of low-speed line cards 41 (two areas in FIG. 56), with the size of each area being equal to the amount of data for one time slot. In other words, the capacity of one bank is represented as " (the number of low-speed links)*(the data amount of one time slot)".

In addition, it will be explained in more detail later, however, by controlling the SW 45, points A to D inside the high-speed line card 43 are coupled with a low-speed line card 41. Moreover, inside the high-speed line card 43, the points A and B are alternately coupled with the bank #1 and bank #2 for each time slot switching in the low-speed link. Then, the bank that is not coupled with points A and B among the bank #1 and bank #2 is coupled with the output point to the high-speed link. Furthermore, points C and D are alternately coupled with the bank #3 and bank #4 for each time slot of switching in the low-speed link. Then, the bank that is not coupled to points C and D among the bank #3 and bank #4 is coupled with the input point from the high-speed link. Incidentally, the low-speed line card 41 has no packet buffer.

The controller 47 also has a SW controller 471 that controls the SW 45 so as to switch the coupling between line cards, a bank switching unit 473 that instructs the high-speed line card 43 to switch the coupling between the banks and points A to D, and a slot synchronization unit 475. The SW controller 471 has a SW control table 472 that will be explained later. In addition, the bank switching unit 473 has a bank control table 474 that will be explained later.

FIGS. 57A and 57B illustrate examples of data stored in the SW control table 472. FIG. 57A illustrates data concerning packet transmission from the 1 Gbps link to the 10 Gbps link, and FIG. 57B illustrates data concerning packet transmission from the 10 Gbps link to the 1 Gbps link. As illustrated in FIGS. 57A and 57B, the SW control table 472 includes a slot ID (1 Gbps link) column, a connection source (From) column and a connection destination (To) column. Incidentally, in FIGS. 57A and 57B, IF_a(in) represents the input point in the low-speed line card 41A from IF_a, and IF_a(out) represents the output point in the low-speed line card 41A to IF_a. Also, IF_b(in) represents the input point in the low-speed line card 41B from IF_b, and IF_b(out) represents the output point in the low-speed line card 41B to IF_b. Furthermore, IF_c(A/B/C/D) represents point A, point B, point C or point D in the high-speed line card 43. For example, FIG. 57A illustrates that, in any time slot of the 1 Gbps link, IF_a(in) is to be coupled with IF_c(A), and IF_b(in) is to be coupled with IF_c(B). Moreover, FIG. 57B illustrates that, in any time slot of the 1 Gbps link, IF_c(C) is to be coupled with IF_a(out), and IF_c(D) is to be coupled with IF_b(out).

FIGS. 58A and 58B illustrate examples of data stored in the bank control table 474. FIG. 58A illustrates data concerning packet transmission from the 1 Gbps link to the 10 Gbps link, and FIG. 58B illustrates data concerning packet transmission from the 10 Gbps link to the 1 Gbps link.

In the example of FIG. 58A, data for switching the coupling between points A and B and banks (data illustrated in the upper half of FIG. 58A), and data for switching the coupling between IF_c(out) and banks (data illustrated in the lower half of FIG. 58A) are stored. As illustrated in FIG. 58A, data for switching the coupling between the points A and B and the banks includes a slot ID (1 Gbps link), connection source (From) and connection destination (To). Similarly, as illustrated in FIG. 58A, data for switching the coupling between IF_c(out) and the banks includes a slot ID (10 Gbps link), connection source (From) and connection destination (To). In FIG. 58A, n means the current slot number (1 Gbps link). Moreover, "bank-$o_n$" means the bank of bank #1 and bank #2, which is coupled to the points A and B during slot #n (1 Gbps link). Furthermore, bank-$o_{n-1}$ means the bank of bank #1 and bank #2, which is coupled to the points A and B, for slot #n-1 (1 Gbps link). Moreover, bank #i (a) means buffer a in bank #i, and bank #i(b) means buffer b in bank #i. For example, in the functional block diagram illustrated in FIG. 56, the area on the left side of each bank is buffer a, and the area on the right side is buffer b. Also, in FIG. 58A, it is represented that bank-$o_{n-1}$(a) and IF_c(out) are to be coupled during slot #1 (10 Gbps link), and it is represented that bank-$o_{n-1}$(b) and IF_c(out) are to be coupled during slot #2 (10 Gbps link).

Furthermore, in the example in FIG. 58B, data for switching the coupling between points C and D and the banks (data in the upper half in FIG. 58B), and data for switching the coupling between IF_c and the banks (data in the lower half in FIG. 58B) are stored in the bank control table 474. As illustrated in FIG. 58B, data for switching the coupling between points C and D and the banks includes a slot ID (1 Gbps link), connection source (From) and connection destination (To). Similarly, as illustrated in FIG. 58B, data for switching the coupling between the input point from a high-speed link and the banks includes a slot ID (10 Gbps link), connection source (From) and connection destination (To). In FIG. 58B, n means the current slot number (1 Gbps link). Then, bank-$i_n$ means the bank of bank #3 and bank #4, which is coupled to IF_c(in) during the slot #n (1 Gbps link). Furthermore, bank-$i_{n-1}$ means the bank of bank #3 and bank #4, which is coupled to IF_c(in) during the slot #n-1 (1 Gbps link). Moreover, in the example in FIG. 58B, it is represented that during the slot #1 (10 Gbps link), IF_c(in) and bank-$i_n$(a) are to be coupled, and that, during the slot #2 (10 Gbps link), IF_c(in) and bank-$i_n$(b) are to be coupled.

Figure 59A:
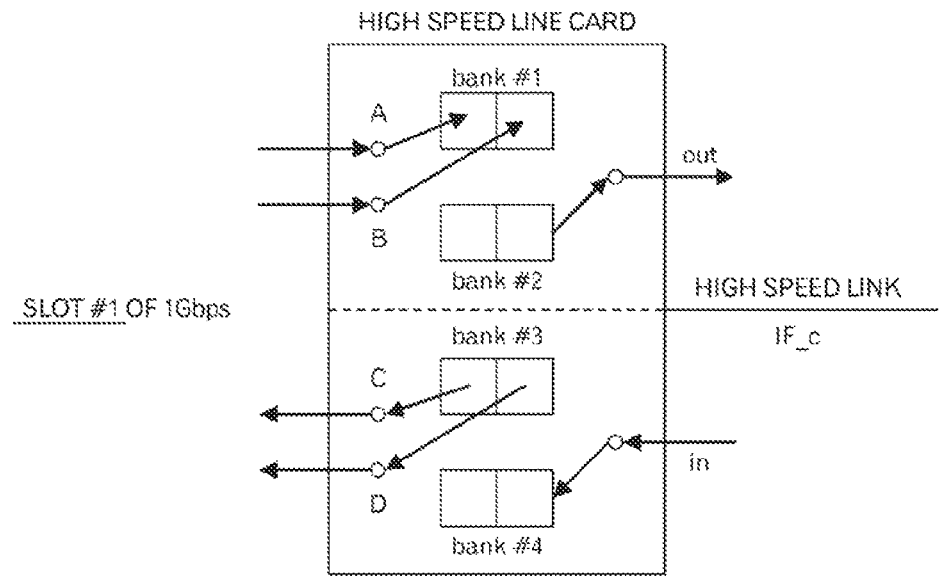
FIGS. 59A and 59B are diagrams to explain switching banks.
Figure 59B:
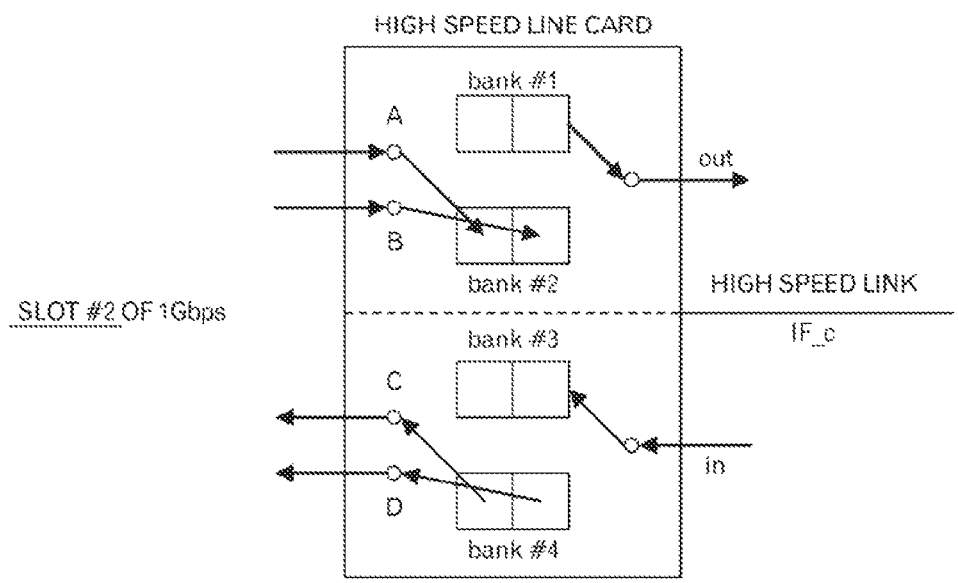

For example, in the fourth embodiment, bank switching is carried out as illustrated in FIGS. 59A and 59B. Incidentally, FIG. 59A illustrates the coupling state of the banks in the slot #1 (1 Gbps link), and FIG. 59B illustrates the coupling state of the banks in slot #2 (1 Gbps link). Incidentally, the area on the left side of each bank is called buffer a, and the area on the right side is called buffer b. In FIG. 59A, point A is coupled to the bank #1(a), and point B is coupling to bank #1(b). Furthermore, IF_c(out) is coupled to bank #2. Incidentally, IF_c(out) is coupled to either bank #2(a) or bank #2(b) according to the time slot in the 10 Gbps link. Also, in FIG. 59A, point C is coupled to bank #3(a) and point D is coupled to bank #3(b). Furthermore, IF_c(in) is coupled to bank #4. Incidentally, IF_c(in) is coupled to either bank #4(a) or bank #4(b) according to the time slot in the 10 Gbps link.

Moreover, in FIG. 59B, point A is coupled to bank #2(a), and point B is coupled to bank #2(b). Furthermore, IF_c(out) is coupled to bank #1. Incidentally, IF_c(out) is coupled to either bank #1(a) or bank #1(b) according to the time slot in the 10 Gbps link. In FIG. 59B, point C is coupled to bank #4(a), and point D is coupled to bank #4(b). Furthermore, IF_c(in) is coupled to bank #3. Incidentally, IF_c(in) is coupled to either bank #3(a) or bank #3(b) according to the time slot in the 10 Gbps link. Incidentally, it is not illustrated in the figure, however, in the case of the slot #3 (1 Gbps), the coupling state becomes again a state as illustrated in FIG. 59A.

Figure 60:
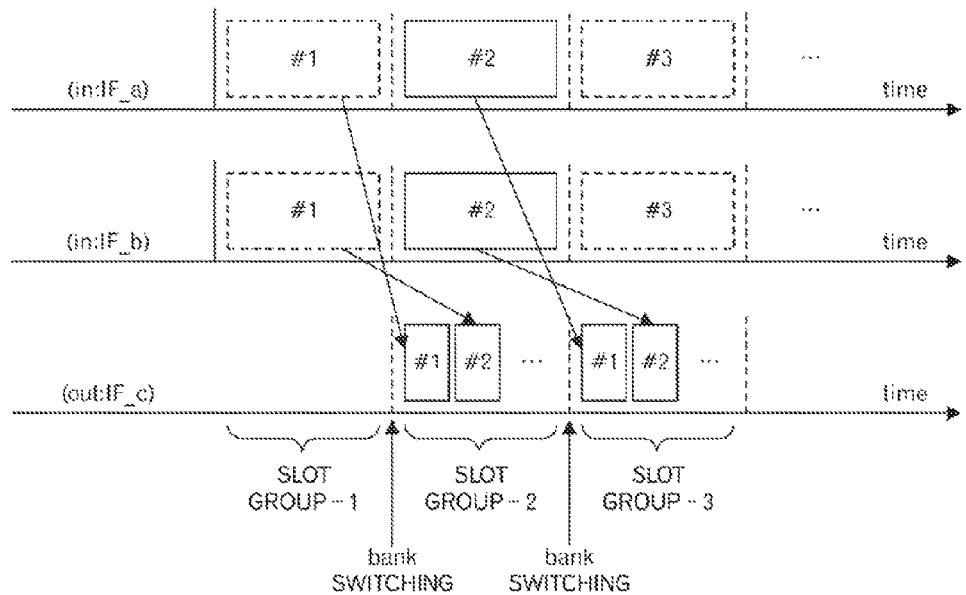
FIG. 60 is a diagram to explain relay operation (low-speed link to high-speed link) of the management server in the fourth embodiment.
Figure 61:
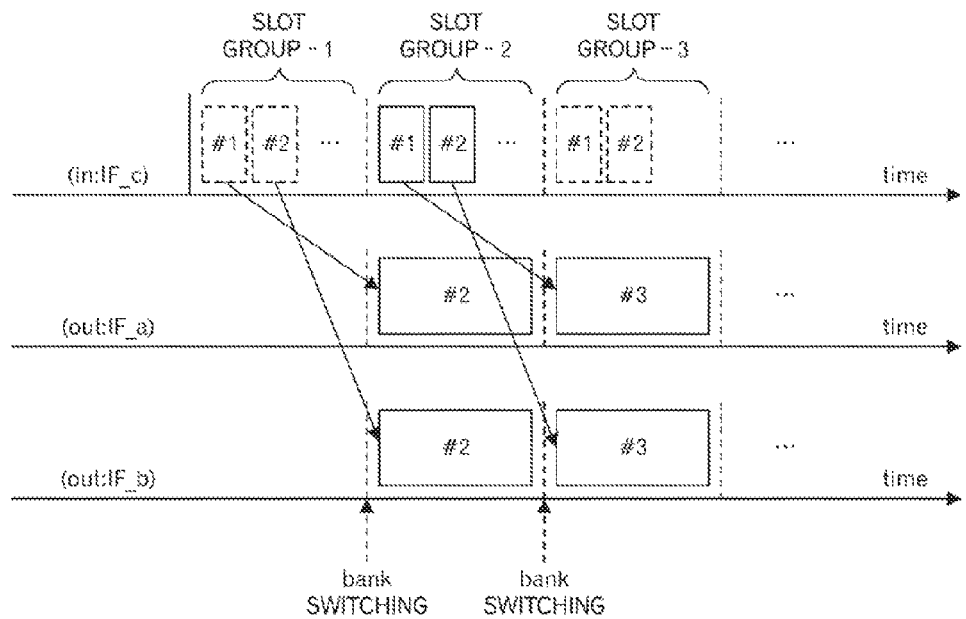
FIG. 61 is a diagram to explain relay operation (high-speed link to low-speed link) of the management server in the fourth embodiment.

By carrying out bank switching as illustrated in FIGS. 59A and 59B, the relay router 4 carries out a relay operation as illustrated in FIGS. 60 and 61. Incidentally, FIG. 60 illustrates a relay operation for packet transmission from the 1 Gbps link to the 10 Gbps link. In FIG. 60, the relay router 4 temporarily stores packets received from IF_a and IF_b into bank #1 during the period of slot group 1 (in other words, slot #1 of the 1 Gbps link). Then, in slot #1 of the 10 Gbps link in slot group 2 (in other words, slot #2 of the 1 Gbps link), the relay router 4 reads out the packets received from IF_a during the period of the slot group 1 from the bank #1 and outputs the packets to IF_c. Similarly, in slot #2 of the 10 Gbps link in the slot group 2, the relay router 4 reads out the packets received from IF_b during the period of the slot group 1 from bank #1, and outputs the packets to IF_c. Incidentally, the relay router 4 temporarily stores the packets received from IF_a and IF_b during the period of the slot group 2 into bank #2. In slot #1 of the 10 Gbps link in slot group 3 (in other words slot #3 in the 1 Gbps link), the relay router 4 reads out the packets received from IF_a during the period of the slot group 2 from the bank #2, and outputs the packets to IF_c. Similarly, in slot #2 of the 10 Gbps link in the slot group 3, the relay router 4 reads out the packets received from IF_b during the period of the slot group 2 from the bank #2, and outputs the packets to IF_c.

FIG. 61 illustrates the relay operation when transmitting packets from the 10 Gbps link to the 1 Gbps link. In FIG. 61, in slot #1 of the 10 Gbps link in slot group 1, the relay router 4 temporarily stores packets received from IF_c into bank #3(a). Similarly, in slot #2 of the 10 Gbps link in the slot group 1, the relay router 4 temporarily stores packets received from IF_c into bank #3(b). During the period of slot group 2, the relay router 4 reads out the packets received from IF_c during the period of the slot group 1 from bank #3(a) and bank #3(b), and outputs the packets to IF_a and IF_b. Incidentally, slot #1 of the 10 Gbps link in the slot group 2, the relay router 4 temporarily stores the packets received from IF_c into bank #4(a). Similarly, in slot #2 of the 10 Gbps link in the slot group 2, the relay router 4 temporarily stores the packets received from IF_c into bank #4(b). During the period of slot group 3, the relay router 4 reads out the packets that were received from IF_c during the period of the slot group 2 from bank #4(a) and bank #4(b), and outputs the packets to IF_a and IF_b.

Figure 62:
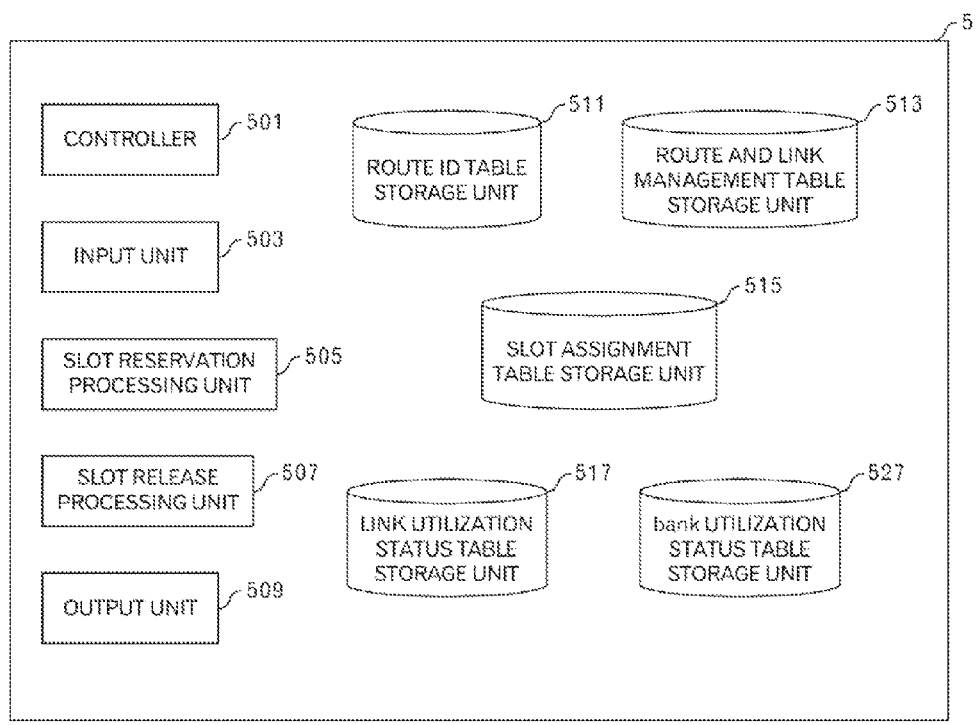
FIG. 62 is a functional block diagram of the management server in the fourth embodiment.

Next, FIG. 62 is a function block diagram of a management server 5 in the fourth embodiment. The management server 5 in the fourth embodiment has a controller 501, input unit 503, slot reservation processing unit 505, slot release processing unit 507, output unit 509, route ID table storage unit 511, route and link management table storage unit 513, slot assignment table storage unit 515, link utilization status table storage unit 517, and bank utilization status table storage unit 527. The controller 501, input unit 503, slot reservation processing unit 505, slot release processing unit 507, output unit 509, route ID table storage unit 511, route and link management table storage unit 513, slot assignment table storage unit 515 and link utilization status table storage unit 517 are basically the same as in the first embodiment.

Figure 63A:
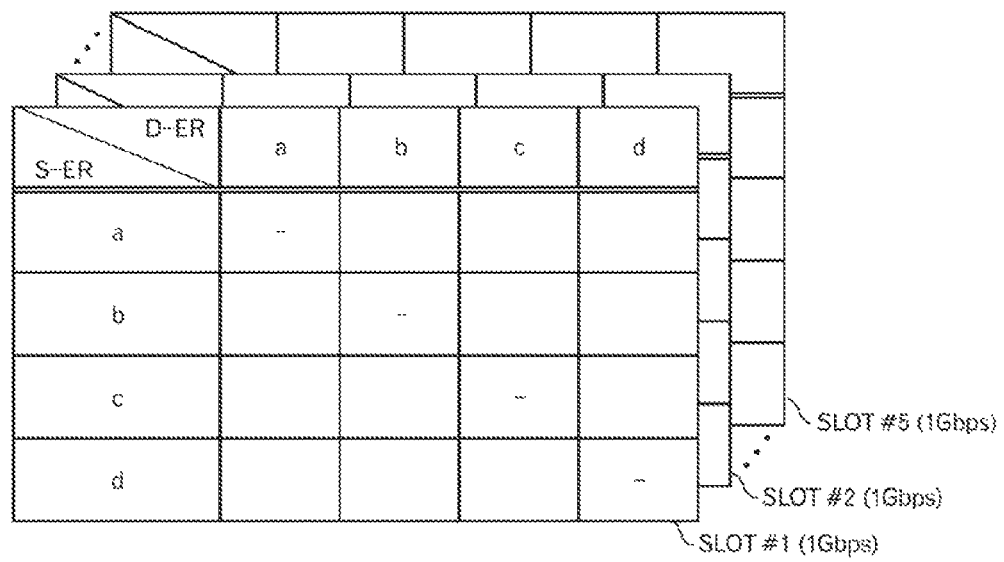
FIGS. 63A and 63B are diagrams illustrating table examples of slot assignment tables in the fourth embodiment.
Figure 63B:
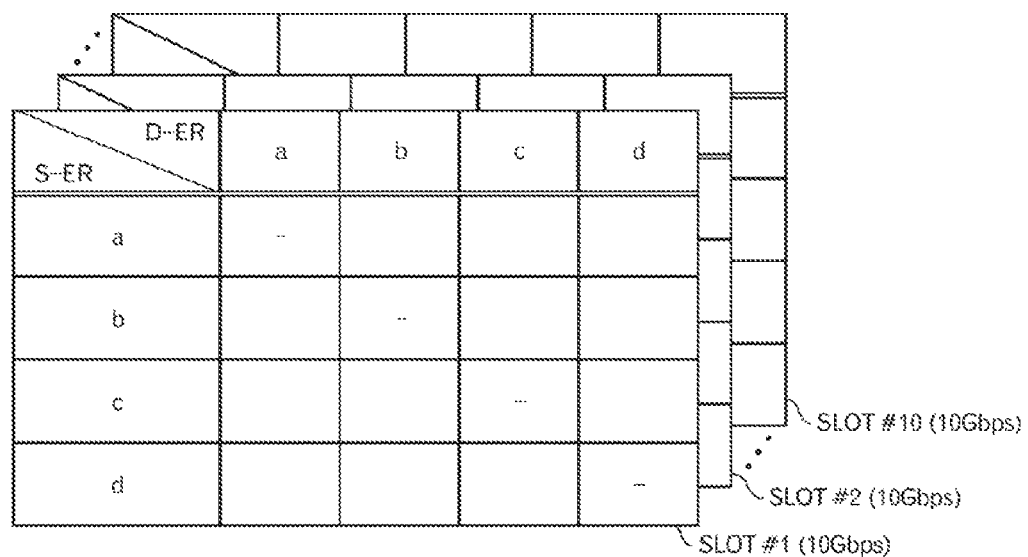

However, in this embodiment, slot assignment tables as illustrated in FIGS. 63A and 63B are stored in the slot assignment table storage unit 515. Incidentally, in the first embodiment, a slot assignment table is stored for each slot ID as illustrated in FIG. 17, however, in this embodiment, a slot assignment table is held for each slot ID and each transmission speed. In addition, FIG. 63A illustrates the slot assignment tables for the first transmission speed (1 Gbps). Because slot #1 to slot #5 are included in one frame of the 1 Gbps link, five slot assignment tables are held for the 1 Gbps link. Moreover, FIG. 63B illustrates slot assignment tables for the second transmission speed (10 Gbps). Because slot #1 to slot #10 are included in one frame of the 10 Gbps link, ten slot assignment tables are held for the 10 Gbps link. The structure of the slot assignment table itself is the same as in the first embodiment.

Moreover, in this embodiment, link utilization status tables as illustrated in FIGS. 64A and 64B are stored in the link utilization status table storage unit 517. As illustrated in FIGS. 64A and 64B, in this embodiment, the link utilization status tables are held for each transmission speed. FIG. 64A illustrates a link utilization status table for the first transmission speed (1 Gbps). In FIG. 64A, the link utilization status table for the first transmission speed includes a slot ID (1 Gbps) column, and columns for each 1 Gbps link (column L1 and column L2). Incidentally, because slot #1 to slot #5 are included in one frame of the 1 Gbps link, records for five slots are registered in the link utilization status table. FIG. 64B illustrates a link utilization status table for the second transmission speed (10 Gbps). In FIG. 64B, the link utilization status table for the second transmission speed includes a slot ID (10 Gbps) column, and columns for each 10 Gbps link (column L3, column L4 and column L5). Incidentally, because slot #1 to slot #10 are included in one frame of the 10 Gbps link, records for ten slots are registered in the link utilization status table. A matter where "1" is set for the link in use is the same as in the first embodiment.

FIG. 65 illustrates an example of a bank utilization status table that is stored in the bank utilization status table storage unit 527. In the example in FIG. 65, the bank utilization status table includes a column of slot ID (1 Gbps), column for bank #1 and bank #2, and column for bank #3 and bank #4. The column for bank #1 and bank #2 is divided into a column of buffer a and column of buffer b. Similarly, the column for bank #3 and bank #4 is divided into a column of buffer a and column of buffer b. In the bank utilization status table, buffers to which "1" is set represent being in use in the corresponding time slot of that record.

Incidentally, the function block diagram of the edge router 1 is basically the same as the diagram illustrated in FIG. 8, and the function block diagram of the relay router 3b is basically the same as the diagram illustrated in FIG. 9.

Figures 66, 67, 68:
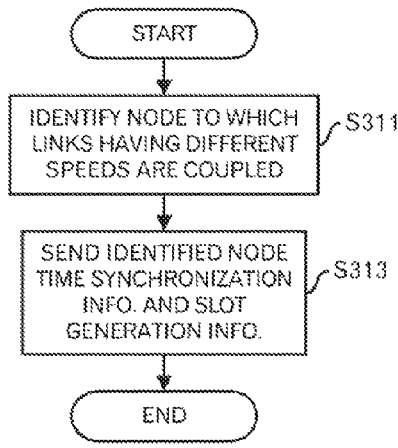
FIG. 66 is a diagram illustrating a flowchart of a processing executed when the management server is booted up.
FIG. 67 is a diagram illustrating an example of time synchronization information.
FIG. 68 is a diagram illustrating an example of slot generation information.

Next, a processing flow for the management server 5 in the fourth embodiment will be explained using FIGS. 66 to 70. In the fourth embodiment, when the management server 5 is booted up, the management server 5 carries out a processing as illustrated in FIG. 66 in addition to the processing illustrated in FIG. 23. Here, it is assumed that the management server 5 issues a SNMP command or the like, and has already collected information concerning the network configuration, and information concerning transmission speed for each link has been set in advance. First, the controller 501 of the management server 5 identifies, in the network, the node to which the links having different speeds are coupled (FIG. 66: step S311). In other words, the controller 501 identifies a node of the relay router 4.

The controller 501 then transmits time synchronization information and slot generation information to the identified node (in other words, the relay router 4) (step S313). Incidentally, FIG. 67 illustrates an example of the time synchronization information. The time synchronization information includes the information element name (hour/minute/second), the number of Octets, and information contents, and the time (hour, minute, second) when the information is transmitted is set as the information contents. FIG. 68 illustrates an example of slot generation information. The slot generation information includes the information element name (IF name/the number of frames/the number of slots), the number of Octets and information contents, and the IF name, the number of frames per second in the IF and the number of slots in one frame are set for each interface as the information contents. For example, when there are three interfaces; "IF_a", "IF_b" and "IF_c", the interface name, the number of frames and the number of slots are set for each of the three interfaces. Moreover, when plural nodes are identified at the step S311, the controller 501 transmits time synchronization information and slot generation information to each node (i.e. the relay router 4). Incidentally, the relay router 4 that received the time synchronization information and slot generation information synchronizes with the time slot every second as a reference. The processing illustrated in FIG. 66 then ends.

Figure 69:
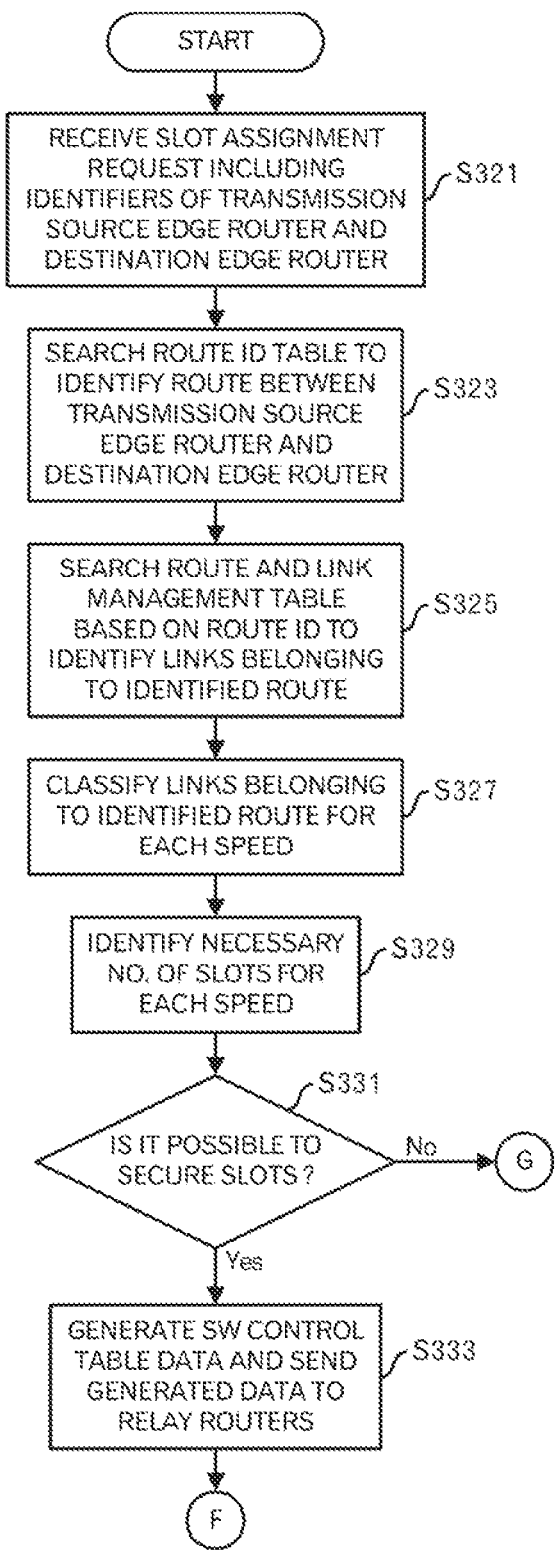
FIG. 69 is a diagram illustrating a flowchart of a processing (first part) executed by the management server when the time slot is reserved.
Figure 70:
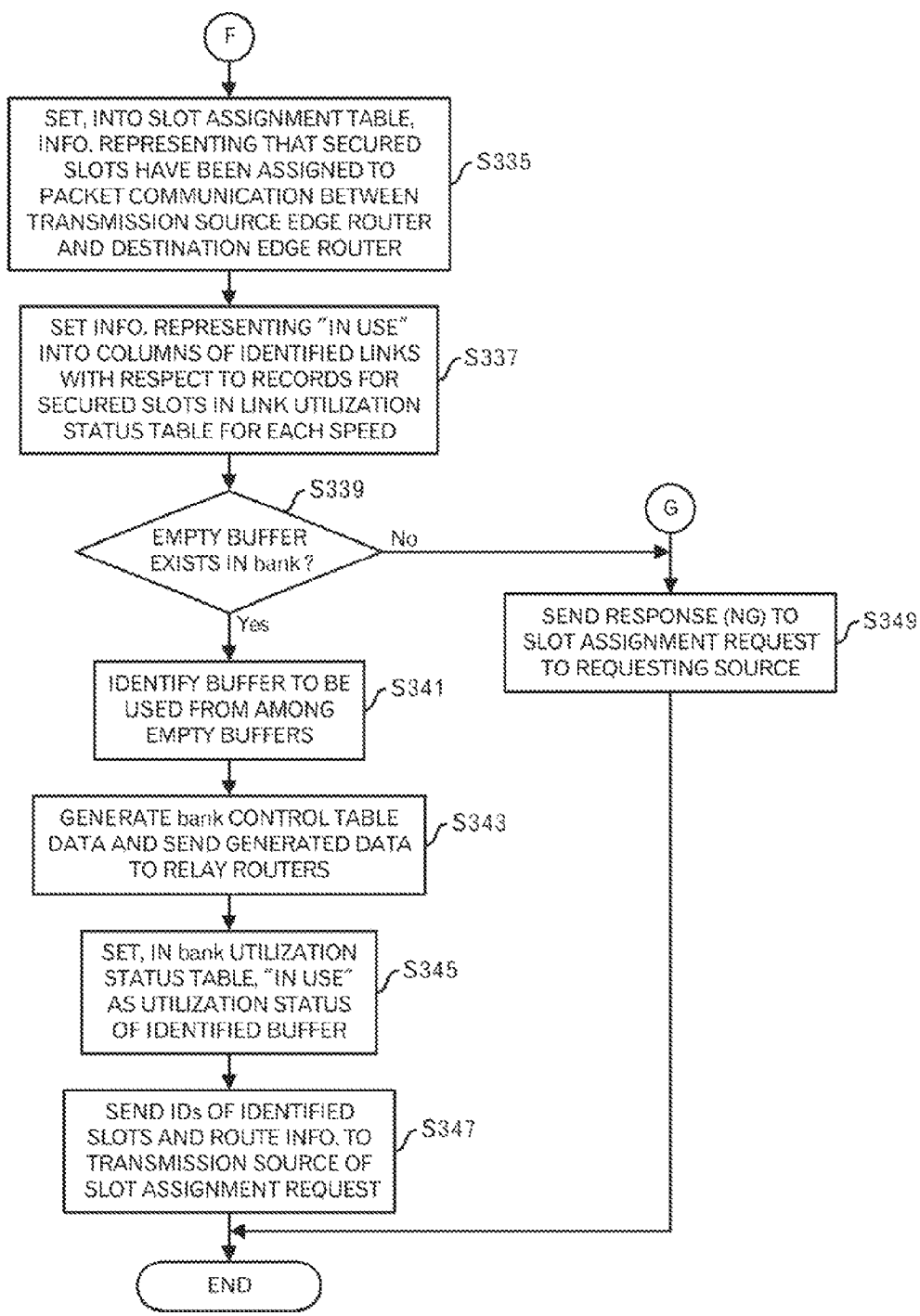
FIG. 70 is a diagram illustrating a flowchart of a processing (second part) executed by the management server when the time slot is reserved.

In addition, in the fourth embodiment, the management server 5 carries out a processing as illustrated in FIGS. 69 and 70 instead of the processing illustrated in FIGS. 26 and 27, as a processing when reserving a time slot. In the following, the processing relating to the fourth embodiment will be explained below using FIGS. 69 and 70.

First, the input unit 503 receives, from the edge router 1, a slot assignment request that includes identifiers of the transmission source edge router and destination edge router, and temporarily stores the received request into a storage device (FIG. 69: step S321). The input unit 503 then notifies the slot reservation processing unit 505 that the slot assignment request was received.

When the slot reservation processing unit 505 receives the notification from the input unit 503, the slot reservation processing unit 505 searches the route ID table based on the identifiers of the transmission source edge router and destination edge router, which are included in the slot assignment request stored in the storage device, to identify the route between the transmission source edge router and destination edge router (step S323). Moreover, the slot reservation processing unit 505 searches the route and link management table based on the ID of the identified route to identify the links belonging to the identified route (step S325).

After that, the slot reservation processing unit 505 classifies the links belonging to the identified route according to speed (step S327), and identifies the number of necessary slots for each speed (step S329). Incidentally, it is assumed that bandwidth information regarding the packet communication between the edge routers is provided to the management server 5 beforehand. In other words, at this step, the number of slots required for securing the bandwidth for the packet transmission from the transmission source edge router to the destination edge router is identified. For example, when setting a path having 1 Gbps bandwidth between IF_a and IF_c, all five slots are necessary on the IF_a (1 Gbps) side, and one slot is necessary on the IF_c (10 Gbps) side.

The slot reservation processing unit 505 then searches the link utilization status table based on the ID of each link belonging to the route to determine whether or not it is possible to secure time slots of the number of slots identified at the step S329 (step S331). When it is determined that it is not possible to secure time slots of the number of slots identified at the step S329 (step S331: NO route), the time slots are already being used for other packet transmission, for example. Therefore, when it is determined that it is not possible to secure necessary time slots, the processing moves to a processing of step S349 (FIG. 70) via a terminal G.

On the other hand, when it is determined that it is possible to secure time slots of the number of slots identified at the step S329 (step S331: YES route), the slot reservation processing unit 505 stores IDs of the secured slot into the storage device. The slot reservation processing unit 505 then generates SW control table data based on the secured slot IDs, and transmits the generated data to the relay routers 4 on the route from the transmission source edge router to the destination edge router (step S333). For example, when it is determined that five slots on the IF_a side and one slot on the IF_c side can be secured, SW control table data that, for the direction "IF_a –>IF_c", "any", "IF_a(in)" and "IF_c(A)" are respectively set into columns of the slot ID (1 Gbps), From and To is generated. Also, SW control table data that, for the direction "IF_c –>IF_a", "any", "IF_c(C)" and "IF_a(out)" are respectively set into columns of the slot ID (1 Gbps), From and To is generated. The processing then moves to a processing of step S335 (FIG. 70) via a terminal F.

Moving to explanation of FIG. 70, after the terminal F, the slot reservation processing unit 505 sets, into the slot assignment table, information representing that the secured slots have been assigned to the packet transmission between the transmission source edge router and destination edge router (FIG. 70: step S335). More specifically, the slot reservation processing unit 505 sets a circle mark into the appropriate locations in the corresponding slot assignment table from among the slot assignment tables that are stored for each slot ID and each speed.

The slot reservation processing unit 505 also sets, into a column of the identified link with respect to records for the secured slots in the link utilization status table for each speed, information ("1") representing that the link is being used (step S337).

The slot reservation processing unit 505 then searches the bank utilization status table to determine whether or not there is an empty buffer in the bank (step S339). For example, when all five slots on the IF_a side are used, the slot reservation processing unit 505 determines whether or not, in the bank utilization status table, the buffer a or b is unused for the slot #1 to slot #5.

When it is determined that there is an empty buffer in the bank (step S339: YES route), the slot reservation processing unit 505 identifies the buffer to be used from among the empty buffers (step S341). The slot reservation processing unit 505 then generates bank control table data according to the identified buffer, and transmits the generated bank control table data to the relay routers 4 on the route from the transmission source edge router to the destination edge router (step S343). For example, when the buffer a has been determined to be used and the slot #1 of the 10 Gbps link has been assigned, the following bank control table data is generated for the direction "IF_a –>IF_c". In other words, the bank control table data is generated in which data (switching data between the point A and the bank) including "any", "A" and "bank-$o_n$(a)" are set into columns of the slot ID (1 Gbps link), From and To, and data (switching data between IF_c (out) and the bank) including "#1", "bank-$o_{n-1}$ (a)" and "IF_c(out)" are set into columns of the slot ID (10 Gbps link), From and To. Moreover, the following bank control table data is generated for the "IF_c –>IF_a" direction. In other words, the bank control table data is generated in which data (switching data between the point C and the bank) including "any", "bank-$i_{n-1}$ (a)" and "C" are set into columns of the slot ID (1 Gbps link), From and To, and data (switching data between IF_c (in) and the bank) including "#1", "IF_c(in)" and "bank-$i_n$(a)" are set into columns of the slot ID (10 Gbps link), From and To.

The slot reservation processing unit 505 then sets, in the bank utilization status table, "in use" (e.g. "1") as the utilization status of the identified buffer (step S345). In this embodiment, the packets that were stored into the bank for slot #n of the low-speed link are transmitted to the high-speed link at the timing of slot #n+1 of the low-speed link, for example. Therefore, actually, the buffer for two slots is used in the bank. Therefore, at this step, "in use" is set as the utilization status in the bank utilization status table for not only the time slot used when storing a packet, but also the next time slot as well.

The slot reservation processing unit 505 then notifies the output unit 509 of the assigned slot ID and communication route information. After that, when the output unit 509 receives the notification from the slot reservation processing unit 505, the output unit 509 transmits the assigned slot ID and communication route information to the transmission source of the slot assignment request (step S347). After that, the processing ends.

On the other hand, when it is determined at the step S339 that there is no empty buffer in the banks (step S339: NO route), or when the processing moves to the processing of FIG. 70 via a terminal G, the slot reservation processing unit 505 instructs the output unit 509 to transmit a response (NG) to the slot assignment request. When the output unit 509 receives the instruction from the slot reservation processing unit 505, the output unit 509 transmits the response (NG) to the slot assignment request to the transmission source of the slot assignment request (step S349). Then, the processing ends.

By carrying out the aforementioned processing, it is possible to carry out the scheduling without causing packet collisions, and the relay router 4 is notified of the SW control table data and bank control table data.

Figure 71:
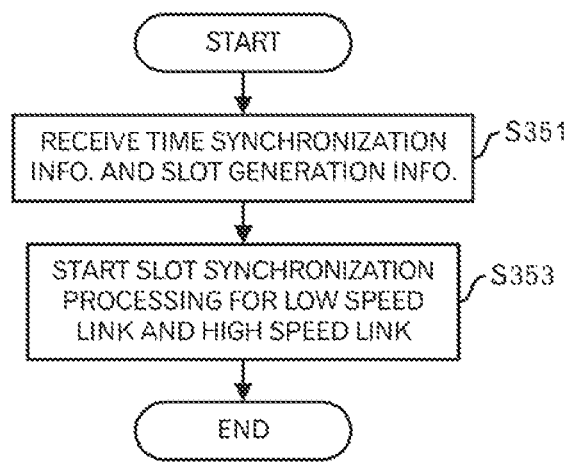
FIG. 71 is a diagram illustrating a flowchart of a processing executed by the relay router when the time synchronization information and slot generation information are received.

Next, a processing flow of the relay router 4 will be explained using FIGS. 71 to 76. FIG. 71 illustrates a processing flow when time synchronization information and slot generation information are received from the management server 5. The controller 47 of the relay router 4 receives the time synchronization information and slot generation information from the management server 5, and stores the received information into the storage device (FIG. 71: step S351).

The slot synchronization unit 475 of the relay router 4 then starts the slot synchronization processing for the low-speed link and high-speed link based on the time synchronization information and slot generation information that were stored in the storage device (step S353). More specifically, the slot synchronization unit 475 sets and adjusts the internal time based on the time synchronization information while taking into consideration the transmission delay and the like. The slot synchronization unit 475 then synchronizes with the time slots for each of the low-speed links and high-speed links every second according to the number of frames and the number of slots included in the slot generation information. Then, the processing ends.

Figure 72:
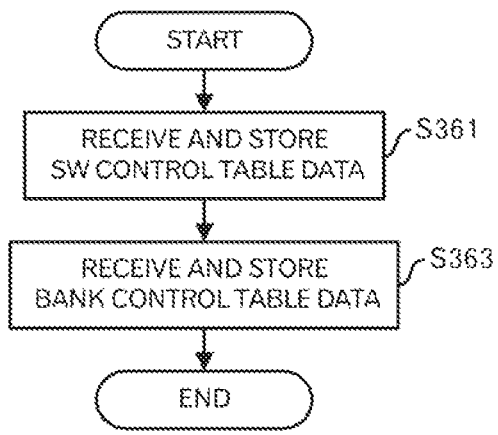
FIG. 72 is a diagram illustrating a flowchart of a processing executed by the relay router when the SW control table and bank control table are set.

Next, a processing flow for the relay router 4 when setting the SW control table and bank control table will be explained using FIG. 72. When the controller 47 of the relay router 4 receives SW control table data from the management server 5, the controller 47 stores the received data into the SW control table 472 in the SW controller 471 (FIG. 72: step S361). When the controller 47 also receives the bank control table data from the management server 5, the controller 47 stores the received data into the bank control table 474 in the bank switching unit 473 (step S363). Then, the processing ends.

Figure 73:
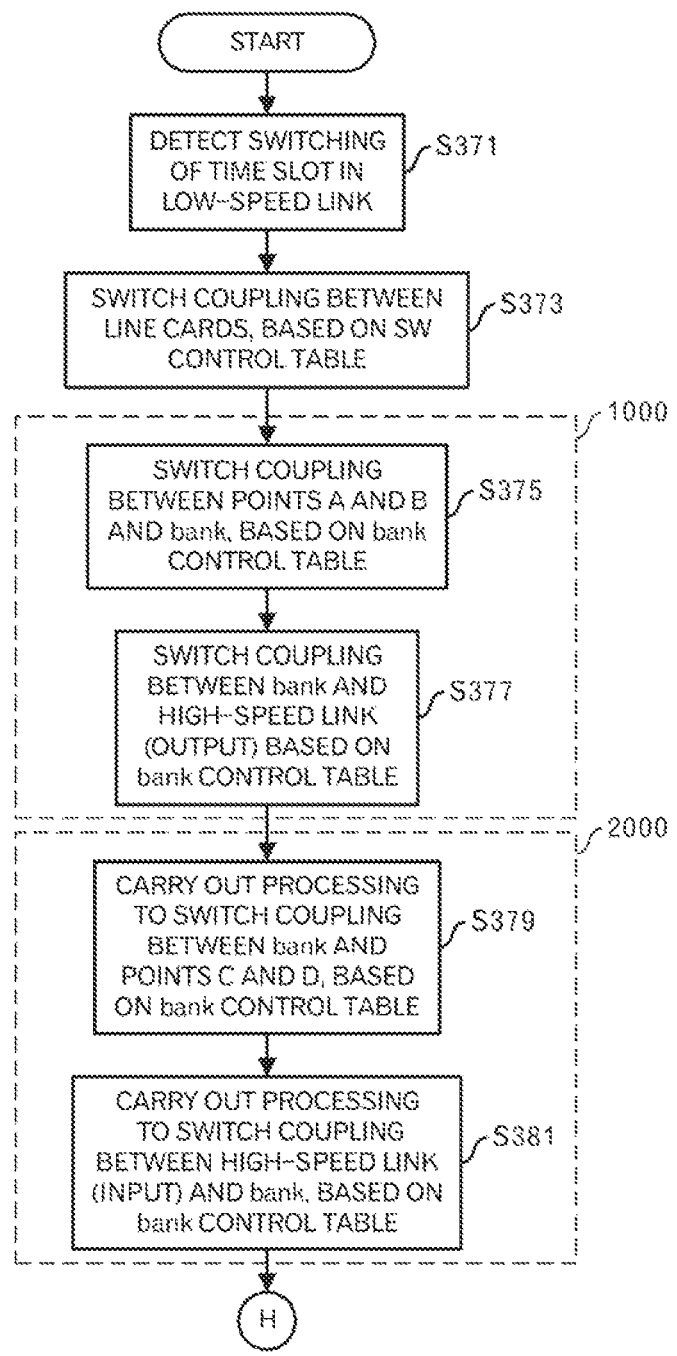
FIG. 73 is a diagram illustrating a flowchart (first part) of a SW switching processing and bank switching processing in the relay router.
Figure 74:
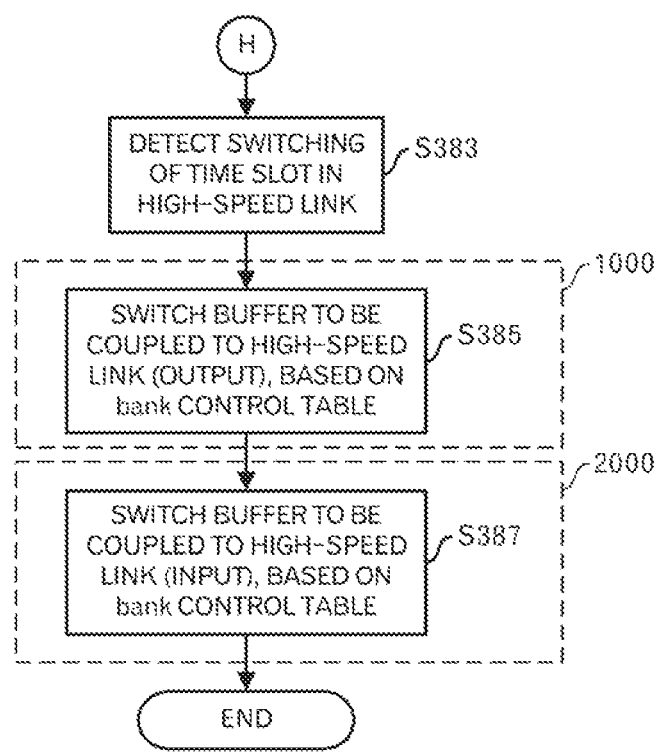
FIG. 74 is a diagram illustrating a flowchart (second part) of the SW switching processing and bank switching processing in the relay router.

Next, a SW switching processing and bank switching processing in the relay router 4 will be explained using FIGS. 73 and 74. Incidentally, the relay router 4 carries out a processing as illustrated in FIGS. 73 and 74 each time the time slot of the low-speed link is switched (or in other words, a frame of a high-speed link is switched). First, the slot synchronization unit 475 of the relay router 4 detects switching of the time slot in the low-speed link (FIG. 73: step S371). At this point, the time slot in the high-speed link is also switched. Then, the slot synchronization unit 475 notifies the SW controller 471 and bank switching unit 473 that the time slot of the low-speed link was switched.

After that, when the SW controller 471 receives the notification from the slot synchronization unit 475, the SW controller 471 controls the SW 45 based on the SW control table 472 to switch the coupling between the line cards (step S373).

When the bank switching unit 473 receives the notification from the slot synchronization unit 475, the bank switching unit 473 switches the coupling between points A and B and the banks based on the bank control table 474 (step S375). For example, the bank switching 473 controls so that the points A and B are alternately coupled with bank #1 and bank #2 each time the time slot of the low-speed link is switched.

Moreover, the bank switching unit 473 also switches the coupling between the banks and the output to the high-speed link based on the bank control table 474 (step S377). For example, the bank switching unit 473 controls so that the bank of bank #1 and bank #2, which was coupled to the points A and B in the immediately prior time slot in the low-speed link is coupled to the output to the high-speed link. Furthermore, the bank switching unit 473 identifies a buffer to be coupled in the current time slot in the high-speed link from among the buffers in the bank based on the bank control table 474, and controls so that the identified buffer is coupled to the output of the high-speed link. Incidentally, the processing in the dashed line frame 1000 is a processing for controlling packet transmission in the direction "low-speed link->high-speed link" (this is the same, hereafter).

The bank switching unit 473 then switches the coupling between points C and D and the banks based on the bank control table 474 (step S379). For example, the bank switching unit 473 controls so that the points C and D are alternately coupled to the bank #3 and bank #4 each time the time slot of the low-speed link is switched.

The bank switching unit 473 also switches the coupling between the banks and the input point from the high-speed link based on the bank control table 474 (step S381). For example, the bank switching unit 473 controls so that the bank of bank #3 and bank #4, which was coupled to the points C and D in the immediately prior time slot in the low-speed link, is coupled to the input point from the high-speed link. Furthermore, the bank switching unit 473 identifies the buffer to be coupled in the current time slot in the high-speed link from among the buffers in the bank based on the bank control table 474, and controls so that the identified buffer is coupled to the input point from the high-speed link. Incidentally, the processing in the dashed-line frame 2000 is a processing for controlling packet transmission in the direction "high-speed link->low-speed link" (this is the same, hereafter). After that, the processing moves to the processing of step S383 (FIG. 74) via a terminal H.

Moving to explanation of FIG. 74, after the terminal H, the slot synchronization unit 475 detects switching of the time slot in the high-speed link (FIG. 74: step S383). Incidentally, at this point, the time slot in the low-speed link is not switched. The slot synchronization unit 475 then notifies the bank switching unit 473 that the time slot in the high-speed link was switched.

Then, the bank switching unit 473 receives the notification from the slot synchronization unit 475, and switches the buffer to be coupled to the output point to the high-speed link based on the bank control table 474 (step S385). More specifically, the bank switching unit 473 identifies, from the bank control table 474, the buffer to be coupled in the time slot in the high-speed link after switching, and carries out control so that the identified buffer is coupled to the output point to the high-speed link.

In addition, the bank switching unit 473 switches the buffer to be coupled to the input point from the high-speed link based on the bank control table 474 (step S387). More specifically, the bank switching unit 473 identifies, from the bank control table 474, the buffer to be coupled in the time slot in the high-speed link after switching, and carries out control so that the identified buffer is coupled to the input point from the high-speed link. Incidentally, the processing of steps S383 to step S387 is carried out every time when only the time slot in the high-speed link is switched. Then, the processing ends.

Figure 75:
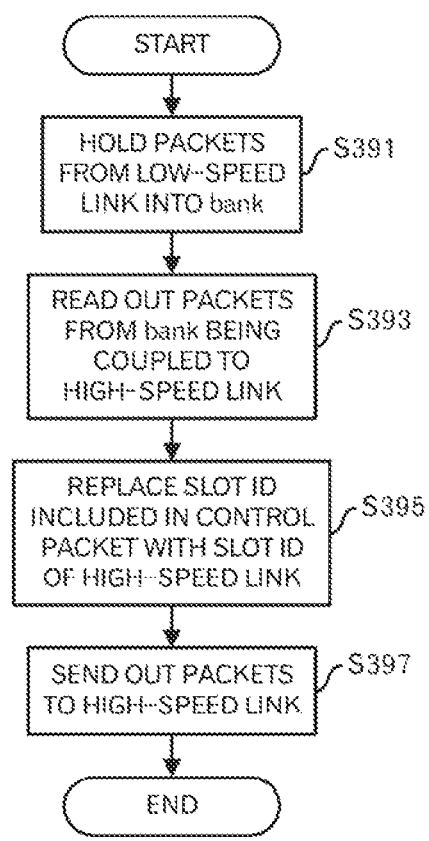
FIG. 75 is a diagram illustrating a flowchart of a relay processing in the relay router when the packet transmission is carried out from the low-speed link to the high-speed link.

Next, a relay processing by the relay router 4 when transmitting packets to the high-speed link from the low-speed link will be explained using FIG. 75. First, the relay router 4 temporarily stores packets from the low-speed link into bank #1 or bank #2 via the low-speed line card 41 and SW 45 (FIG. 75: step S391). Incidentally, as illustrated in FIG. 3, FIG. 20 or FIG. 22, a control packet that includes the slot ID in the low-speed link is included in the packets that flow from the low-speed link.

The relay router 4 also sequentially reads out packets from the bank of bank #1 and bank #2, which is being coupled with the output point to the high-speed link (step S393). The relay router 4 then replaces the slot ID included in the control packet with the slot ID of the high-speed link based on the bank control table 474 (step S395), and sequentially sends out the packets read from the bank to the high-speed link (step S397). The processing then ends. In this way, the control packet that includes the slot ID for the high-speed link flows to the node (relay router 3 and/or edge router 1) on the high-speed link side, and it becomes possible to adequately carry out a processing at each of the nodes on the high-speed link side according to the control packet.

Figure 76:
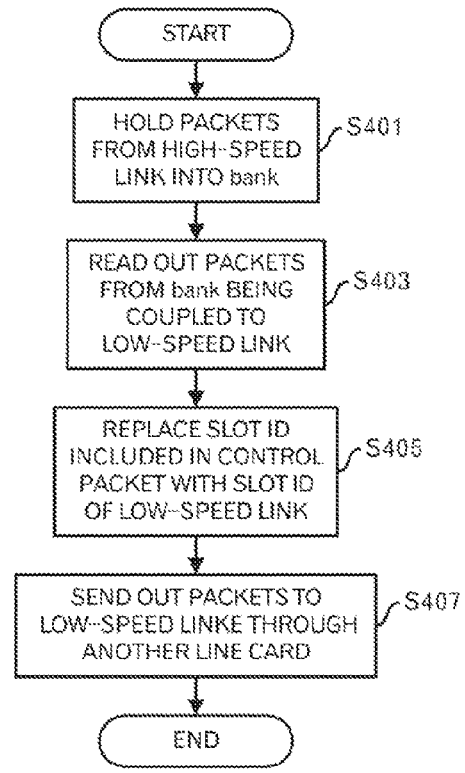
FIG. 76 is a diagram illustrating a flowchart of a relay processing in the relay router when the packet transmission is carried out from the high-speed link to the low-speed link.

Next, the relay processing by the relay router 4 during transmission of packets from the high-speed link to the low-speed link will be explained using FIG. 76. First, the relay router 4 temporarily stores packets from the high-speed link into bank #3 or bank #4 (FIG. 76: step S401). Incidentally, the control packet that includes the slot ID in the high-speed link is included in the packets that flow from the high-speed link as illustrated in FIG. 3, FIG. 20 or FIG. 22.

The relay router 4 also sequentially reads out packets from the bank among bank #3 and bank #4, which is being coupled with the low-speed link via the SW 45 and the low-speed line card 41 (step S403). Then, the relay router 4 also replaces the slot ID included in the control packet with the current slot ID in the low-speed link (step S405), and sequentially transmits packets read from the bank to the low-speed link (step S407). Then, the processing ends. In this way, a control packet that includes the slot ID of the low-speed link flows to the node (the relay router 3 or edge router 1) on the low-speed side, and it becomes possible to adequately carry out a processing at each of the nodes on the high-speed link side according to the control packet.

As described above, by switching switches and banks according to pre-scheduled settings, it is possible to relay packets without searching a routing table as was done conventionally. In other words, it is possible to reduce the power consumption in the routing processing. Moreover, the capacity of one bank becomes "(the number of low-speed links)* (data amount of one time slot)". Therefore, when compared with the case where the routing is carried out, it is possible to reduce the capacity of the buffer area, as well as reduce the power consumption in the packet buffering.

For example, when the amount of data for one slot in the high-speed link is equal to the data amount of one packet, the amount of packet buffers required for the high-speed line card 43 of the relay router 4 in this fourth embodiment becomes (the number of low-speed line cards)*(the number of inputs and outputs)*(the number of banks)=2*2*2=8, so the buffer amount of 8 packets is necessary. Here, when the data amount of one packet is equal to 1500 Bytes+20 Bytes, a packet buffer amount of approximately 12 KBytes is sufficient. Incidentally, in a conventional router to which links having different transmission speeds are coupled, typically a packet buffer amount of C*RTT (C: link speed, RTT: Round trip time) was necessary. For example, when, in the 10 Gbps line card, the RTT was 250 ms, the packet buffer of C*RRT=312.5 MBytes (approximately 300 MBytes) is necessary. Therefore, by employing the relay router 4 in this fourth embodiment, it is possible to reduce the packet buffer amount to approximately 1/25,000.

Incidentally, the network illustrated in FIG. 54 is an example of a simple network, so the network configuration is not limited to this. By placing the relay router 4 at the boundary where the transmission speed changes, and placing the relay router 3 that was explained in the first to third embodiments in an area where the transmission speeds are the same, it is possible to use other network configuration. In this case, in the area where the transmission speeds are the same, packets are transmitted in a specific time slot as explained in the first to third embodiments.

While the embodiments of the present technique have been described above, the present technique is not limited to those embodiments. For example, the above-described functional block diagrams of the edge router 1, the relay routers 3 and 4, and the management server 5 do not always correspond to actual program module configurations.

In addition, the configuration of each of the above-described tables is illustrated merely by way of example and is not always limited to the above-described example. Furthermore, in the processing flow, the sequence of steps can be changed or replaced as long as the processing result does not change. As an alternative, the steps may be executed in parallel.

In the above-described embodiments, for example, the packet communication from the edge router 1a to the edge router 1d and the packet communication from the edge router 1d to the edge router 1a are not discriminated from each other, and both the packet communications are managed by using one route ID. However, those packet communications may be managed by using different route IDs. In such a case, separate time slots are assigned respectively to those packet communications.

Figure 77:
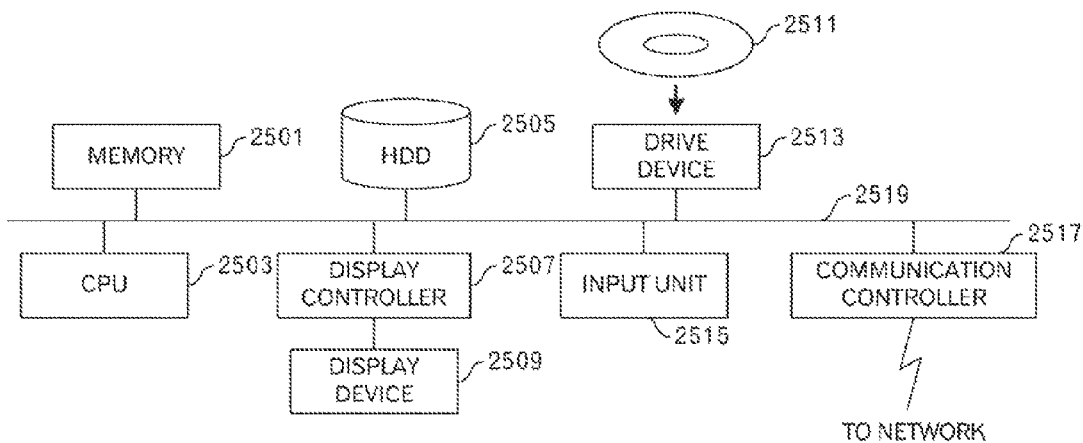
FIG. 77 is a block diagram of a computer.

In addition, the management server 5 is a computer device as shown in FIG. 77. That is, a memory 2501 (storage device), a CPU 2503 (processor), a hard disk drive (HDD) 2505, a display controller 2507 coupled to a display device 2509, a drive device 2513 for a removable disk 2511, an input device 2515, and a communication controller 2517 for connection with a network are coupled through a bus 2519 as shown in FIG. 77. An operating system (OS) and an application program for carrying out the foregoing processing in the embodiment, are stored in the HDD 2505, and when executed by the CPU 2503, they are read out from the HDD 2505 to the memory 2501. As the need arises, the CPU 2503 controls the display controller 2507, the communication controller 2517, and the drive device 2513, and causes them to perform necessary operations. Besides, intermediate processing data is stored in the memory 2501, and if necessary, it is stored in the HDD 2505. In this embodiment of this invention, the application program to realize the aforementioned functions is stored in the removable disk 2511 and distributed, and then it is installed into the HDD 2505 from the drive device 2513. It may be installed into the HDD 2505 via the network such as the Internet and the communication controller 2517. In the computer as stated above, the hardware such as the CPU 2503 and the memory 2501, the OS and the necessary application programs systematically cooperate with each other, so that various functions as described above in details are realized.

For example, with a hardware such as CPU 2503, memory 2501 and the like organically cooperating with OS and application programs, functions of the aforementioned controller 501, input unit 503, slot reservation processing unit 505, slot release processing unit 507, output unit 509, slot reservation message transmitter 519, slot release message transmitter 521, collision management table generator 523 and the like are realized. Moreover, the aforementioned route ID table (FIG. 15), route and link management table (FIG. 16), slot assignment table (FIGS. 17 and 63), and link utilization status table (FIGS. 18 and 64) and collision management table (FIG. 49) are stored in the memory 2501 or HDD 2505.

Figure 78:
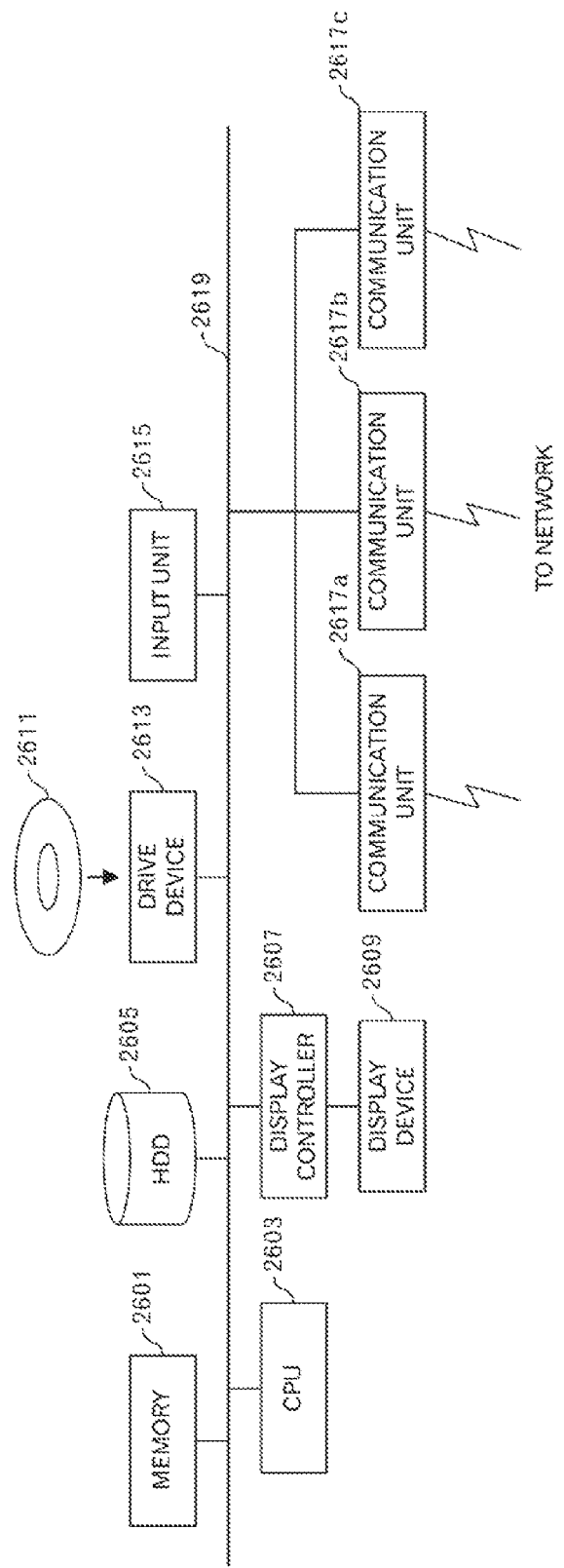
FIG. 78 is a block diagram of a computer.

In addition, in each of the aforementioned edge routers 1, relay routers 3 and 4, as illustrated in FIG. 78, a memory 261, CPU 2603, Hard Disk Drive (HDD) 2605, display controller 2607 to be coupled with a display device 2609, drive device 2613 for a removable disk 2611, input device 2615 and communication units 2617 (2617a to 2617c in FIG. 78) for coupling to a network are coupled with a bus 2619. Incidentally, according to circumstances, the display controller 2607, display device 2609, drive device 2613 and input device 2615 may not be included. The OS and application programs for carrying out a processing in these embodiments are stored in the HDD 2605, and read out from the HDD 2605 to the memory 2601 when being executed by the CPU 2603. If necessary, the CPU 2603 controls the display controller 2607, communication unit 2617 and drive device 2613 to carry out necessary operations. Incidentally, data that was inputted through any one of the communication units 2617 is outputted through another communication unit 2617. The CPU 2603 controls the communication units 2617 to appropriately switch output destinations. In addition, data during the processing is stored in the memory 2601, and stored in the HDD 2605 if necessary. In the embodiments of this technique, the application programs for carrying out the aforementioned processing are distributed by a computer-readable removable disk 2611 storing the application programs, and the application programs are installed into the HDD 2605 through the drive device 2613. The application programs may be installed into the HDD 2605 through the communication unit 2617 and the network such as the Internet. Such a computer apparatus realizes the aforementioned various functions by cooperating the hardware such as the CPU 2603, memory 2601 and the like with the OS and the application programs if necessary.

For example, by organically cooperating the hardware such as CPU 2603, memory 2601 and the like with OS and application programs, functions such as the packet receiver 101, packet classification unit 107, slot generator 109, slot reservation unit 111, scheduler 115 and slot release unit 117 of the edge router 1, the forwarding engine 307 of the relay router 3 and the SW controller 471, bank switching unit 473 and slot synchronization unit 475 of the relay router 4 can be realized.

In addition, the aforementioned edge router table (FIG. 11), path management table (FIG. 12), slot reservation table (FIGS. 13 and 37), IF table, slot table (FIG. 14), SW control table (FIG. 57) and bank control table (FIG. 58) are stored in the memory 2601 or HDD 2605.

The aforementioned embodiments of the present technique are outlined as follows:

A network apparatus, relating to a first aspect of the embodiments, for relaying packets communicated between edge routers in a network, includes: (A) a slot table storing a record including an identifier of a time slot that is assigned to packet transmission from a specific transmission source to a specific transmission destination, and identifiers of an input interface and an output interface which are used for the packet transmission; and (B) a unit, upon receiving a first control packet that includes an identifier of a specific time slot and represents a start of the specific time slot, to identify the input interface and the output interface that correspond to the specific time slot from the slot table, and to transmit a packet from the specific input interface to the specific output interface during a period until a second control packet that includes the identifier of the specific time slot and represents an end of the specific time slot.

With such a configuration, it becomes possible to appropriately relay packets to be communicated between the edge routers during the period from the reception of the first control packet to the reception of the second control packet, without carrying out the routing processing. Moreover, because a packet collision can be avoided, for example, by properly assigning the time slot, the network apparatus is not required to carry out the packet buffering. In other words, the power consumed by the packet buffering and routing processing can be cut and hence the power saving can be achieved in the network apparatus.

Furthermore, the network apparatus may further include: a unit, upon receipt of a slot reservation instruction including the identifier of the time slot and information of a communication route, to store, into the slot table, a record including the identifier of the time slot, which is included in the slot reservation instruction, and identifiers of the input interface and the output interface, which are identified from the information of the communication route included in the slot reservation instruction. With such a configuration, even if the new assignment of the time slot is made, proper handling of the packets can be realized.

Furthermore, the network apparatus may further include: a unit, upon receipt of a slot release instruction including the identifier of the time slot, to delete the record including the identifier of the time slot, which is included in the slot release instruction, from the slot table. With such a configuration, even if anyone of slot assignments is no longer needed, proper handling of the packets can be realized.

An edge router relating to a second aspect of the embodiments, includes: an edge router table storing a transmission destination address of a packet and an identifier of a destination edge router corresponding to the transmission destination address; a queue for each of destination edge routers; a slot reservation table storing a record including an identifier of a time slot, which is assigned to packet transmission addressed to a specific destination edge router, an identifier of an output interface which is used for the packet transmission, and an identifier of the queue corresponding to the specific destination edge router; a packet receiver to receive packets from an external network; a packet classification unit to identify, from the edge router table, the destination edge router corresponding to the transmission destination address of the received packet, and to store the received packet into the queue corresponding to the identified destination edge router; and a scheduler, upon detecting switching to a specific time slot, to identify the output interface and the queue, which correspond to the specific time slot, from the slot reservation table, to transmit a first control packet, which includes an identifier of the specific time slot and represents a start of the specific time slot, through the identified output interface, to successively transmit the packet read out from the identified queue after transmitting the first control packet, and to transmit, as a final packet in the specific time slot, a second control packet which includes the identifier of the specific time slot and represents an end of the specific time slot.

With such a configuration, because a time slot is used only for the packet communication assigned to the time slot, the communication between the edge routers can be carries out without causing a packet collision by, for example, appropriately assigning each time slot. Moreover, the timings of start and end of the time slot can be notified to, for example, the network apparatus (e.g., the router) on the communication route up to the destination edge router by transmitting the first control packet and the second control packet. In other words, the network apparatus is no longer required to establish synchronization of the time slot.

Further, the edge router may further includes a unit to determine whether or not the time slot is assigned to the packet transmission addressed to the destination edge router which has been identified by the packet classification unit, and to transmit a slot assignment request to a management server, which manages the time slot, upon determining that the time slot is not assigned to the aforementioned packet transmission; and a slot reservation unit, upon receipt of a slot assignment notification including the identifier of the time slot and information of a communication route from the management server, to register, in the slot reservation table, a record including the identifier of the time slot, which is included in the slot assignment notification, the identifier of the output interface identified based on the information of the communication route, which is included in the slot assignment notice, and the identifier of the queue corresponding to the destination edge router which has been identified by the packet classification unit. Further, the aforementioned scheduler may include: a unit, upon detecting that a new time slot is assigned, to transmit a third control packet which includes an identifier of the new time slot and represents reservation of the new time slot. Such a configuration enables a proper action to be taken even when new packet communication to which the time slot is not assigned occurs.

Still further, the edge router may further include: a unit to transmit a slot release request to the management server when, during a period until the end of a predetermined period of time after storing the packet into a specific queue, a next packet to be stored in the specific queue is not received; and a unit, upon receiving a slot release completion notification including an identifier of the released time slot from the management server, to delete the record including the identifier of the time slot, which is included in the slot release completion notification, from the slot reservation table. Furthermore, the scheduler may include: a unit, upon detecting that any one of the time slots is released, to transmit a fourth control packet, which includes an identifier of the released time slot and represents the release of the relevant time slot. With such a configuration, when a packet is not received for a certain time or longer, the assigned time slot is released such that the relevant time slot can be reassigned to another packet communication. In other words, a limited number of time slots can be more effectively utilized.

A packet communication system relating to a third aspect of the embodiments include: (A) edge routers, each carrying out packet communication while synchronizing with time slot by using definition information of the time slot and time synchronization information; (B) a network apparatus relaying packets communicated between the edge routers; and (C) a management server for delivering the definition information of the time slot and the time synchronization information to each of the edge routers. Then, each of the edge routers includes (A1) an edge router table storing a transmission destination address of a packet and an identifier of a destination edge router corresponding to the transmission destination address; (A2) a queue for each destination edge router; (A3) a slot reservation table storing an identifier of a time slot which is assigned to packet transmission addressed to a specific destination edge router, an identifier of a first output interface which is used for the packet transmission, and an identifier of the queue corresponding to the specific destination edge router; (A4) a unit to receive packets from an external network; (A5) a unit to identify, from the edge router table, the destination edge router corresponding to the transmission destination address of the received packet, and to store the received packet into the queue corresponding to the identified destination edge router; and (A6) a unit, upon detecting switching to a specific time slot in a sequential flow of time slots, which is determined based on definition information of the time slot, to identify a first output interface and a queue, which correspond to the specific time slot, from the slot reservation table, to transmit a first control packet, which includes an identifier of the specific time slot and represents a start of the specific time slot, through the identified first output interface, to successively transmit the packet read out from the identified queue after transmitting the first control packet, and to transmit, as a final packet in the specific time slot, a second control packet which includes the identifier of the specific time slot and represents an end of the specific time slot. Moreover, the aforementioned network apparatus includes (B1) a slot table storing an identifier of a time slot and identifiers of an input interface and a second output interface which are used for the packet transmission in the time slot; and (B2) a unit, upon receipt of the first control packet, to identify, from the slot table, the input interface and the second output interface corresponding to the identifier of the time slot, which is included in the first control packet, and to transmit the packet from the identified input interface to the identified output interface during a period until the second control packet is received.

An network apparatus, relating to a fourth aspect of the embodiment, for relaying packets includes: (A) a first port unit to be coupled to a first link that is used in time division of a first kind of time slots; (B) a second port unit to be coupled to a second link that is used in time division of a second kind of time slots, wherein each of the second kind of time slots is shorter than each of the first kind of time slots, and the second port unit has a first bank and a second bank that are storage areas to temporarily store the packets from the first link; (C) a controller to control the second port unit a switch coupling between the first port unit and the second port unit. Incidentally, packet communication from a specific transmission source on the first link to a specific transmission destination on the second link is scheduled by using a first transmission time slot among the first kind of time slots and a second transmission time slot among the second kind of time slots. Then, the aforementioned controller (C1) alternately switches a first cycle and a second cycle each time when switching the first kind of time slots, wherein, in the first cycle, the controller carries out a setting so that a packet from the first link is stored into the first bank through the first port unit and the switch, and carries out a setting so that a packet stored in the second bank flows to the second link, and in the second cycle, the controller carries out a setting so that a packet from the first link is stored into the second bank through the first port unit and the switch, and carries out a setting so that a packet stored in the first bank flows to the second link, (C2) during the first transmission time slot among the first kind of time slots, the controller causes to store a packet from the first link during the first cycle into the first bank, and causes to store a packet from the first link during the second cycle into the second bank, and (C3) during the second transmission time slot among the second kind of time slots, the controller causes to transmit a packet stored in the second bank during the first cycle to the second link, and causes to transmit a packet stored in the first bank during the second cycle to the second link.

Thus, because the banks are switched according to a predetermined schedule, the packets flowing from the first link to the second link can be appropriately relayed. Namely, it is possible to reduce the power consumed by the routing processing. Incidentally, although the storage areas (i.e. bank) for temporarily storing the packets are required in the second port unit, it is sufficient when each bank has a capacity to store the data of one time slot. Namely, compared with a case where the routing processing is carried out, it is possible to reduce the capacity of the buffer areas and to reduce the power consumed by the packet buffering.

Moreover, in the fourth aspect of the embodiments, packet transmission from the specific transmission source on the second link to the specific transmission destination on the first link may be further scheduled by using a third transmission time slot among the first kind of time slots and a fourth transmission time slot among the second kind of time slots. Furthermore, the aforementioned second port unit may include: a third bank and a fourth bank, which are storage areas to temporarily store a packet flowing from the second link to the first link. Still further, the aforementioned controller (C4) may alternately switch a third cycle and a fourth cycle each time when switching the first kind of time slots, wherein, in the third cycle, the controller carries out a setting so that a packet from the second link is stored into the third bank, and carries out a setting so that a packet stored in the fourth bank flows to the first link through the first port unit and the switch, and in the fourth cycle, the controller carries out a setting so that a packet from the second link is stored into the fourth bank, and carries out a setting so that a packet stored in the third bank flows to the first link through the first port unit and the switch, (C5) during the fourth transmission time slot among the second kind of time slots, the controller may cause to store a packet from the second link during the third cycle into the third bank, and may cause to store a packet from the second link during the fourth cycle into the fourth bank, and (C6) during the third transmission time slot among the first kind of time slots, the controller may cause to transmit a packet stored in the fourth bank during the third cycle to the first link, and may cause to transmit a packet stored in the third bank during the fourth cycle to the first link. Thus, it becomes possible to appropriately relay even packets flowing from the second link to the first link without the routing processing.

Moreover, the aforementioned controller may (C7) cause to replace an identifier of the first transmission time slot, which is included in a control packet among packets stored in the first or second bank, with an identifier of the second transmission time slot, when transmitting the packet stored in the first or second bank to the second link, wherein the control packet includes the identifier of the first transmission time slot and represents start, end, reservation or release of the first transmission time slot. Thus, when transmitting the packet from the transmission source edge router on the first link to the transmission destination edge router on the second link, the control packet including the identifier of the second transmission time slot flows between the network apparatus and the destination edge router on the second link. Therefore, for example, in each node (e.g. relay router, edge router and the like) on the second link, it becomes possible to judge the start and end of the second transmission time slot according to the control packet and/or carry out a processing for the reservation and release of the second transmission time slot.

Furthermore, the aforementioned controller may (C8) cause to replace an identifier of the fourth transmission time slot, which is included in a control packet among packets stored in the third or fourth bank, with an identifier of the third transmission time slot, when transmitting the packet stored in the third or fourth bank to the first link through the switch and the first port unit, wherein the control packet includes the identifier of the fourth transmission time slot and represents start, end, reservation or release of the fourth transmission time slot. Thus, when transmitting the packet from the transmission source edge router on the second link to the transmission destination edge router on the first link, the control packet including the identifier of the third transmission time slot flows between the network apparatus and the destination edge router on the first link. Therefore, for example, in each node (e.g. relay router, edge router and the like) on the first link, it becomes possible to judge the start and end of the third transmission time slot according to the control packet and carry out a processing for the reservation and release of the third transmission time slot.

Moreover, in the fourth aspect of the embodiments, the length of one frame in the second link, which includes plural time slots of the second kind may be equal to the length of one time slot of the first kind. Incidentally, the communication speed in the second link may be higher than that in the first link.

A packet communication system relating to a fifth aspect of the embodiments includes: (A) edge routers; (B) a network apparatus relaying a packet communicated between edge routers; and (C) a management server delivering to the edge routers and the network apparatus, information concerning a first kind of time slots, information concerning a second kind of time slots and time synchronization information. Moreover, the aforementioned edge router includes; (A1) an edge router table storing an transmission destination address of a packet and an identifier of a destination edge router corresponding to the transmission destination address; (A2) a queue for each destination edge router; (A3) a slot reservation table storing an identifier of a time slot which is assigned to packet transmission addressed to a specific destination edge router and identifiers of an output interface and a queue, which are used for the packet transmission; (A4) a unit to receive packets from an external network; (A5) a unit to identify, from the edge router table, a destination edge router corresponding to the transmission destination address of the received packet and to store the received packet into the queue corresponding to the identified destination edge router; and (A6) a packet transmitter. Furthermore, the aforementioned network apparatus includes: (B1) a first port unit to be coupled with a first link used in time division of the first kind of time slots; (B2) a second port unit to be coupled with a second link used in time division of the second kind of time slots, which are shorter than the first kind of time slots and having a first bank and a second bank that are storage areas to temporarily store packets from the first link; and (B3) a controller controlling a switch coupling between the first port unit and the second port unit, and the second port unit. And, the aforementioned controller (B3-1) alternately switches a first cycle and a second cycle each time when switching the first kind of time slots, wherein, in the first cycle, the controller carries out a setting so that a packet from the first link is stored into the first bank through the first port unit and the switch, and carries out a setting so that a packet stored in the second bank flows to the second link, and in the second cycle, the controller carries out a setting so that a packet from the first link is stored into the second bank through the first port unit and the switch, and carries out a setting so that a packet stored in the first bank flows to the second link, (B3-2) during the first transmission time slot among the first kind of time slots, the controller causes to store a packet from the first link during the first cycle into the first bank, and causes to store a packet from the first link during the second cycle into the second bank, and (B3-3) during the second transmission time slot among the second kind of time slots, the controller causes to transmit a packet stored in the second bank during the first cycle to the second link, and causes to transmit a packet stored in the first bank during the second cycle to the second link.

A packet communication method relating to a sixth aspect of the embodiments is a method executed by a network apparatus having (A) a first port unit to be coupled to a first link that is used in time division of a first kind of time slots; and (B) a second port unit to be coupled to a second link that is used in time division of a second kind of time slots, wherein each of the second kind of time slots is shorter than each of the first kind of time slots, and the second port unit has a first bank and a second bank that are storage areas to temporarily store the packets from the first link. In addition, this method includes: (1) receiving data representing that first packet transmission from a specific transmission source on the first link to a specific transmission destination on the second link is scheduled by using a first transmission time slot among the first kind of time slots and a second transmission time slot among the second kind of time slots; (2) alternately switching a first cycle and a second cycle each time when switching the first kind of time slots, wherein, in the first cycle, a setting is made so that a packet from the first link is stored into the first bank through the first port unit and the switch, and a setting is made so that a packet stored in the second bank flows to the second link, and in the second cycle, a setting is made so that a packet from the first link is stored into the second bank through the first port unit and the switch, and a setting is made so that a packet stored in the first bank flows to the second link; (3) causing to store a packet from the first link during the first cycle into the first bank, and causing to store a packet from the first link during the second cycle into the second bank during the first transmission time slot among the first kind of time slots; and (4) causing to transmit a packet stored in the second bank during the first cycle to the second link, and causes to transmit a packet stored in the first bank during the second cycle to the second link during the second transmission time slot among the second kind of time slots.

Incidentally, a program can be prepared to realize the edge router 1, the relay router 3, and the management server 5 in cooperation with hardware. The program is stored in a computer-readable storage medium or a storage device, such as a flexible disk, a CD-ROM, a magneto-optical disk, a semiconductor memory, or a hard disk. Further, intermediate processing results are temporarily stored in a storage device, e.g., a main memory.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. An network apparatus for relaying packets, comprising:
a first port unit to be coupled to a first link that is used in time division of a first kind of time slots;
  a second port unit to be coupled to a second link that is used in time division of a second kind of time slots, each of the second kind of time slots is shorter than each of the first kind of time slots;
  at least two output banks that are storage areas to temporarily store the packets flowing from the first link to the second link;

a switch coupling between the first port unit and the second port unit; and
a controller to control the switch; and
upon detecting switching to a first transmission time slot among the first kind of time slots, the controller couples the first port unit through the switch to a first output bank of the output banks and couples another output bank to the second port unit or the second link to cause the first output bank to temporarily store packets from the first link,
upon detecting switching from the first transmission time slot to a next time slot among the first kind of time slots, the controller couples the first output bank to the second port unit or the second link and couples the first port unit through the switch to the another output bank, and
upon detecting switching to a second transmission time slot among the second kind of time slots, the controller causes the second port unit to transmit the packets stored in an output bank coupled to the second port unit or the second link to the second link.

2. The network apparatus as set forth in claim 1, further comprising:
at least two input banks that are storage areas to temporarily store a packet flowing from the second link to the first link, and
wherein, upon detecting switching to a time slot of the first kind immediately before a third transmission time slot among the first kind of time slots, the controller couples an input bank to the second port unit or the second link and couples another input bank to the first port unit,
upon detecting switching to a fourth transmission time slot among the second kind of time slots, the controller causes to temporarily store a packet from the second link into the input bank coupled to the second port unit or the second link,
upon detecting switching to the third transmission time slot among the first kind of time slots, the controller couples the input bank to the first port unit, couples the another input bank to the second port unit or the second link and causes the first port unit to transmit the packet stored in the input bank coupled to the first port unit to the first link through the switch and the first port unit.

3. The network apparatus as set forth in claim 2, wherein, when the controller causes the second port unit to transmit packets stored in the output bank coupled to the second port unit or the second link to the second link, the controller replaces an identifier of the first transmission time slot included in a control packet among packets stored in the output bank with an identifier of the second transmission time slot, wherein the control packet includes the identifier of the first transmission time slot and represents start, end, reservation or release of the first transmission time slot.

4. The network apparatus as set forth in claim 2, wherein, when the controller causes the first port unit to transmit the packets stored in the input bank coupled to the first port unit to the first link through the switch and the first port unit, the controller replaces an identifier of the fourth time slot included in a second control packet among packets stored in the input bank with an identifier of the third transmission time slot, wherein the second control packet includes the identifier of the fourth transmission time slot and represents start, end, reservation or release of the fourth transmission time slot.

5. The network apparatus as set forth in claim 1, wherein a length of one frame on the second link, which includes a plurality of time slots of the second kind, is equal to a length of one time slot of the first kind.

6. A packet communication system, comprising:
a first communication apparatus to be coupled to a first link that is used in time division of a first kind of time slots;
a second communication apparatus to be coupled to a second link that is used in time division of a second kind of time slots, each of the second kind of time slots is shorter than each of the first kind of time slots; and
a network apparatus relaying packets communicated between the first and second communication apparatuses, the network apparatus comprises:
a first port unit to be coupled to the first link;
a second port unit to be coupled to the second link;
at least two output banks that are storage areas to temporarily store
the packets flowing from the first link to the second link;
a switch coupling between the first port unit and the second port unit;
and
a controller to control the switch; and
upon detecting switching to a first transmission time slot among the first kind of time slots, the controller couples the first port unit through the switch to a first output bank of the output banks and couples another output bank to the second port unit or the second link to cause the first output bank to temporarily store packets from the first link,
upon detecting switching from the first transmission time slot to a next time slot of the first kind of time slots, the controller couples the first output bank to the second port unit or the second link and couples the first port unit through the switch to the another output bank, and
upon detecting switching to a second transmission time slot among the second kind of time slots, the controller causes the second port unit to transmit the packets stored in the output bank coupled to the second port unit or the second link to the second link.

7. The packet communication system as set forth in claim 6, wherein the network apparatus further comprises at least two input banks that are storage areas to temporarily store a packet flowing from the second link to the first link, and
upon detecting switching to a time slot of the first kind immediately before a third transmission time slot among the first kind of time slots, the controller couples an input bank to the second port unit or the second link and couples another input bank to the first port unit,
upon detecting switching to a fourth transmission time slot among the second kind of time slots, the controller causes the input bank to temporarily store a packet from the second link into the input bank coupled to the second port unit or the second link,
upon detecting switching to the third transmission time slot among the first kind of time slots, the controller couples the input bank to the first port unit, couples the another input bank to the second port unit or the second link and causes the first port unit to transmit the packet stored in the input bank coupled to the first port unit through the switch and the first port unit to the first link.

8. A non-transitory storage medium storing a program for causing a network apparatus to execute a procedure,
the procedure comprising:
upon detecting switching to a first transmission time slot among a first kind of time slots, coupling a first port unit to be coupled to a first link that is used in time division of the first kind of time slots through a switch to a first output bank of at least two output banks, and coupling another output bank to a second port unit to be coupled to a second link that is used in time division of a second kind of time slots or the second link, the network apparatus comprises the first port unit, the second port unit, the switch and the at least two output banks that are storage areas to temporarily store packets flowing from the first link to the second link, and each of the second kind of time slots is shorter than each of the first kind of time slots;

causing the first output bank to temporarily store packets from the first link;

upon detecting switching from the first transmission time slot to a next time slot among the first kind of time slots, coupling the first output bank to the second port unit or the second link and coupling the first port unit through the switch to the another output bank, and upon detecting switching to a second transmission time slot among the second kind of time slots, causing the second port unit to transmit the packets stored in the output bank coupled to the second port unit or the second link to the second link.

9. The non-transitory storage medium as set forth in claim 8, wherein the procedure further comprises:

upon detecting switching to a time slot of the first kind immediately before a third transmission time slot among the first kind of time slots, coupling an input bank of at least two input banks that are storage areas to temporarily store a packet flowing from the second link to the first link to the second port unit or the second link, and coupling another input bank to the first port unit, wherein the network apparatus further comprises the at least two input banks;

upon detecting switching to a fourth transmission time slot among the second kind of time slots, causing to temporarily store a packet from the second link into the input bank coupled to the second port unit or the second link;

upon detecting switching to the third transmission time slot among the first kind of time slots, coupling the input bank to the first port unit, and coupling the another input bank to the second port unit or the second link; and causing the first port unit to transmit the packet stored in the input bank coupled to the first port unit to the first link through the switch and the first port unit.

* * * * *